US012502437B2

(12) United States Patent
Sato et al.

(10) Patent No.: US 12,502,437 B2
(45) Date of Patent: Dec. 23, 2025

(54) COMPOSITIONS AND METHODS FOR THERAPEUTIC DELIVERY

(71) Applicant: GenVivo, Inc., San Marino, CA (US)

(72) Inventors: Makoto Sato, Pasadena, CA (US); Alexander T. Cunha, Los Angeles, CA (US); Cecilia Roh, South Pasadena, CA (US); Robert G. Johnson, Jr., Lafayette, CA (US)

(73) Assignee: GenVivo, Inc., San Marino, CA (US)

( * ) Notice: Subject to any disclaimer, the term of this patent is extended or adjusted under 35 U.S.C. 154(b) by 0 days.

(21) Appl. No.: 18/948,331

(22) Filed: Nov. 14, 2024

(65) Prior Publication Data

US 2025/0170271 A1    May 29, 2025

Related U.S. Application Data

(60) Provisional application No. 63/643,887, filed on May 7, 2024, provisional application No. 63/599,385, filed on Nov. 15, 2023.

(51) Int. Cl.
*A61K 48/00* (2006.01)
*C12N 15/86* (2006.01)

(52) U.S. Cl.
CPC .......... *A61K 48/0033* (2013.01); *C12N 15/86* (2013.01); *C12N 2740/13043* (2013.01); *C12N 2770/36022* (2013.01)

(58) Field of Classification Search
None
See application file for complete search history.

(56) References Cited

U.S. PATENT DOCUMENTS

| | | | |
|---|---|---|---|
| 8,187,872 B2 | 5/2012 | Allen et al. | |
| 9,925,276 B2 | 3/2018 | Levy et al. | |
| 2002/0192824 A1 | 12/2002 | Meruelo et al. | |
| 2014/0244163 A1 | 8/2014 | Zhao et al. | |
| 2018/0243389 A1 | 8/2018 | Leonardi et al. | |
| 2021/0077600 A1 | 3/2021 | Leonardi et al. | |
| 2023/0009161 A1 | 1/2023 | Lai et al. | |
| 2023/0277647 A1 | 9/2023 | Fischer-Lougheed et al. | |

OTHER PUBLICATIONS

Kenkel, "Antibodies 101: single chain fragment variables (scFv)" Addgene (Year: 2021).*
Ludel et al., "distinguishing between monomeric scFv and diabody in solution using light and small angle X-ray scattering" Antibodies (Year: 2019).*
Stiechen et al., "a review of current nanoparticles and targeting moieties for the delivery of cancer theapeutics" European Journal of Pharmaceutical Sciences (Year: 2013).*
Deng et al., "Viral vector vaccine development and application during COVID-19 pandemic" Microorganisms (Year: 2022).*
Klimstra et al., "Targeting Sindbis virus based vectors to Fc receptor-positive cell types" Virology (Year: 2005).*
Reul et al., "Tumor specific delivery of immune checkpoint inhibitors by engineered AAV vectors" Frontiers (Year: 2019).*
Waehler et al., "Engineering targeted viral vectors for gene therapy" Nat Rev Genet. (Year: 2007).*
Wikipedia "Single-chain variable fragment" https://web.archive.org https://en.wikipedia.org/wiki/single-chain_variable_fragment (Year: 2023).*
PCT/US2024/056020 International Search Report and Written Opinion dated Apr. 24, 2025.
Gao, A G. et al. Integrin-associated protein is a receptor for the C-terminal domain of thrombospondin. J Biol Chem 271(1):21-24 (1996).
Gardner, Jason P. et al. Infection of human dendritic cells by a sindbis virus replicon vector is determined by a single amino acid substitution in the E2 glycoprotein. J Virol. 74(24):11849-11857 (2000).
Gattoni-Celli, S. et al. Beta 2-microglobulin gene is mutated in a human colon cancer cell line (HCT) deficient in the expression of HLA class I antigens on the cell surface. Cancer Res 52(5):1201-1204 (1992).
GenBank Accession No. E02707. Version No. E02707. DNA sequence coding for surface antigen of human hepatitis B virus: p. 1. Record created Jun. 6, 1997. Retrieved May 5, 2025. Retrieved from: https://www.ncbi.nlm.nih.gov/nuccore/E02707.
GenBank Accession No. E06890. Version No. E06890. DNA encoding Hepatitis C virus antigen: p. 1. Record created Jun. 6, 1997. Retrieved May 5, 2025. Retrieved from: https://www.ncbi.nlm.nih.gov/nuccore/E06890.
GenBank Accession No. E07883. Version No. E07883. cDNA encoding chimera protein R3:S which contain part of surface antigen protein of Japanese encephalitis virus and surface antigen protein of hepatitis B virus: pp. 1-2. Record created Jun. 6, 1997. Retrieved May 5, 2025. Retrieved from: https://www.ncbi.nlm.nih.gov/nuccore/E07883.
GenBank Accession No. J03266. Version No. J03266. B.malayi 63 kd antigen mRNA, complete cds: pp. 1-2. Record created Apr. 26, 1993. Retrieved May 5, 2025. Retrieved from: https://www.ncbi.nlm.nih.gov/nuccore/J03266.
GenBank Accession No. L03833. Version No. L03833. *Salmonella enteritidis* fimbrial antigen (SEF14) gene, complete cds: pp. 1-2. Record created Apr. 26, 1993. Retrieved May 5, 2025. Retrieved from: https://www.ncbi.nlm.nih.gov/nuccore/L03833.
GenBank Accession No. L08198. Version No. L08198. Schistosoma japonicum (clone C32) 22.6kd tegumental associated antigen mRNA, complete cds: pp. 1-2. Record created Apr. 26, 1993. Retrieved May 5, 2025. Retrieved from: https://www.ncbi.nlm.nih.gov/nuccore/L08198.

(Continued)

*Primary Examiner* — Robert M Kelly
*Assistant Examiner* — John David Moore
(74) *Attorney, Agent, or Firm* — Wilson Sonsini Goodrich & Rosati

(57) ABSTRACT

Described herein are compositions and methods for therapeutic delivery using an engineered viral vector. The engineered viral vector provided herein can improve therapeutic delivery, increase targeting efficiency, and decrease off-targeting or adverse effects.

20 Claims, 26 Drawing Sheets

Specification includes a Sequence Listing.

(56) References Cited

OTHER PUBLICATIONS

GenBank Accession No. M24444. Version No. M24444. Dengue virus type 2 (isolate D2-D80-141) envelope protein (E) gene, 5' end: pp. 1-2. Record created Aug. 2, 1993. Retrieved May 5, 2025. Retrieved from: https://www.ncbi.nlm.nih.gov/nuccore/M24444.
GenBank Accession No. M27807. Version No. M27807. O.volvulus O.V.-16 antigen mRNA, complete cds: p. 1. Record created Apr. 26, 1993. Retrieved May 5, 2025. Retrieved from: https://www.ncbi.nlm.nih.gov/nuccore/M27807.
GenBank Accession No. M33641. Version No. M33641. G.lamblia trophozoite surface antigen (TSA 417) mRNA, complete cds: pp. 1-2. Record created Apr. 26, 1993. Retrieved May 5, 2025. Retrieved from: https://www.ncbi.nlm.nih.gov/nuccore/M33641.
GenBank Accession No. M34678. Version No. M34678. *Homo sapiens* Ig mu-chain Vv-D-J6-region (IGHM) mRNA, partial cds: p. 1. Record created Apr. 27, 1993. Retrieved May 5, 2025. Retrieved from: https://www.ncbi.nlm.nih.gov/nuccore/M34678.
GenBank Accession No. M35274. Version No. M35274. B.pertussis filamentous hemagglutinin antigen gene, partial cds: p. 1. Record created Apr. 26, 1993. Retrieved May 5, 2025. Retrieved from: https://www.ncbi.nlm.nih.gov/nuccore/M35274.
GenBank Accession No. M64353. Version No. M64353. Human TCR-beta VB13 subfamily (VB13, JB1-6, and CB1 segments) mRNA, 5' end: pp. 1-2. Record created Aug. 3, 1993. Retrieved May 5, 2025. Retrieved from: https://www.ncbi.nlm.nih.gov/nuccore/M64353.
GenBank Accession No. U18552. Version No. U18552. Kaposi's sarcoma-associated herpes-like virus probable membrane antigen gene, partial cds: p. 1. Record created Dec. 28, 1994. Retrieved May 5, 2025. Retrieved from: https://www.ncbi.nlm.nih.gov/nuccore/U18552.
GenBank Accession No. U59487. Version No. U59487. Borrelia burgdorferi P35 antigen protein gene, and 7.5 kDa lipoprotein gene, complete cds: pp. 1-2. Record created Sep. 24, 1996. Retrieved May 5, 2025. Retrieved from: https://www.ncbi.nlm.nih.gov/nuccore/U59487.
GenBank Accession No. X53832. Version No. X53832. P. falciparum MSA2 gene for merozoite surface antigen 2: pp. 1-2. Record created Apr. 20, 1993. Retrieved May 5, 2025. Retrieved from: https://www.ncbi.nlm.nih.gov/nuccore/X53832.
Hossein-Nejad-Ariani, Hanieh. et al. Small Peptide Ligands for Targeting EGFR in Triple Negative Breast Cancer Cells. Scientific Reports 9(1):2723, 1-10 (2019).
Lowenadler, B. et al. A gene fusion system for generating antibodies against short peptides. Gene 58(1):87-97 (1987).
Mandelin, Jami. et al. Selection and identification of ligand peptides targeting a model of castrate-resistant osteogenic prostate cancer and their receptors. Proc Natl Acad Sci U S A 112(12):3776-3781 (2015).
Morizono, K. et al. Antibody-directed targeting of retroviral vectors via cell surface antigens. J Virol 75(17):8016-8020 (2001).
Morizono, Kouki. et al. Lentiviral vector retargeting to P-glycoprotein on metastatic melanoma through intravenous injection. Nat Med 11(3):346-352 (2005).
Ohno, K. et al. Cell-specific targeting of Sindbis virus vectors displaying IgG-binding domains of protein A. Nat Biotechnol 15(8):763-767 (1997).
Pariente, Nonia. et al. A novel dual-targeted lentiviral vector leads to specific transduction of prostate cancer bone metastases in vivo after systemic administration. Mol Ther 15(11):1973-1981 (2007).
ProP—1.0 Arginine and lysine propeptide cleavage sites in eukaryotic protein sequences. DTU Health TechDepartment of Health Technology ;[retrieved on May 5, 2025]. Available at URL: https://services.healthtech.dtu.dk/services/ProP-1.0/ pp. 1-2.
Silva, Frederico Aires da. et al. Cell type-specific targeting with sindbis pseudotyped lentiviral vectors displaying anti-CCR5 single-chain antibodies. Hum Gene Ther 16(2):223-234 (2005).
Whitlow, M. et al. An Improved Linker for Single-chain Fv With Reduced Aggregation and Enhanced Proteolytic Stability. Protein Engineering 6(8):989-995 (1993).
Yang, Lili. et al. Targeting lentiviral vectors to specific cell types in vivo. Proc Natl Acad Sci U S A 103(31):11479-11484 (2006).

* cited by examiner

FIG. 1A
SB Envelope Mutants and GVO Constructs

Note: Options for "tm" include the absence and presence of a "K2H" (lysine to histidine) mutation to attenuate furin enzymatic cleavage within the HER2 scFv and diabody targeting moieties.

FIG. 1B

Amino acid sequence of SB E1 (Translation 439 a.a. MW=47393.6) SEQ ID NO: 19

```
  1 YEHATTVPNV PQIPYKALVE RAGYAPINLE ITVMSSEVLP  40
 41 STNQEYITCK FTTVVPSPKI KCCGSLECQP AAHADYTCKV  80
 81 FGGVYPFMWG GAQCFCDSEN SQMSEAYVEL SADCASDHAQ 120
121 AIKVHTAAMK VGLRIVYGNT TSFLDVYVNG VTPGTSKDLK 160
161 VIAGPISASF TPFDHKVVIH RGLVYNYDFP EYGAMKPGAF 200
201 GDIQATSLTS KDLIASTDIR LLKPSYGNVH VPYTQASSGF 240
241 EMWKNNSGRP LOETAPFGCK IAVNPLRAVD CSYGNIPISI 280
281 DIPNAAFIRT SDAPLVSTVK CEVSECTYSA DFGGMATLQY 320
321 VSDREGQCPV HSHSSTATLQ ESTVHVLEKG AVTVHFSTAS 360
361 FQANFIVSLC GKKTTCNAEC KPPADHIVST PHKNDQEFQA 400
401 AISKTSWSWL FALEGGASSL LIIGLMIFAC SMMLTSTRR* 440
```

**Control vs. GVO-2.2-DB-H-1(K2H), $p<0.01$
*RVE control vector vs. GVO-2.2-DB-H-1(K2H), $p<0.05$
Statistics calculated by one-way ANOVA

COMPOSITIONS AND METHODS FOR THERAPEUTIC DELIVERY

CROSS REFERENCE

This application claims the benefit of U.S. Provisional Application No. 63/599,385, filed Nov. 15, 2023, and U.S. Provisional Application No. 63/643,887, filed May 7, 2024, each of which is incorporated herein by reference in its entirety.

SEQUENCE LISTING

The instant application contains a Sequence Listing which has been submitted electronically in XML format and is hereby incorporated by reference in its entirety. Said XML copy, created on Jan. 14, 2025, is named 30863-732_201_SL.xml and is 49,857 bytes in size.

BACKGROUND

The use of viral particles or viral vectors for delivering therapeutics has emerged as one of the foundations of modern medicine. However, the use of such viral particles or viral vectors can lead to off-target or adverse effects. Accordingly, there remains a need for engineered viral particles or engineered viral vectors for delivering therapeutics with increased targeting efficiency and decreased off-targeting and adverse effects.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

SUMMARY

In one aspect, the present disclosure provides an engineered viral vector comprising a modified envelope protein, wherein the modified envelope protein comprises: a) at least one targeting moiety, and b) at least one modification in a wild-type protein sequence (SEQ ID NO: 1); wherein the modified envelope protein increases transduction efficiency or specificity of the engineered viral vector to a target cell relative to a viral vector without the modified envelope protein. In some embodiments, the at least one modification is in an E2 domain.

In some embodiments, the engineered viral vector comprises an engineered retroviral vector. In some embodiments, the engineered retroviral vector comprises an engineered gammaretroviral vector. In some embodiments, the engineered gammaretroviral vector comprises an engineered murine leukemia viral (MLV) vector. In some embodiments, the modified envelope protein comprises a recombinant viral envelope protein derived from a DNA virus. In some embodiments, the modified envelope protein comprises a recombinant viral envelope protein derived from an RNA virus. In some embodiments, the RNA virus comprises an alphavirus. In some embodiments, the alphavirus comprises a Sindbis virus. In some embodiments, the modified envelope protein derived from the Sindbis virus comprises an E3 domain, an E2 domain, a 6K domain, an E1 domain, or a combination thereof. In some embodiments, the modified envelope protein further comprises a protease cleavage site located between E3 and E2 domains.

In some embodiments, the protease cleavage site comprises a furin cleavage site.

In some embodiments, the at least one targeting moiety is located within the E2 domain. In some embodiments, the at least one targeting moiety comprises a conjugating moiety. In some embodiments, the conjugating moiety comprises an IgG-binding domain of a bacterial protein. In some embodiments, the bacterial protein is a bacterial Protein A. In some embodiments, the IgG-binding domain of the bacteria protein is a ZZ protein domain.

In some embodiments, the engineered viral vector is further conjugated with an antibody or antigen binding fragment thereof. In some embodiments, the antibody or antigen binding fragment thereof comprises an IgG-scFv, a single variable domain on a heavy chain (VHH), a nanobody, a BiTE, a diabody, a DART, a TandAb, a scDiabody, a scDiabody-CH3, a triple body, a mini-antibody, a minibody, a TriBi minibody, a scFv-CH3 KIH, a Fab-scFv-Fc KIH, a Fab-scFv, a scFv-CH-CL-scFv, a F(ab')2, a F(ab')2-scFv2, a scFv-KIH, a Fab-scFv-Fc, a tetravalent HCAb, a scDiabody-Fc, a diabody-Fc, a tandem scFv-Fc, an intrabody, a binding fragment thereof, a chemically modified derivative thereof, a heavy chain of the variable fragment ($V_H$), a light chain of the variable fragment ($V_L$), or a combination thereof. In some embodiments, the antibody or antigen binding fragment thereof binds to a target ligand of the target cell. In some embodiments, the target cell is a cancer cell. In some embodiments, the cancer cell comprises a human cancer cell. In some embodiments, the cancer cell comprises a leukemia cell, a myeloblastic cell, a promyelocytic cell, a myelomonocytic cell, a monocytic cell, an erythroleukemia cell, a chronic myelocytic (granulocytic) leukemia cell, a chronic lymphocytic leukemia cell, a lymphoma cell, e.g. Hodgkin's disease and non-Hodgkin's disease, a fibrosarcoma cell, a myosarcoma cell, a liposarcoma cell, a chondrosarcoma cell, an osteogenic sarcoma cell, an angio-sarcoma cell, an endotheliosarcoma cell, an Ewing's tumor cell, a colon cancer cell, a pancreatic cancer cell, a breast cancer cell, an ovarian cancer cell, a prostate cancer cell, a squamous cell carcinoma cell, a basal cell carcinoma cell, an adenocarcinoma cell, a renal cell carcinoma cell, hepatoma cell, a Wilms' tumor cell, a cervical cancer cell, an uterine cancer cell, a testicular tumor cell, a lung carcinoma cell, a small cell lung carcinoma cell, a bladder carcinoma cell, an epithelial carcinoma cell, a glioma cell, an astrocytoma cell, an oligodendroglioma cell, a melanoma cell, neuro-blastoma cell, a retinoblastoma cell, a dysplasia and hyperplasia cell, a prostatitis cell, a benign prostatic hypertrophic cell, a benign prostatic hyperplasia (BPH) cell, a prostatic paraganglioma cell, a prostate adenocarcinoma cell, a prostatic intraepithelial neoplasia cell, a prostato-rectal fistulas cell, an atypical prostatic stromal lesion cell, a bladder cancer cell, a lung cancer cell, a head and neck cancer cell, a non-small cell lung cancer cell, a kidney cancer cell, a glioblastoma cell, a Merkel Cell cancer cell, an angiosarcoma cell, a cutaneous T-cell lymphoma cell, a cutaneous B-cell lymphoma cell, a dermatofibrocarcoma protuberans cell, a Sebaceous carcinoma cell, or a cutaneious neuroendocrine carcinoma cell.

In some embodiments, the target ligand comprises a cell surface marker. In some embodiments, the cell surface marker comprises a cancer cell marker. In some embodiments, the cancer cell marker comprises CD47, CEA, HER2, EGFR, PSMA, TfR, nectin-4, muc-1, endoglin, EphA2, EphB2, folate receptor, GRP78, IGF-1R, cMET/ HGFR, Tn antigen, EpCAM, avP3 integrin, CD44, mesothelin, PSCA, uPAR, CAIX, CD13, FAP-α, matriptase, MT-1 MMP, MT6-MMP, KDR, KIT, CD276, CD-83, or combination thereof. In some embodiments, the target ligand comprises CD33, CD30, HER2, CD22, CD79b, nectin-4, Trop-2, BCMA, CD19, EGFR, Folate receptor u, CD3, CD38, CD20, BCMA, CEA, PSMA, OX40, 4-1BB, CD16A, PD-1, PD-L1, CTLA-4, LAG-3, TIM3, VEGF, CD47, ICOS, MET, LGR5, IGF-1R, HER3, ANG2, DLL4, FAP, DR5, Fibronectin ED-B, Tenascin C, EpCAM, TNFα, Digoxin, GPIIb/IIIa, Crotalidae venom, Centruroides venom, CA6, PLVAP, 5T4, EDB, EGFRvIII, 6B11, CXCR4, MSLN, FN1, GPC2, GPC3, VCAN1, COL11A1, or MMR.

In some embodiments, the target ligand of the target cell comprises an immune checkpoint protein or an immune checkpoint receptor. In some embodiments, the target ligand of the target cell is an immune checkpoint protein. In some embodiments, the immune checkpoint protein comprises PD-L1, CTLA-4, B7RP1, HVEM, CD137L, OX40L, CD40, CD70, GAL9, MHCII, CD47, VISTA, or GITR. In some embodiments, the target ligand of the target cell is an immune checkpoint receptor. In some embodiments, the immune checkpoint receptor comprises PD-1, ICOS (CD278), BTLA, CD137 (4-1BB), OX40 (CD134), CD40L, CD27, TIM3, CD20, or LAG3.

In some embodiments, the target cell is an immune cell. In some embodiments, the immune cell comprises a T cell, a B cell, a macrophage, a natural killer (NK) cell, or a dendritic cell. In some embodiments, the target ligand of the target cell comprises a cell surface antigen.

In some embodiments, the at least one targeting moiety comprises a binding moiety. In some embodiments, the binding moiety comprises a single-chain variable fragment (scFv), a diabody, or a single variable domain on a heavy chain (VHH). In some embodiments, the binding moiety comprises the scFv. In some embodiments, the scFv is encoded by a nucleotide sequence in the E2 domain, wherein the nucleotide sequence encodes at least one base-linker, a heavy chain of the variable fragment ($V_H$), a mid-linker, or a light chain of the variable fragment ($V_L$). In some embodiments, the nucleic acid sequence encoding the $V_H$ or the $V_L$ of the scFv is derived from the same antibody. In some embodiments, the nucleic acid sequence encoding the $V_H$ or the $V_L$ of the scFv is derived from different antibodies.

In some embodiments, the nucleotide sequence further comprises at least one restriction enzyme site. In some embodiments, the at least one restriction enzyme site is located upstream, downstream, or combination thereof, of the nucleotide sequence in the E2 domain. In some embodiments, the at least one restriction enzyme site comprises BstEII sites.

In some embodiments, the at least one base-linker comprises SEQ ID NOs: 2-6. In some embodiments, the mid-linker comprises at least 5 amino acids. In some embodiments, the mid-linker comprises at most 25 amino acids. In some embodiments, the mid-linker comprises between 5 to 25 amino acids. In some embodiments, the mid-linker comprises a 14 amino acid linker or an 18 amino acid linker. In some embodiments, the mid-linker comprises SEQ ID NOs: 7-8. In some embodiments, the $V_L$ is inverted.

In some embodiments, the binding moiety comprises the diabody. In some embodiments, the diabody comprises a dimer of a single-chain variable fragment (scFv). In some embodiments, the diabody is encoded from a nucleotide sequence in the E2 domain, wherein the nucleotide sequence encodes at least one base-linker, at least one heavy chain of the variable fragment ($V_H$), at least one mid-linker, or at least one light chain of the variable fragment ($V_L$). In some embodiments, the at least one mid-linker comprises at least 5 amino acids. In some embodiments, the at least one mid-linker comprises at most 25 amino acids. In some embodiments, the at least one mid-linker comprises between 5 to 25 amino acids. In some embodiments, the at least one mid-linker comprises an 18 amino acid linker. In some embodiments, the at least one mid-linker comprises SEQ ID NOs: 7-8. In some embodiments, the dimer of the scFv is derived from the same antibody. In some embodiments, the dimer of the scFv is derived from different antibodies. In some embodiments, the at least one $V_H$ is derived from the same antibody. In some embodiments, the at least one $V_H$ is derived from different antibodies. In some embodiments, the at least one light chain of the variable fragment ($V_L$) is derived from the same antibody. In some embodiments, the at least one light chain of the variable fragment ($V_L$) is derived from different antibodies.

In some embodiments, the binding moiety further comprises at least one modification compared to the sequence of a wild-type binding moiety. In some embodiments, the at least one modification comprises an amino acid substitution that removes a protease cleavage site from the binding moiety. In some embodiments, the protease cleavage site is a furin cleavage site. In some embodiments, the at least one modification comprises the substitution of a lysine to a histidine. In some embodiments, the binding moiety comprising the VHH comprises the following formula: linker 1-VHH-linker 2. In some embodiments, the linker 1 is selected from the group consisting of (GGGGS)nAAGHVG (SEQ ID NO: 27), AAGHVG(GGGGS)n (SEQ ID NO: 28), (GGGGS)nAAGHVG(GGGGS)n (SEQ ID NO: 29), (GGGGS)nGVHGAA (SEQ ID NO: 30), GVHGAA(GGGGS)n (SEQ ID NO: 31), and (GGGGS)nGVHGAA(GGGGS)n (SEQ ID NO: 32). In some embodiments, the linker 2 is selected from the group consisting of (GGGGS)nAAGHVG (SEQ ID NO: 27), AAGHVG(GGGGS)n (SEQ ID NO: 28), (GGGGS)nAAGHVG(GGGGS)n (SEQ ID NO: 29), (GGGGS)nGVHGAA (SEQ ID NO: 30), GVHGAA(GGGGS)n (SEQ ID NO: 31), and (GGGGS)nGVHGAA(GGGGS)n (SEQ ID NO: 32).

In some embodiments, the binding moiety comprises a nucleotide sequence encoding an antigen binding fragment thereof, wherein an antigen binding fragment thereof binds to a target ligand of the target cell. In some embodiments, the target cell is a cancer cell. In some embodiments, the cancer cell comprises a human cancer cell. In some embodiments, the cancer cell comprises a breast cancer cell, a colon cancer cell, a bladder cancer cell, a lung cancer cell, a head and neck cancer cell, a squamous cell carcinoma, a pancreatic cancer cell, a prostate cancer cell, a melanoma cell, a non-small cell lung cancer cell, a kidney cancer cell, a glioblastoma cell, a Merkel Cell cancer cell, an angiosarcoma cell, a cutaneous T-cell lymphoma cell, a cutaneous B-cell lymphoma cell, a dermatofibrocarcoma protuberans cell, a Sebaceous carcinoma cell, or a cutaneious neuroendocrine carcinoma cell. In still other embodiments, at least two target moieties are combined either together or separately with the engineered viral vectors disclosed herein. In some instances, the at least two target moieties comprise CD47, HER2, nectin-4, HLA, or EGFR. In some embodiments, the combination of target moieties provides an increased effect, in some instances a synergistic effect, on activity of the engineered viral vectors disclosed herein.

In some embodiments, the target ligand comprises a cell surface marker. In some embodiments, the cell surface marker comprises a cancer cell marker. In some embodiments, the cancer cell marker comprises CD47, CEA, HER2, EGFR, PSMA, TfR, nectin-4, muc-1, endoglin, EphA2, EphB2, folate receptor, GRP78, IGF-1R, cMET/HGFR, Tn antigen, EpCAM, avP3 integrin, CD44, mesothelin, PSCA, uPAR, CAIX, CD13, FAP-α, matriptase, MT-1 MMP, MT6-MMP, KDR, KIT, CD276, CD-83, or combination thereof. In some embodiments, the target ligand comprises CD33, CD30, HER2, CD22, CD79b, nectin-4, Trop-2, BCMA, CD19, EGFR, Folate receptor u, CD3, CD38, CD20, BCMA, CEA, PSMA, OX40, 4-1BB, CD16A, PD-1, PD-L1, CTLA-4, LAG-3, TIM3, VEGF, CD47, ICOS, MET, LGR5, IGF-1R, HER3, ANG2, DLL4, FAP, DR5, Fibronectin ED-B, Tenascin C, EpCAM, TNFα, Digoxin, GPIIb/IIIa, Crotalidae venom, Centruroides venom, CA6, PLVAP, 5T4, EDB, EGFRvIII, 6B11, CXCR4, MSLN, FN1, GPC2, GPC3, VCAN1, COL11A1, or MMR.

In some embodiments, the target ligand of the target cell comprises an immune checkpoint protein or an immune checkpoint receptor. In some embodiments, the target ligand of the target cell is an immune checkpoint protein. In some embodiments, the immune checkpoint protein comprises PD-L1 or CTLA-4. In some embodiments, the target ligand of the target cell is an immune checkpoint receptor. In some embodiments, the immune checkpoint receptor comprises PD-1.

In some embodiments, the target cell is an immune cell. In some embodiments, the immune cell comprises a T cell, a B cell, a macrophage, a natural killer (NK) cell, or a dendritic cell. In some embodiments, the target ligand of the target cell comprises a cell surface antigen.

In some embodiments, the engineer viral vector further comprises at least one amino acid modification in an E1 domain relative to a wild-type protein sequence (SEQ ID NO: 1). In some embodiments, the at least one amino acid modification in the E1 domain comprises at least one amino acid substitution relative to a wild-type protein sequence (SEQ ID NO: 1). In some embodiments, the at least one amino acid substitution comprises an amino acid substitution at position 770, an amino acid substitution at position 771, or a combination thereof, wherein an amino acid position is based on the number of amino acids of SEQ ID NO: 1. In some embodiments, the amino acid substitution at position 770 comprises an A770S or an A770Y substitution. In some embodiments, the amino acid substitution at position 771 comprises a K771G substitution. In some embodiments, the at least one amino acid substitution further comprises an amino acid substitution at position 226. In some embodiments, the amino acid substitution at position 226 comprises an E226G substitution.

In some embodiments, the at least one modification in the E2 domain comprises a substitution of one or more amino acids relative to a wild-type protein sequence (SEQ ID NO: 1). In some embodiments, the substitution of one or more amino acids comprises an amino acid substitution at position 134, an amino acid substitution at position 135, an amino acid substitution at position 136, an amino acid substitution at position 137, an amino acid substitution at position 225, an amino acid substitution at position 226, or a combination thereof, wherein an amino acid position is based on the number of amino acids in SEQ ID NO: 1. In some embodiments, the amino acid substitution at position 134 comprises a S134A substitution. In some embodiments, the amino acid substitution at position 135 comprises a L135A substitution. In some embodiments, the amino acid substitution at position 136 comprises a K136A substitution. In some embodiments, the amino acid substitution at position 137 comprises a Q137A substitution. In some embodiments, the amino acid substitution at position 225 comprises a K225A substitution. In some embodiments, the amino acid substitution at position 226 comprises an E226A substitution.

In some embodiments, the ligand is a hormone, a neurotransmitter, a cytokine, an ion, or a subunit thereof. In some embodiments, the at least one targeting moiety comprises a ligand for a cell surface receptor. In some embodiments, the ligand comprises a G protein-coupled receptor ligand or a small peptide ligand. In some embodiments, the ligand is encoded from a nucleotide sequence inserted into the E2 domain. In some embodiments, the G protein-coupled receptor ligand comprises endorphins or oxytocin. In some embodiments, the small peptide ligand comprises a ligand for GPR78, EGFR, PD-1, or CD47 receptors. In some embodiments, the small peptide ligand is epidermal growth factor (EGF) or a subunit of EGF. In some embodiments, the subunit of EGF is a EGF core domain. In some embodiments, the EGF core domain comprises an amino acid sequence with at least 70%, at least 75%, at least 80%, at least 85%, at least 90%, or at least 95% sequence identity to SEQ ID NO: 24. In some embodiments, the EGF core domain comprises SEQ ID NO: 24. In some embodiments, the targeting moiety comprises an amino acid sequence with at least 70%, at least 75%, at least 80%, at least 85%, at least 90%, or at least 95% sequence identity to SEQ ID NO: 25 or 26. In some embodiments, the targeting moiety comprises SEQ ID NO: 25 or 26. In some embodiments, the cell surface receptor is EGFR or an EGFR mutant. In some embodiments, the target cell is a cancer cell.

In some embodiments, the at least one targeting moiety comprises an immunogenic protein. In some embodiments, the immunogenic protein comprises a viral protein. In some embodiments, the viral protein comprises a viral envelope protein, a spike protein, or a combination thereof. In some embodiments, the viral protein is derived from a virus. In some embodiments, the virus comprises a respiratory virus. In some embodiments, the respiratory virus comprises a SARS-CoV-2 or an influenza virus. In some embodiments, the viral protein comprises an N-terminal domain of the SARS-CoV-2. In some embodiments, the viral protein comprises hemagglutinin (HA) of the influenza virus.

In some embodiments, the engineered viral vector further comprises a payload vector. In some embodiments, the payload vector encodes at least one therapeutic agent.

In some embodiments, the at least one therapeutic agent comprises nucleic acid molecules. In some embodiments, the nucleic acid molecules comprise DNA, RNA, or combination thereof. In some embodiments, the RNA comprises mRNA. In some embodiments, the at least one therapeutic agent comprises at least one therapeutic polypeptide. In some embodiments, the at least one therapeutic polypeptide comprises a suicide protein. In some embodiments, the suicide protein comprises a thymidine kinase, a cytosine deaminase, an IL-2, a nitroreductase (NR), a carboxylesterase, a beta-glucuronidase, a cytochrome p450, a beta-galactosidase, a diphtheria toxin A-chain (DT-A), a carboxypeptidase G2 (CPG2), a purine nucleoside phosphorylase (PNP), or a deoxycytidine kinase (dCK). In some embodiments, the thymidine kinase is derived from Herpes Simplex Virus (HSV-TK) or vesicular stomatitis virus (VSV-TK).

In some embodiments, the engineered viral vector is generated by transient transfection of a cell line. In some embodiments, the engineered viral vector is an integrating engineered viral vector. In some embodiments, the engineered viral vector is a non-integrating engineered viral vector.

In another aspect, the present disclosure provides a cell comprising the engineered viral vector described herein. In one aspect, the present disclosure provides a system comprising the engineered viral vector described herein.

In another aspect, the present disclosure provides a pharmaceutical composition comprising the engineered viral vector, or the cell, or the system described herein. In some embodiments, the pharmaceutical composition comprises at least one additional active ingredient. In some embodiments, the pharmaceutical composition comprises at least one pharmaceutically acceptable excipient. In some embodiments, the pharmaceutical composition stimulates an immune response of a subject.

In one aspect, the present disclosure provides a method of delivering a therapeutic agent to a target cell in a subject, the method comprising administering to the subject the pharmaceutical composition described herein via oral, bronchial lavage, sublingual, intratumoral, parenteral, intravenous, subcutaneous, intramuscular, intradermal, intraperitoneal, intracerebral, subarachnoid, intraocular, intrasternal, ophthalmic, endothelial, local, intranasal, intrapulmonary, rectal, intraarterial, intrathecal, inhalation, intralesional, intradermal, epidural, intracapsular, subcapsular, intracardiac, transtracheal, subcuticular, or intraspinal administration, e.g., injection or infusion.

In another aspect, the present disclosure provides a method of inducing cell kill activity in a cancer cell in a subject, the method comprising administering to the subject the engineered viral vector described herein, thereby inducing cell kill activity in the cancer cell.

In one aspect, the present disclosure provides a method of inducing an immune response in a subject, the method comprising administering to the subject the engineered viral vector described herein, thereby inducing an immune response initiated from a target cell in the subject.

BRIEF DESCRIPTION OF THE DRAWINGS

An understanding of the features and advantages of the present invention will be obtained by reference to the following detailed description that sets forth illustrative embodiments, in which the principles of the invention are utilized, and the accompanying drawings of which:

FIGS. 1A-1B show a list of Sindbis (SB) envelope mutations and an amino acid sequence of the E1 domain as described herein. FIG. 1A illustrates a series of SB envelope mutants where GVO2.2 plasmid was generated based on 2.2 plasmid, and this GVO2.2 plasmid was used as a base construct for additional modification. Gray vertical arrows indicate amino acid mutations and boxed F denotes furin cleavage site. ZZ indicates an IgG-binding domain originated from B domain of bacterial Protein A, which can bind to the Fc part of any IgG. Tm indicates a targeting moiety. FIG. 1B shows the amino acid sequence of the E1 domain of SB envelope in GVO2.2 or GVO2.2F plasmids, including the double mutations: A226Y and K227G.

FIG. 3A illustrates luciferase assay results from the transduction of wild-type A375 cells or Pit-2-KO A375 cells with the GVO2.2-pseudotyped vector conjugated with anti-HLA mAb in an antibody concentration-dependent manner. Luciferase was used as a reporter. FIG. 3B demonstrates no transduction of Pit-2-KO A375 cells with the amphotropic viral vector since anti-HLA mAb does not bind to conventional RVE viral vectors. RVE viral vectors were only able to transduce Pit-2 expressing wild-type A375 cells.

FIG. 4A illustrates luciferase assay results from SKBR3 human breast cancer cells transduced with GVO 2.2-pseudotyped viral vectors conjugated with anti-HLA or anti-CD47 mAb. Anti-CD47 mAb conjugated engineered viral vectors show limited transduction which was saturated at 0.1 µg/mL antibody concentration, demonstrating a different pattern between different antigen-antibody interactions. Luciferase was used as a reporter. FIG. 4B illustrates luciferase assay results from SKBR3 cells transduced with GVO 2.2-pseudotyped viral vectors conjugated with anti-HLA or anti-HER2 mAb in a dose-dependent manner. FIG. 4C illustrates luciferase assay results from HCT15 human colorectal cancer cells transduced with GVO 2.2-pseudotyped viral vectors conjugated with anti-HLA mAb or anti-EGFR mAb. There shows no transduction of HCT15 cells with anti-HLA mAb conjugated viral vector since HCT15 does not express HLA class I antigens on the cell surface. FIG. 4D illustrates luciferase assay results from HepG2 human liver cancer cells transduced with GVO 2.2-pseudotyped viral vectors conjugated with anti-HLA or anti-EGFR mAb with similar results as in HCT15 cells.

FIG. 5A shows the transduction of U87MG cells with the engineered viral vectors generated with GVO2.2-scFv-C-1 plasmids. Different configurations of linkers (#1-#14) were modified in each GVO2.2-scFv-C-1 plasmid. Configuration of linkers #1 to #7 corresponds to the sequences in Table 1. Configuration of linkers #8 to #14 have identical linkers to #1 to #7, but with an inverted $V_L$. FIG. 5B shows a schematic diagram of scFv configurations.

Figure 2:
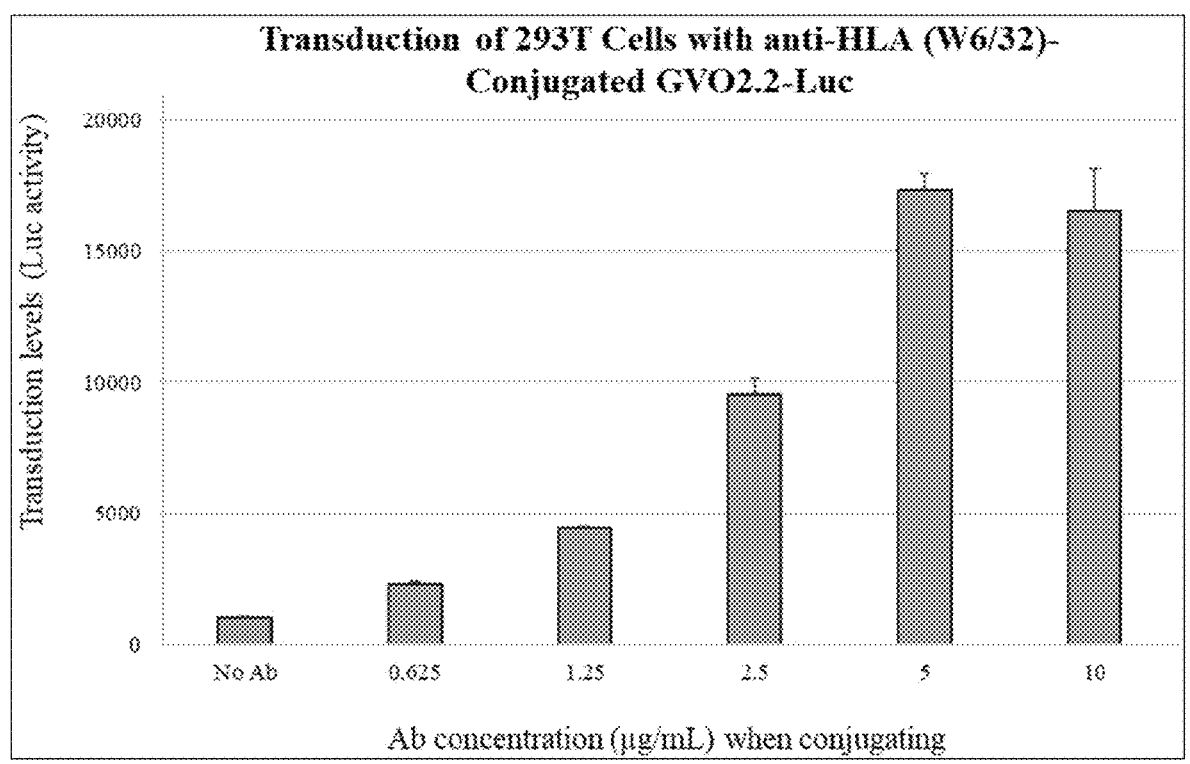
FIG. 2 illustrates transduction of 293T cells with anti-HLA monoclonal antibody (mAb)-conjugated engineered viral vectors in a dose-dependent manner. In this example, a firefly luciferase (Luc) reporter plasmid was used as the payload plasmid.

FIG. 10 illustrates transduction of SKBR3 cells with the engineered viral vectors generated with different mutations in the E1 domain. As shown, the addition of a furin site (from GVO2.2 to GVO2.2F plasmids) increased transduction. Additionally, the amino acid mutations of YG also demonstrated high transduction levels similar to the wild-type AK. All engineered viral vectors carried a luciferase reporter gene.

FIG. 11 shows luciferase activity from SKBR3 cells transduced with engineered viral vectors generated with either scFv- or DB-incorporated HER2 targeting plasmids. The data shows an increase in transduction with K2H mutations and also with the addition of furin site for both engineered viral vectors generated with scFv and DB plasmids.

FIG. 12 shows luciferase activity of two different breast cancer cell lines, SKBR3 and MDA-MB-468, transduced by engineered viral vectors generated with GVO2.2F-DB (K2H)-H-1 plasmid. SKBR3 cells overexpress HER2 while MDA-MB-468 cells are HER2 negative on the cell surface. Transduction of these two different breast cancer cell lines represents specificity of binding to target molecules per cell line with the HER2-DB-incorporated engineered viral vector.

FIGS. 13A-13B show an example of another target, nectin-4. scFv-N-1 is a single chain antibody derived from anti-nectin-4 antibody and targets nectin-4 on the cancer cell surface. FIG. 13A shows nectin-4 expression-specific transduction of the engineered viral vectors generated with GVO2.2F-scFv-N-1 plasmid in three different cells lines. Two different linker sets #5 or #6 were examined in this experiment. FIG. 13B shows cell surface staining of nectin-4 in three cancer cell lines, A375 human melanoma, PC-3 human prostate cancer cells, and MDA-MB-468 human breast cancer cells with different levels of nectin-4 expression.

FIGS. 14A-14B show ganciclovir (GCV) mediated HSV1-TK relative potency assay examined on SKBR3 cells transduced with the engineered viral vectors. FIG. 14A demonstrates that engineered viral vectors generated with GVO2.2F-scFv(K2H)-H-1 plasmid was able to transduce SKBR3 cells and expressed the HSV1-TK successfully to kill transduced cells in the presence of GCV in a titer-dependent manner at similar or superior level compared to amphotropic enveloped viral vector (RDRS20A). The same results were shown with the engineered viral vectors generated with GVO2.2F-DB(K2H)-H-1 plasmid in FIG. 14B.

FIGS. 15A-15B illustrate transduction of BT474 cells with either a single agent (GVO-2.2-scFv-C-1, GVO-2.2-scFv-H-1, or GVO2.2-DB(K2H)-H-1 vector) or a combination of two GVO-pseudotyped vectors. Luciferase was used as a reporter. FIG. 15A shows transduction results of GVO2.2-scFv-C-1, GVO2.2-scFv-H-1, and a combination of GVO2.2-scFv-C-1 and GVO2.2-scFv-H-1 in BT474 cells. FIG. 15B demonstrates transduction results of GVO2.2-scFv-C-1, GVO2.2-DB(K2H)-H-1, and a combination of GVO2.2-scFv-C-1 and GVO2.2-DB(K2H)-H-1 in BT474 cells.

FIGS. 16A-16C demonstrate an in vivo study with RVE control vector and GVO2.2F-DB(K2H)-H-1 in a SKOV3 human ovarian cancer model in immunocompromised mice. FIG. 16A illustrates the schematic diagram of the study design in human ovarian cancer model in immunocompromised mice. FIG. 16B shows effective targeted transduction results of the GVO2.2F-DB(K2H)-H-1 vector over RVE control vector in the tumor cells with a p-value of less than 0.05. The transduction is represented by the percentage of GFP+/huβ2M+ tumor cells. Statistics are calculated by one-way ANOVA. FIG. 16C shows the percentage of tumor cells within GFP-positive population in the GVO2.2F-DB (K2H)-H-1 group and the RVE control vector group.

FIG. 17A shows the percentage of GFP-positive cells among SKBR3 cells transduced with GVO2.2F-EGF Linker 5 or GVO2.2F-EGF Linker 6. NTC is the non-transduced control cells. FIG. 17B shows the percentage of GFP-positive cells among SKBR3 cells transduced with GVO2.2F-EGF Linker 5 or GVO2.2F-EGF Linker 6, as measured by flow cytometry.

FIG. 18 shows the percentage of GFP-positive cells among HT29-Luc cells transduced with RVE control vector, GVO2.2F-scFv-E-1, or GVO2.2F-EGF Linker 5. NTC is the non-transduced control cells.

FIG. 19 shows the percentage of GFP-positive cells among U87MG wild-type (U87MGwt) or U87MG-EGFRvIII cells that were transduced with RVE control vector, GVO2.2F-scFv-E-1, or GVO2.2F-EGF Linker 5. NTC is the non-transduced control cells.

FIG. 20 shows the percentage of GFP-positive cells among wild type 293T cells and EGFR-expressing 293T cells that were transduced with RVE control vector, GVO2.2F-scFv-E-1, or GVO2.2F-EGF Linker 5 at two different multiplicity of infection (MOI). NTC is the non-transduced control cells.

FIG. 21 shows transduction level (indicated by luciferase activity) of RKO cells or HT1080 cells transduced with GVO2.2F-VHH-PD-L1 original vector (VHH-PD-L1 orig) or GVO2.2F-VHH-PD-L1 optimized vector (VHH-PD-L1 delG).

FIG. 22 shows transduction level (indicated by luciferase activity) of RKO cells transduced with GVO2.2F-VHH-PD-L1 comprising a linker that is any one of v1-v6, or GVO2.2F-VHH-PD-L1 optimized vector (VHH-PD-L1 delG).

FIG. 23 shows transduction level (indicated by luciferase activity) of SKBR3 cells transduced with GVO2.2F-VHH-PD-L1 comprising a linker that is any one of v1-v6, or GVO2.2F-VHH-PD-L1 optimized vector (VHH-PD-L1 delG).

DETAILED DESCRIPTION

Therapeutic delivery to target cells, such as gene therapy, is one of the fastest-growing areas in medical research and bears the promise that it will be possible in the future to cure life-threatening diseases such as cancers, severe viral infections such as HIV, and genetic disorders. A wide range of strategies are being investigated to utilize the potential of this approach for efficient, widespread, and inexpensive clinical application. Clinical therapeutic delivery protocols sometimes rely on stable therapeutic delivery methods for long-term expression of therapeutic genes, and this approach often involves engineered viruses, e.g., retroviruses, or other viral vectors, as a delivery tool. The ability to direct therapeutic delivery to particular classes of target cells can be of importance not only to achieve therapeutic effects but also to limit any potential adverse effects or off-target effects associated with the therapeutic treatments. The methods for therapeutic delivery can also be tailored to efficiently and safely deliver therapeutic agents.

In some cases, methods such as transcriptional and transductional targeting are used for targeted therapeutic delivery. Transcriptional targeting manipulates the transgene expression by modifying the promoter for the transgene, such as tissue-specific promoters. In contrast, in transductional targeting, modified viral vectors can attach and transduce the transgene to target cells with better specificity. In viral pseudotyping, viral particles or viral vectors can be generated using viral envelope proteins from another virus to either restrict or broaden the host cell range.

As described herein, an engineered viral vector generated by pseudotyping viruses or viral vectors with envelope proteins derived from different viruses can improve transduction efficiency and specificity. Further modification of such envelope proteins can improve therapeutic delivery and specificity of the viruses or viral vectors to the target cells of interest. Moreover, delivering an engineered viral vector to a specific target enables more efficient and accurate therapeutic delivery. For example, tissue or cells refractory to conventional vectors can be targeted; microenvironmental cells concealing tumor cells can be specifically targeted before attacking tumor cells; and normal cells near the injected sites at a tumor lesion can be conserved by avoiding off-target effects. The virus particles or viral vectors can also be used for diagnostic applications with heterologous marker genes and can be used as research tools to transduce specific cell types. Further modification of viral envelope proteins provided herein can also be used to target cell to cell interactions, by expressing the targeted envelope in a cell such as a lymphocyte, and then allowing the cell to contact the targeted cell in vivo, in vitro, or ex vivo. In additional aspects, the present disclosure provides methods of delivering a therapeutic agent to a target cell in a subject using an engineered viral vector described herein. The methods disclosed herein can also be used to stimulate an immune response to a specific antigen in a subject by delivery of an engineered viral vector comprising a payload vector encoding an immunogenic protein to a target cell capable of modulating the immune response in the subject (e.g., an antigen presenting cell such as a dendritic cell).

Viral tropism can describe the ability of envelope protein of a certain virus or viral vector to bind and fuse with the membrane of certain target cells. As described herein, pseudotyping viruses or viral vectors with envelope protein derived from different viruses can be utilized for transductional targeting. Pseudotyping is the process of generating viral particles or viral vectors in combination with exogenous viral envelope proteins or non-wildtype envelope proteins. In this process, plasmids or vectors or nucleic acid constructs encoding non-surface proteins, e.g., transfer plasmid or packaging plasmid, e.g., gagpol plasmid, are used for viral vector generation along with a foreign viral envelope plasmid or a non-wildtype viral envelope plasmid. As a result, pseudotyped viral particles or pseudotyped viral vectors are generated. Because pseudotyped viral particles or pseudotyped viral vectors have foreign viral envelope proteins or non-wildtype envelope proteins instead of the wild-type envelope proteins, this method can be utilized to alter viral tropism for a specific cell type, thereby providing an improvement in targeted cell infection for therapeutic delivery.

Enveloped viruses are characterized by having a phospholipid bilayer membrane, which the viruses acquire when budding out from the host cells. Each enveloped virus has its envelope glycoprotein (envelope) gene in its genome. The envelope gene encodes a glycoprotein or "spike protein" located on the viral surface, which plays an essential role in viral transmission by promoting attachment of the viral particle to target cells' surfaces via the recognition of specific receptors. The binding target of the glycoprotein of viral envelope is generally identified. For example, the 4070A amphotropic murine leukemia virus (MLV) envelope protein targets Type-III sodium-dependent phosphate transporters (Pit-2), while the Gibbon-ape leukemia virus (GALV) envelope targets Type-III sodium-dependent phosphate transporters (Pit-1). Amphotropic 4070A envelope protein of MLV consists of a surface unit (SU) and transmembrane domain (TM), which is processed from a single polypeptide encoded by the envelope gene. Although these domains are separated during the maturation process, it remains a single protein forming a homo-trimer. The viral envelope goes through steps of binding, conformational change, and fusion following the dissociation of SU. Thus, any modification made for targeting can affect the entire envelope protein structure or conformation. Once the viral particles bind to the cell surface, a series of conformational changes that facilitate approximation of the two membranes occur, followed by fusion of the cellular and viral membranes via endocytosis or other routes. Eventually, this results in the release of the viral genome into the host cells.

Engineered Viral Vectors

In an aspect, provided herein are engineered viral vectors. In some embodiments, the engineered viral vectors comprise a modified envelope protein. In some embodiments, the modified envelope protein comprises at least one targeting moiety. In some embodiments, the modified envelope protein comprises at least one modification in an E2 domain relative to a wild-type protein sequence. In some embodiments, the wild-type protein sequence has a sequence of SEQ ID NO: 1. In some embodiments, the modified envelope protein increases transduction efficiency of the engineered viral vector to a target cell relative to a viral vector without the modified envelope protein. In some embodiments, the engineered viral vector comprises an engineered retroviral vector. In some embodiments, the engineered retroviral vector comprises an engineered gammaretroviral vector. In some embodiments, the engineered gammaretroviral vector comprises an engineered MLV vector. In some embodiments, the engineered viral vector generated by pseudotyping envelope viruses with an envelope protein derived from different viruses comprises an MLV vector with Sindbis envelope protein.

In some embodiments, the modified envelope protein comprises a recombinant viral envelope protein derived from a DNA virus. In some embodiments, the modified envelope protein comprises a recombinant viral envelope protein derived from an RNA virus. In some embodiments, the RNA virus comprises an alphavirus. In some embodiments, the alphavirus comprises a Sindbis virus.

In an aspect, Sindbis viral envelope protein can be engineered for antibody-mediated targeting, e.g., by incorporating IgG-binding domains of bacterial Protein A, a ZZ domain, into the E2 domain of SB envelope gene. This modification makes it possible to conjugate an IgG antibody against a specific protein to drive more specific binding of a target. Additionally, modification of amino acid sequence of Sindbis envelope gene can be performed to generate more efficient and specific targeting for the fusion process while maintaining high quality of viral titer. A modified Sindbis envelope can involve different modifications, e.g., a point mutation, insertion, or deletion, in the amino acid sequence of a wild-type Sindbis at an E3 domain, an E2 domain, a 6K domain, an E1 domain, or a combination thereof. The E3 domain, the E2 domain, the 6K domain, or the E1 domain can have one or more mutations. In addition, combinations of mutations in the E3 domain, the E2 domain, the 6K domain, or the E1 domain are encompassed methods described herein. Examples of wild-type sequences of Sindbis envelope protein include, but are not limited to, SEQ ID NO: 1.

As described herein, in some embodiments, the modified envelope protein derived from the Sindbis virus comprises an E3 domain, an E2 domain, a 6K domain, an E1 domain, or a combination thereof. In some embodiments, the modified envelope protein further comprises a protease cleavage site located between the E3 and E2 domains. An example of the protease cleavage site includes, but is not limited to, a furin cleavage site. Furin protease recognizes specific amino acid sequence at the furin cleavage site, thereby proteolytically cutting the target sequence. Furin protease is known to play an important role in viral envelope processing as it involves in the maturation of functional viral envelope protein. In some embodiments, the protease cleavage site comprises a furin cleavage site. In various embodiments, the protease cleavage site, e.g., a furin cleavage site, located between E3 and E2 domains is removed from the modified envelope protein.

In some embodiments, the modified envelope protein further comprises at least one targeting moiety. As described herein, targeting moiety refers to a part of viral envelope protein that is modified to improve targeting efficiency or specificity of the engineered viral vector for therapeutic delivery. In some embodiments, the at least one targeting moiety is located within the E2 domain of the Sindbis envelope protein. In some embodiments, the at least one targeting moiety comprises a conjugating moiety. In various embodiments, the at least one targeting moiety comprises a binding moiety. In some embodiments, the at least one targeting moiety comprises a ligand for a cell surface receptor. In various embodiments, the least one targeting moiety comprises an immunogenic protein.

In some embodiments, the targeting moiety can target or bind to a cell surface marker of a target cell. In some embodiments, the targeting moiety can target or bind to a marker that is expressed by a target cell. In some embodiments, the targeting moiety can target or bind to a marker that is associated with a microenvironment. In some embodiments, the targeting moiety can target or bind to a marker that is associated with a disease or condition. In some cases, the targeting moiety comprises a targeting peptide that mediates selective localization of the engineered viral vector to a particular cell, a particular cell type, a particular tissue, or a cell in a particular state (e.g., a cancerous state).

In some embodiments, the targeting moiety is configured to target a cell surface marker. In some embodiments, the cell surface marker comprises a cancer cell marker. In some embodiments, the cancer cell marker comprises CD47, CEA, HER2, EGFR, PSMA, TfR, nectin-4, muc-1, endoglin, EphA2, EphB2, folate receptor, GRP78, IGF-1R, cMET/HGFR, Tn antigen, EpCAM, avP3 integrin, CD44, mesothelin, PSCA, uPAR, CAIX, CD13, FAP-α, matriptase, MT-1 MMP, MT6-MMP, KDR, KIT, CD276, CD-83, or combination thereof. In some embodiments, the targeting moiety is configured to target CD33, CD30, HER2, CD22, CD79b, nectin-4, Trop-2, BCMA, CD19, EGFR, Folate receptor u, CD3, CD38, CD20, BCMA, CEA, PSMA, OX40, 4-1BB, CD16A, PD-1, PD-L1, CTLA-4, LAG-3, TIM3, VEGF, CD47, ICOS, MET, LGR5, IGF-1R, HER3, ANG2, DLL4, FAP, DR5, Fibronectin ED-B, Tenascin C, EpCAM, TNFα, Digoxin, GPIIb/IIIa, Crotalidae venom, Centruroides venom, CA6, PLVAP, 5T4, EDB, EGFRvIII, 6B11, CXCR4, MSLN, FN1, GPC2, GPC3, VCAN1, COL11A1, or MMR. In some embodiments, the targeting moiety is configured to target CD47, HER2, nectin-4, HLA, or EGFR. In still other embodiments, at least two target moieties are combined either together or separately with the engineered viral vectors disclosed herein. In some instances, the at least two target moieties comprise CD47, HER2, nectin-4, HLA, or EGFR. In some embodiments, the combination of target 1 moieties provides an increased effect, in some instances a synergistic effect, on activity of the engineered viral vectors disclosed herein.

In some embodiments, the cell surface marker comprises a pancreatic beta cell marker. In some embodiments, the pancreatic beta cell marker comprises CD9 or ST8SA1. In some embodiments, the targeting moiety is inserted into an E3 domain, an E2 domain, a 6K domain, or a combination thereof, of the SB envelope protein. For example, the targeting moiety (tm) can be inserted into the E2 domain of the SB envelope protein, as shown in FIG. 1A. In some embodiments, the targeting moiety can be inserted between an E3 domain, an E2 domain, a 6K domain, or a combination thereof, of the SB envelope protein. In some embodiments, the E2 domain of the SB envelope gene is engineered to incorporate IgG-binding domains of bacterial Protein A, a ZZ protein domain. In some embodiments, the targeting moiety is inserted into the same location as the ZZ protein domain located in the E2 domain of the SB envelope protein. For example, as shown in FIG. 1A, the ZZ protein domain is replaced with a targeting moiety.

In one aspect, the compositions and methods described herein can be utilized to improve targeting efficiency as well as specificity, efficacy, and safety of viral therapeutic delivery by pseudotyping of enveloped viruses such as retroviruses (e.g., murine leukemia virus) with the exogenous or a non-wildtype envelope obtained from other enveloped virus such as RNA viruses (e.g., alphavirus) to generate an engineered viral vector. Examples of enveloped viruses include, but are not limited to, DNA viruses (e.g., Herpesviruses, Poxviruses, Hepadnaviruses), RNA viruses (e.g., Flaviviruses, Alphaviruses, Togaviruses, Coronaviruses, Hepatitis D viruses, Orthomyxoviruses, Paramyxoviruses, Rhabdovirus, Bunyaviruses, Filoviruses), and retroviruses (e.g., lentiviruses, murine leukemia viruses).

In some aspects, the engineered viral vectors provided herein are viral vectors derived from retroviruses, lentiviruses, poxviruses, or herpesviruses. Examples of viral vectors can include, but are not limited to, retroviral vectors, pox vectors, baculovirus vectors, measles viral vectors, or herpes viral vectors. In some instances, the recombinant retroviral vectors comprise gamma-retroviral vectors such as vectors derived from the Moloney Murine Leukemia Virus (MoMLV, MMLV, MuLV, or MLV) or the Murine Stem cell Virus (MSCV) genome. In some embodiments, the engineered viral vector comprises an engineered gammaretroviral vector. Examples of the gammaretroviral vector that can be pseudotyped include, but are not limited to, gammaretroviral vector that encodes Chick syncytial virus, Feline leukemia virus, Finkel-Biskis-Jinkins murine sarcoma virus, Gardner-Amstein feline sarcoma virus, Gibbon ape leukemia virus, Guinea pig type-C oncovirus, Hardy-Zuckerman feline sarcoma virus, Harvey murine sarcoma virus, Kirsten murine sarcoma virus, Koala retrovirus, Moloney murine sarcoma virus, Murine leukemia virus, Porcine type-C oncovirus, Reticuloendotheliosis virus, Snyder-Theilen feline sarcoma virus, Trager duck spleen necrosis virus, Viper retrovirus, or Woolly monkey sarcoma virus. In some embodiments, the engineered viral vector comprises an engineered gammaretroviral vector. In some embodiments, the engineered gammaretroviral vector is an engineered murine leukemia viral (MLV) vector. In some instances, the engineered retroviral vectors comprise lentiviral vectors such as those derived from the human immunodeficiency virus (HIV) genome. In some instances, the engineered viral vector is a chimeric viral vector, comprising viral portions from two or more viruses. In additional instances, the engineered viral vector is a recombinant viral vector.

In some embodiments, the alphavirus comprises Aura virus, Barmah Forest virus, Bebaru virus, Caaingua virus, Cabassou virus, Chikungunya virus, Eastern equine encephalitis virus, Eilat virus, Everglades virus, Fort Morgan virus, Getah virus, Highlands J virus, Madariaga virus, Mayaro virus, Middelburg virus, Mosso das Pedras virus, Mucambo virus, Ndumu virus, O'nyong'nyong virus, Pixuna virus, Rio Negro virus, Ross River virus, Salmon pancreas disease virus, Semliki Forest virus, Sindbis virus (SB), Southern elephant seal virus, Tonate virus, Trocara virus, Una virus, Venezuelan equine encephalitis virus, Western equine encephalitis virus, or Whataroa virus.

Sindbis (SB) virus is an alphavirus with high infection and has ability to infect non-dividing cells, thus, presenting potential tools for in vivo therapeutic delivery. SB envelope gene encodes four components: E3, E2, 6K, and E1, located from N-terminal to C-terminal, respectively. These four subunits have separate functions. They are proteolytically separated and form a homo-trimer of these components, similar to the MLV envelope. In mature SB virions, the plus-stranded RNA viral genome is complexed with the capsid protein to form an icosahedral nucleocapsid surrounded by a lipid bilayer embedded with two integral membrane glycoproteins, E1 and E2, that form a heterodimer and function as a unit. E1 and E2 are anchored in the membrane independently. E2 binds to the host cell receptor. E1 can mediate membrane fusion when it is exposed. Although E3 is dissociated upon the maturation of the E2 domain, the E2 domain serves as a binding molecule, and fusion is regulated by E1. Therefore, in some embodiments, modifications of E2 do not affect the E1 structure and function, such as the fusion of the vector.

As described herein, the engineered viral vectors can be generated by transient transfection of cell lines with one or more plasmids. In some embodiments, the one or more plasmids comprise an envelope plasmid, a gagpol plasmid, and a payload plasmid. In some embodiments, the one or more plasmids comprise an envelope plasmid, a payload plasmid, a gagpol plasmid, and one or more packaging plasmids. The envelope plasmid (or an envelope vector or an envelope construct) encodes a viral envelope protein, which can be from the same or different viral species, with or without modification. In some instances, pseudotyping an engineered viral vector as described herein can use the envelope plasmid encoding a viral envelope protein from different viral species, e.g., using an envelope plasmid encoding a SB envelope protein. This can alter infectivity and provide an altered tropism. Further, a nucleic acid sequence encoding a viral envelope protein of the envelope plasmid can be modified to alter transduction efficiency and specificity. The gagpol plasmids encode a propolypeptide comprising structural components, e.g., core proteins, capsid, matrix protein, nucleoprotein, and nucleocapsid, and enzymes, e.g., protease, reverse transcriptase, integrase, and polymerase. In some embodiments, the propolypeptide encoded by a gagpol gene is separated into one or more gagpol plasmids. In some instances, the one or more gagpol plasmids comprise a first gagpol plasmid and a second gagpol plasmid. In some embodiments, the first gagpol plasmid comprises the gagpol gene with a reverse transcriptase. In some embodiments, the first gagpol plasmid comprises the gagpol gene, but not a reverse transcriptase. In some embodiments, the gagpol gene encodes a polypeptide that lacks integrase function. In some embodiments, the second gagpol plasmid comprises a reverse transcriptase. The packaging plasmids encode all of the proteins essential for transcription and packaging of an RNA copy of the payload construct into recombinant pseudoviral particles. In some embodiments, the packaging plasmid comprises a Rev, which is a transactivating protein that improves nuclear localization signal and involves in the export of unspliced or incompletely spliced mRNA to cytoplasm. Lastly, the payload plasmid (or a payload vector or a payload construct) with a packaging signal carries at least one or more genes of interest, transgene, or therapeutic agent, which can be delivered into the target cells by the engineered viral vector. The one or more plasmids are subsequently transfected to the packaging cells to generate the engineered viral particles or viral vector. After the assembly, the engineered viral vectors are released from the packaging cells, and these engineered viral vectors can comprise a payload, e.g., gene of interest, transgene, or therapeutic agent, for therapeutic delivery. Other methods can be utilized to generate the engineered viral vector described herein. In some embodiments, the engineered viral vector as described herein is a replication competent engineered viral vector. In some embodiments, the engineered viral vector is oncolytic engineered viral vector. In various embodiments, the engineered viral vector is replication incompetent engineered viral vector. In some embodiments, the engineered viral vector is an integrating engineered viral vector. In some embodiments, the engineered viral vector is a non-integrating engineered viral vector.

In some instances, generation of the engineered viral vector can be produced using one or more modified plasmids. In some embodiments, the one or more modified plasmids comprise one or more modified gagpol plasmids. In some embodiments, the one or more modified gagpol plasmids comprise a modified viral gagpol gene or a mutant viral gagpol gene compared to the wild-type gagpol gene.

In some embodiments, the viral gagpol gene is a wild-type gagpol gene. In some embodiments, the engineered viral vector generated with the wild-type gagpol gene is an integrating engineered viral vector. In some instances, the viral gagpol gene is modified or mutated, and this can affect the integration ability of the engineered viral vector. In some embodiments, the viral gagpol gene is a mutant gagpol gene. For example, the integrase of the gagpol gene is modified by mutating the nucleic acid sequence encoding the integrase, thereby affecting the integration ability of the engineered viral vector. In some embodiments, the integrase is a wild-type integrase. In some embodiments, the mutant gagpol gene lacks integrase function. In some embodiments, the integrase is a modified integrase. In some embodiments, the modified integrase lacks integrase function. In some embodiments, the modified integrase comprises a mutation, e.g., deletion or insertion, that affects integration ability. In some embodiments, the engineered viral vector generated with the mutant gagpol gene is a non-integrating engineered viral vector. In some embodiments, the engineered viral vector generated with the modified integrase is a non-integrating engineered viral vector.

In some embodiments, the engineered viral vector comprises an engineered murine leukemia viral (MLV) vector. In some instances, the engineered MLV vector is generated by one or more plasmids, which are the modified SB protein plasmid, one or more viral gagpol plasmid, and a payload plasmid, inside a packaging cell. In some embodiments, the one or more viral gagpol plasmids comprise at least one structural protein and at least one polymerase. In some embodiments, the one or more viral gagpol plasmids comprise a viral gagpol gene. In some embodiments, the viral gagpol gene is a murine leukemia viral (MLV) gagpol gene.

Conjugating Moiety

In various aspects of engineered viral vectors provided herein, in some embodiments, the engineered viral vector comprises a conjugating moiety. As described herein, a conjugating moiety refers to a type of targeting moiety that is modified on the envelope protein for conjugation with an antibody or antigen binding fragment thereof after the engineered viral vectors are generated. In some embodiments, the engineered viral vectors with a conjugating moiety on the envelope protein can be incubated with an antibody or antigen binding fragment before being used for therapeutic delivery to a target cell.

In some embodiments, the conjugation of the conjugating moiety is an affinity-binding conjugation. In some embodiments, the conjugating moiety comprises an IgG-binding domain, an IgA-binding domain, an IgM-binding domain, an IgD-binding domain, an IgE-binding domain, or a combination thereof. In some embodiments, the conjugating moiety comprises an IgG-binding domain. In some embodiments, the IgG-binding domain is derived from a bacterial protein. In some embodiments, the bacterial protein is a bacterial Protein A. In some embodiments, the bacterial protein A is derived from *Staphylococcus aureus*. In some embodiments, the IgG-binding domain of the bacteria protein is a ZZ protein domain. In some embodiments, the ZZ protein domain comprises a Fc region-binding domain. In some embodiments, the ZZ protein domain is a non-viral domain. For example, the ZZ protein domain can be obtained from a mammal, a plant, a bacterium, or an insect origin. In some embodiments, the ZZ protein domain can be inserted into an E3 domain, an E2 domain, a 6K domain, or a combination thereof, of the SB envelope protein. In some embodiments, the ZZ protein domain can be inserted into an E2 domain of the SB envelope protein, as shown in FIG. 1. In some embodiments, the ZZ protein domain can be inserted into between an E3 domain, an E2 domain, a 6K domain, or a combination thereof, of the SB envelope protein. For example, the ZZ protein domain can be inserted between the E3 and E2 domains of the SB envelope protein.

In some embodiments, the ZZ protein domain is conjugated with an antibody or antigen binding fragment thereof.

In some embodiments, the engineered viral vector is further conjugated with an antibody or antigen binding fragment thereof. In some embodiments, the antibody or antigen binding fragment thereof comprises an IgG-scFv, a single variable domain on a heavy chain (VHH), a nanobody, a BiTE, a diabody, a DART, a TandAb, a scDiabody, a scDiabody-CH3, a triple body, a mini-antibody, a minibody, a TriBi minibody, a scFv-CH3 KIH, a Fab-scFv-Fc KIH, a Fab-scFv, a scFv-CH-CL-scFv, a F(ab')2, a F(ab')2-scFv2, a scFv-KIH, a Fab-scFv-Fc, a tetravalent HCAb, a scDiabody-Fc, a diabody-Fc, a tandem scFv-Fc, an intrabody, a binding fragment thereof, a chemically modified derivative thereof, a heavy chain of the variable fragment ($V_H$), a light chain of the variable fragment ($V_L$), or a combination thereof.

In some embodiments, the antibody or antigen binding fragment thereof binds to a target ligand of the target cell. In some embodiments, the target cell is a healthy cell. In some embodiments, the target cell is a non-healthy cell. In some embodiments, the target cell is a normal cell. In some embodiments, the target cell is an abnormal cell. In some embodiments, the target cell is a wild-type cell. In some embodiments, the target cell is a mutated cell. In some embodiments, the target cell is a cancer cell. In some embodiments, the cancer cell comprises a human cancer cell. In some embodiments, the cancer cell comprises a leukemia cell, a myeloblastic cell, a promyelocytic cell, a myelomonocytic cell, a monocytic cell, an erythroleukemia cell, a chronic myelocytic (granulocytic) leukemia cell, a chronic lymphocytic leukemia cell, a lymphoma cell, e.g. Hodgkin's disease and non-Hodgkin's disease, a fibrosarcoma cell, a myosarcoma cell, a liposarcoma cell, a chondrosarcoma cell, an osteogenic sarcoma cell, an angiosarcoma cell, an endotheliosarcoma cell, an Ewing's tumor cell, a colon cancer cell, a pancreatic cancer cell, a breast cancer cell, an ovarian cancer cell, a prostate cancer cell, a squamous cell carcinoma cell, a basal cell carcinoma cell, an adenocarcinoma cell, a renal cell carcinoma cell, hepatoma cell, a Wilms' tumor cell, a cervical cancer cell, an uterine cancer cell, a testicular tumor cell, a lung carcinoma cell, a small cell lung carcinoma cell, a bladder carcinoma cell, an epithelial carcinoma cell, a glioma cell, an astrocytoma cell, an oligodendroglioma cell, a melanoma cell, neuro-blastoma cell, a retinoblastoma cell, a dysplasia and hyperplasia cell, a prostatitis cell, a benign prostatic hypertrophic cell, a benign prostatic hyperplasia (BPH) cell, a prostatic paraganglioma cell, a prostate adenocarcinoma cell, a prostatic intraepithelial neoplasia cell, a prostato-rectal fistulas cell, an atypical prostatic stromal lesion cell, a bladder cancer cell, a lung cancer cell, a head and neck cancer cell, a non-small cell lung cancer cell, a kidney cancer cell, or a glioblastoma cell. In some embodiments, the cancer cell comprises a breast cancer cell, a colon cancer cell, a bladder cancer cell, a lung cancer cell, a head and neck cancer cell, a squamous cell carcinoma, a pancreatic cancer cell, a prostate cancer cell, a melanoma cell, a non-small cell lung cancer cell, a kidney cancer cell, a glioblastoma cell, a Merkel Cell cancer cell, an angiosarcoma cell, a cutaneous T-cell lymphoma cell, a cutaneous B-cell lymphoma cell, a dermatofibrocarcoma protuberans cell, a Sebaceous carcinoma cell, or a cutaneious neuroendocrine carcinoma cell.

In some embodiments, the antibody or antigen binding fragment thereof binds to the target ligand located on a cell surface of the target cell. In some embodiments, the target ligand comprises a cell surface marker. In some embodiments, the cell surface marker comprises a cancer cell marker. In some embodiments, the cancer cell marker comprises CD47, CEA, HER2, EGFR, PSMA, TfR, nectin-4, muc-1, endoglin, EphA2, EphB2, folate receptor, GRP78, IGF-1R, cMET/HGFR, Tn antigen, EpCAM, avP3 integrin, CD44, mesothelin, PSCA, uPAR, CAIX, CD13, FAP-α, matriptase, MT-1 MMP, MT6-MMP, KDR, KIT, CD276, CD-83, or combination thereof. In some embodiments, the target ligand comprises CD33, CD30, HER2, CD22, CD79b, nectin-4, Trop-2, BCMA, CD19, EGFR, Folate receptor a, CD3, CD38, CD20, BCMA, CEA, PSMA, OX40, 4-1BB, CD16A, PD-1, PD-L1, CTLA-4, LAG-3, TIM3, VEGF, CD47, ICOS, MET, LGR5, IGF-1R, HER3, ANG2, DLL4, FAP, DR5, Fibronectin ED-B, Tenascin C, EpCAM, TNFα, Digoxin, GPIIb/IIIa, Crotalidae venom, Centruroides venom, CA6, PLVAP, 5T4, EDB, EGFRvIII, 6B11, CXCR4, MSLN, FN1, GPC2, GPC3, VCAN1, COL11A1, or MMR. In some embodiments, the engineered viral vectors are conjugated with an anti-CD47 antibody, an anti-HER2 antibody, an anti-nectin-4 antibody, an anti-HLA antibody, or an anti-EGFR antibody. In some embodiments, the engineered viral vectors are conjugated with an anti-CD47 antibody generated from clone BRIC126. In some embodiments, the engineered viral vectors are conjugated with an anti-HER2 antibody, trastuzumab, or an anti-HER2 antibody generated from clone 191924. In some embodiments, the nucleic acid sequence encodes the anti-HER2 antibody trastuzumab. In some embodiments, the nucleic acid sequence encodes the anti-nectin-4 antibody Enfortumab vedotin. In some embodiments, the engineered viral vectors are conjugated with anti-EGFR antibody clone 528. In some embodiments, the engineered viral vectors are conjugated with anti-HLA antibody clone W6/32. In still other embodiments, at least two antibodies are combined either together or separately with the engineered viral vectors disclosed herein. In some instances, the at least two antibodies comprise CD47, HER2, nectin-4, HLA, or EGFR. In some embodiments, the combination of antibodies provides an increased effect, in some instances a synergistic effect, on activity of the engineered viral vectors disclosed herein.

In some embodiments, the cell surface marker comprises a pancreatic beta cell marker. In some embodiments, the pancreatic beta cell marker comprises CD9 or ST8SA1.

Blocking interaction of an immune checkpoint protein and an immune checkpoint receptor such as programmed death receptor 1 (PD-1) or its ligand (PD-L1) allows immune cells to kill cancer cells. In some embodiments, the target ligand of the target cell comprises an immune checkpoint protein or an immune checkpoint receptor. In some embodiments, the target ligand of the target cell is an immune checkpoint protein. In some embodiments, the immune checkpoint protein comprises PD-L1, cytotoxic T cell lymphocyte-associated protein 4 (CTLA-4), B7RP1, HVEM, CD137L, OX40L, CD40, CD70, GAL9, MHCII, CD47, VISTA, or GITR. In some embodiments, the target ligand of the target cell is an immune checkpoint receptor. In some embodiments, the immune checkpoint receptor comprises PD-1, ICOS (CD278), BTLA, CD137 (4-IBB), OX40 (CD134), CD40L, CD27, TIM3, CD20, or LAG3. In some embodiments, the target cell is an immune cell. In some embodiments, the immune cell comprises a T cell, a B cell, a macrophage, a NK cell, or a dendritic cell.

In some embodiments, the target ligand of the target cell comprises a cell surface antigen. Examples of the cell surface antigen include, but are not limited to, a cell surface protein e.g., human leukocyte antigen (HLA), a cell surface glycoprotein, and a transporter, e.g., type III sodium-dependent phosphate transporter (Pit-2).

Binding Moiety

In some aspects of engineered viral vectors provided herein, in some embodiments, modification of a nucleic acid sequence encoding a viral envelope protein of the envelope plasmid (or envelope vector) is performed to incorporate a binding moiety into the envelope protein of the engineered viral vectors. As described herein, a binding moiety refers to a type of targeting moiety that is modified on the envelope protein and is derived from a nucleic acid sequence encoding antibody or antigen binding fragment. In some embodiments, once the engineered viral vectors are generated, the envelope protein of these engineered viral vectors can express the binding moiety, which can bind to specific targets, such as an antigen, ligand, or receptor, of the target cells, thereby increasing transduction and targeting efficiency. In some embodiments, the binding moiety is part of the envelope protein. In some embodiments, once the engineered viral vectors are generated, the envelope protein of these engineered viral vectors can express the binding moiety, which can bind to a polypeptide, a small molecule, a compound, an agent, an enzyme, a biomolecule, a target protein, or a combination thereof. In some embodiments, the engineered viral vectors with a binding moiety on the envelope protein can be incubated with a polypeptide, a small molecule, a compound, an agent, an enzyme, a biomolecule, a target protein, or a combination thereof, before being used for therapeutic delivery to a target cell.

In some embodiments, the binding moiety comprises a conjugation site. In some embodiments, the conjugation site comprises an antibody or antigen binding fragment, which can bind to a polypeptide, a small molecule, a compound, an agent, an enzyme, a biomolecule, a target protein, or a combination thereof. In some embodiments, conjugation of the binding moiety comprises a non-specific conjugation. In some embodiments, conjugation of the binding moiety comprises a site-specific conjugation. In some embodiments, conjugation of the binding moiety comprises an affinity-binding conjugation, an enzymatic-linked conjugation, or a chemically-linked conjugation.

In some embodiments, the binding moiety comprises an antibody or antigen binding fragment that is encoded by a nucleic acid sequence inserted into the nucleic acid sequence of the viral envelope plasmid, e.g., SB envelope plasmid. In some embodiments, the binding moiety is modified to bind to a target ligand expressed on cell surface of the target cells. Examples of the binding moiety include, but are not limited to the, a single-chain variable fragment (scFv), a diabody (DB), an IgG-scFv, a single variable domain on a heavy chain (VHH), a nanobody, a BiTE, a DART, a TandAb, a scDiabody, a scDiabody-CH3, a triple body, a mini-antibody, a minibody, a TriBi minibody, a scFv-CH3 KIH, a Fab-scFv-Fc KIH, a Fab-scFv, a scFv-CH-CL-scFv, a F(ab')2, a F(ab')2-scFv2, a scFv-KIH, a Fab-scFv-Fc, a tetravalent HCAb, a scDiabody-Fc, a diabody-Fc, a tandem scFv-Fc, a intrabody, a binding fragment thereof, a chemically modified derivative thereof, a heavy chain of the variable fragment ($V_H$), or a light chain of the variable fragment ($V_L$). In some embodiments, the binding moiety comprises a single-chain variable fragment (scFv), a diabody, or a single variable domain on a heavy chain (VHH), which are encoded from a nucleic acid sequence of an antibody.

In some embodiments, the binding moiety comprises a nucleic acid sequence encoding an antigen binding fragment thereof. In some embodiments, the antigen binding fragment thereof binds to a target ligand of the target cell. In some embodiments, the target cell comprises a cancer cell. In some embodiments, the cancer cell comprises a human cancer cell. In some embodiments, the cancer cell comprises a leukemia cell, a myeloblastic cell, a promyelocytic cell, a myelomonocytic cell, a monocytic cell, an erythroleukemia cell, a chronic myelocytic (granulocytic) leukemia cell, a chronic lymphocytic leukemia cell, a lymphoma cell, e.g. Hodgkin's disease and non-Hodgkin's disease, a fibrosarcoma cell, a myosarcoma cell, a liposarcoma cell, a chondrosarcoma cell, an osteogenic sarcoma cell, an angiosarcoma cell, an endotheliosarcoma cell, an Ewing's tumor cell, a colon cancer cell, a pancreatic cancer cell, a breast cancer cell, an ovarian cancer cell, a prostate cancer cell, a squamous cell carcinoma cell, a basal cell carcinoma cell, an adenocarcinoma cell, a renal cell carcinoma cell, hepatoma cell, a Wilms' tumor cell, a cervical cancer cell, an uterine cancer cell, a testicular tumor cell, a lung carcinoma cell, a small cell lung carcinoma cell, a bladder carcinoma cell, an epithelial carcinoma cell, a glioma cell, an astrocytoma cell, an oligodendroglioma cell, a melanoma cell, neuro-blastoma cell, a retinoblastoma cell, a dysplasia and hyperplasia cell, a prostatitis cell, a benign prostatic hypertrophic cell, a benign prostatic hyperplasia (BPH) cell, a prostatic paraganglioma cell, a prostate adenocarcinoma cell, a prostatic intraepithelial neoplasia cell, a prostato-rectal fistulas cell, an atypical prostatic stromal lesion cell, a bladder cancer cell, a lung cancer cell, a head and neck cancer cell, a non-small cell lung cancer cell, a kidney cancer cell, a glioblastoma cell, a Merkel Cell cancer cell, an angiosarcoma cell, a cutaneous T-cell lymphoma cell, a cutaneous B-cell lymphoma cell, a dermatofibrocarcoma protuberans cell, a Sebaceous carcinoma cell, or a cutaneious neuroendocrine carcinoma cell. In some embodiments, the target ligand comprises a cell surface marker. In some embodiments, the cell surface marker comprises a cancer cell marker. In some embodiments, the cancer cell marker comprises CD47, CEA, HER2, EGFR, PSMA, TfR, nectin-4, muc-1, endoglin, EphA2, EphB2, folate receptor, GRP78, IGF-1R, cMET/HGFR, Tn antigen, EpCAM, avP3 integrin, CD44, mesothelin, PSCA, uPAR, CAIX, CD13, FAP-α, matriptase, MT-1 MMP, MT6-MMP, KDR, KIT, CD276, CD-83, or combination thereof. Other cell markers include, but are not limited to, all known cluster of differentiation (CD) markers, e.g., CD4, CD8, CD19, CD20, CD33, CD34, CD133, tumor antigens exposed on the cell surface, e.g., mucin-1, surface molecules of cells of the nervous system, e.g., neurotransmitter receptors, such as the acetylcholine or GABA receptors, growth factor receptors, e.g., EGFR and VEGFR-2, olfactory receptors, and G-protein-coupled receptors. In some embodiments, the cell surface marker comprises a pancreatic beta cell marker. In some embodiments, the pancreatic beta cell marker comprises CD9 or ST8SA1.

In some embodiments, the target ligand comprises CD33, CD30, HER2, CD22, CD79b, nectin-4, Trop-2, BCMA, CD19, EGFR, Folate receptor a, CD3, CD38, CD20, BCMA, CEA, PSMA, OX40, 4-1BB, CD16A, PD-1, PD-L1, CTLA-4, LAG-3, TIM3, VEGF, CD47, ICOS, MET, LGR5, IGF-1R, HER3, ANG2, DLL4, FAP, DR5, Fibronectin ED-B, Tenascin C, EpCAM, TNFα, Digoxin, GPIIb/IIIa, Crotalidae venom, Centruroides venom, CA6, PLVAP, 5T4, EDB, EGFRvIII, 6B11, CXCR4, MSLN, FN1, GPC2, GPC3, VCAN1, COL11A1, or MMR. In some embodiments, the binding moiety is encoded by a nucleic acid sequence derived from an anti-CD47 antibody, an anti-HER2 antibody, an anti-nectin-4 antibody, or an anti-EGFR antibody. In some embodiments, the nucleic acid sequence encodes the anti-CD47 antibody clone BRIC126. In some embodiments, the nucleic acid sequence encodes the anti-HER2 antibody trastuzumab or clone 191924. In some embodiments, the nucleic acid sequence encodes the anti-nectin-4 antibody Enfortumab vedotin. In some embodiments, the nucleic acid sequence encodes the anti-EGFR antibody clone 528. In some embodiments, the nucleic acid sequence encodes the anti-HLA antibody clone W6/32.

In some embodiments, the target ligand of the target cell comprises an immune checkpoint protein or an immune checkpoint receptor. In some embodiments, the target ligand of the target cell is an immune checkpoint protein. In some embodiments, the immune checkpoint protein comprises PD-L1, cytotoxic T cell lymphocyte-associated protein 4 (CTLA-4), B7RP1, HVEM, CD137L, OX40L, CD40, CD70, GAL9, MHCII, CD47, VISTA, or GITR. In some embodiments, the target ligand of the target cell is an immune checkpoint receptor. In some embodiments, the immune checkpoint receptor comprises PD-1, ICOS (CD278), BTLA, CD137 (4-IBB), OX40 (CD134), CD40L, CD27, TIM3, CD20, or LAG3. In some embodiments, the target cell is an immune cell. In some embodiments, the immune cell comprises a T cell, a B cell, a macrophage, a NK cell, or a dendritic cell.

In some embodiments, the target ligand of the target cell comprises a cell surface antigen. Examples of the cell surface antigen include, but are not limited to, a cell surface protein e.g., human leukocyte antigen (HLA), a cell surface glycoprotein, and a transporter, e.g., type III sodium-dependent phosphate transporter (Pit-2).

Single-Chain Variable Fragment (scFv)

In some embodiments, the binding moiety comprises a scFv. In some embodiments, scFv is an artificial construct that has a heavy chain and a light chain of an immunoglobin connected with a peptide linker. In contrast to a 150 kDa immunoglobulin molecule, in some embodiments, scFv is about 25 kDa. In some instances, the nucleic acid sequence encoding a scFv can be obtained by sequencing the amino acid sequences of heavy and light chains of an antibody. Information of the amino acid sequences is then used to create a nucleic acid sequence encoding a scFv. This nucleic acid sequence encoding the scFv, in some embodiments, is designed and generated to be flanked by restriction enzyme sites at both ends, so that the nucleic acid sequence can be incorporated into the envelope plasmid (or envelope vector) that has the same restriction enzyme sites. In some instances, the restriction enzyme sites at both ends of the nucleic acid sequence encoding the scFv are the same restriction enzyme sites. In some instances, the restriction enzyme sites at both ends of the nucleic acid sequence encoding the scFv are different restriction enzyme sites. In some embodiments, the nucleic acid sequence further comprises at least one restriction enzyme site. In some embodiments, the at least one restriction enzyme site is located upstream, downstream, or combination thereof, of the nucleic acid sequence in the E2 domain. In some embodiments, the at least one restriction enzyme site comprises BstEII sites.

In some embodiments, the scFv is encoded by a nucleic acid sequence inserted into the E2 domain of a SB envelope plasmid, and the nucleic acid sequence encodes at least one linker, a heavy chain of the variable fragment ($V_H$), or a light chain of the variable fragment ($V_L$). In some instances, the at least one linker assists folding structure of the modified envelope protein, e.g., modified SB envelope protein, thereby increasing transduction efficiency. The length of the at least one linker can also affect transduction efficiency. In some embodiments, the binding moiety and an envelope protein encoded by the modified envelope gene are connected by at least one peptide linker. In various embodiments, linkers have virtually any sequence that results in a generally flexible peptide. In some embodiments, the entire nucleic acid insert is flanked by nucleic acid sequence encoding cysteine residues, which can create a loop structure, closed by a disulfide bond. In some embodiments, the entire nucleic acid insert is flanked by restriction enzyme sites.

In some embodiments, the scFv is encoded by a nucleic acid sequence inserted into the E2 domain of a SB envelope plasmid, wherein the nucleic acid sequence encodes at least one base-linker, a heavy chain of the variable fragment ($V_H$), at least one mid-linker, or a light chain of the variable fragment ($V_L$). In some embodiments, at least one nucleic acid sequence encoding at least one scFv is inserted into the nucleic acid sequence in the E2 domain of the SB envelope plasmid. In some embodiments, the scFv is encoded from a nucleic acid sequence in the E2 domain, wherein the nucleic acid sequence encodes a first base-linker, a $V_H$, a mid-linker, a $V_L$, and a second base-linker, from the 5' end to the 3' end of the nucleic acid sequence. In some embodiments, the nucleic acid sequences encoding the $V_H$ or the $V_L$ of the scFv are derived from the same antibody. In some embodiments, the nucleic acid sequences encoding the $V_H$ or the $V_L$ of the scFv are derived from different antibodies.

In some embodiments, the scFv is encoded by a nucleic acid sequence derived from the antibody to target CD47, CEA, HER2, EGFR, PSMA, TfR, nectin-4, muc-1, endoglin, EphA2, EphB2, folate receptor, GRP78, IGF-1R, cMET/HGFR, Tn antigen, EpCAM, avβ3 integrin, CD44, mesothelin, PSCA, uPAR, CAIX, CD13, FAP-α, matriptase, MT-1 MMP, MT6-MMP, KDR, KIT, CD276, CD-83, or combination thereof. In some embodiments, the scFv is encoded by a nucleic acid sequence derived from the antibody to target CD33, CD30, HER2, CD22, CD79b, nectin-4, Trop-2, BCMA, CD19, EGFR, Folate receptor u, CD3, CD38, CD20, BCMA, CEA, PSMA, OX40, 4-1BB, CD16A, PD-1, PD-L1, CTLA-4, LAG-3, TIM3, VEGF, CD47, ICOS, MET, LGR5, IGF-1R, HER3, ANG2, DLL4, FAP, DR5, Fibronectin ED-B, Tenascin C, EpCAM, TNFα, Digoxin, GPIIb/IIIa, Crotalidae venom, Centruroides venom, CA6, PLVAP, 5T4, EDB, EGFRvIII, 6B11, CXCR4, MSLN, FN1, GPC2, GPC3, VCAN1, COL11A1, or MMR. In some embodiments, the scFv is encoded by a nucleic acid sequence derived from an anti-CD47 antibody, an anti-HER2 antibody, an anti-nectin-4 antibody, an anti-HLA antibody, or an anti-EGFR antibody. In some embodiments, the nucleic acid sequence encodes the anti-CD47 antibody clone BRIC126. In some embodiments, the nucleic acid sequence encodes the anti-HER2 antibody, trastuzumab, or clone 191924. In some embodiments, the nucleic acid sequence encodes the anti-nectin-4 antibody Enfortumab vedotin. In some embodiments, the nucleic acid sequence encodes the anti-EGFR antibody clone 528. In some embodiments, the nucleic acid sequence encodes the anti-HLA antibody clone W6/32.

In some instances, the orientation of a $V_H$ and a $V_L$ can affect folding and stability of protein. In some embodiments, the orientation of the $V_H$ and the $V_L$ is the same from the N-terminus to the C-terminus of the envelope protein. For example, the orientation of both $V_H$ and $V_L$ are not inverted, or both $V_H$ and $V_L$ are inverted, from the N-terminus to the C-terminus of the envelope protein. In some embodiments, the orientation of the $V_H$ and the $V_L$ is different from the N-terminus to the C-terminus of the envelope protein. Examples of different orientation of the $V_H$ and $V_L$, include, but are not limited to, the $V_H$ is inverted but the $V_L$ is not, the $V_L$ is inverted but the $V_H$ is not, from the N-terminus to the C-terminus of the envelope protein. In some embodiments, the orientation of the $V_H$ is inverted. In some embodiments, the orientation of the $V_L$ is inverted.

In some embodiments, the at least one linker comprises a peptide linker. In some embodiments, the at least one linker comprises at least one base-linker. In some embodiments, the at least one linker comprises at least two base-linkers. In some embodiments, the at least one linker comprises at least one mid-linker. In some embodiments, the at least one linker comprises at least two mid-linkers. In some embodiments, the at least one linker comprises at least three mid-linkers. In some embodiments, the at least one linker comprises at least four mid-linkers. In some embodiments, the at least one linker comprises at least five mid-linkers. In some embodiments, the at least one linker comprises at least six mid-linkers.

In some embodiments, the at least one linker comprises at least one base-linker and at least one mid-linker. In some embodiments, the at least one linker comprises at least two base-linkers and at least one mid-linker.

In some embodiments, the at least one linker comprises at least one mid-linker and at least one base-linker. In some embodiments, the at least one linker comprises at least two mid-linkers and at least one base-linker. In some embodiments, the at least one linker comprises at least three mid-linkers and at least one base-linker. In some embodiments, the at least one linker comprises at least four mid-linkers and at least one base-linker. In some embodiments, the at least one linker comprises at least five mid-linkers and at least one base-linker. In some embodiments, the at least one linker comprises at least six mid-linkers and at least one base-linker.

In some embodiments, the at least one linker comprises at least one mid-linker and at least two base-linkers. In some embodiments, the at least one linker comprises at least two mid-linkers and at least two base-linkers. In some embodiments, the at least one linker comprises at least three mid-linkers and at least two base-linkers. In some embodiments, the at least one linker comprises at least four mid-linkers and at least two base-linkers. In some embodiments, the at least one linker comprises at least five mid-linkers and at least two base-linkers. In some embodiments, the at least one linker comprises at least six mid-linkers and at least two base-linkers.

In some embodiments, the at least one linker comprises the same linker. In some embodiments, the at least one linker comprises different linkers. In some embodiments, the different linkers comprise different peptide linker sequence. In some embodiments, the different linkers comprise different length of linker.

In some embodiments, the at least one base-linker comprises at least 5 amino acids, at least 6 amino acids, at least 7 amino acids, at least 8 amino acids, at least 9 amino acids, at least 10 amino acids, at least 11 amino acids, at least 12 amino acids, at least 13 amino acids, at least 14 amino acids, at least 15 amino acids, at least 16 amino acids, at least 17 amino acids, at least 18 amino acids, at least 19 amino acids, at least 20 amino acids, at least 21 amino acids, at least 22 amino acids, at least 23 amino acids, at least 24 amino acids, at least 25 amino acids, at least 26 amino acids, at least 27 amino acids, at least 28 amino acids, at least 29 amino acids, at least 30 amino acids, at least 31 amino acids, at least 32 amino acids, at least 33 amino acids, at least 34 amino acids, or at least 35 amino acids.

In some embodiments, the at least one base-linker comprises at most 5 amino acids, at most 6 amino acids, at most 7 amino acids, at most 8 amino acids, at most 9 amino acids, at most 10 amino acids, at most 11 amino acids, at most 12 amino acids, at most 13 amino acids, at most 14 amino acids, at most 15 amino acids, at most 16 amino acids, at most 17 amino acids, at most 18 amino acids, at most 19 amino acids, at most 20 amino acids, at most 21 amino acids, at most 22 amino acids, at most 23 amino acids, at most 24 amino acids, at most 25 amino acids, at most 26 amino acids, at most 27 amino acids, at most 28 amino acids, at most 29 amino acids, at most 30 amino acids, at most 31 amino acids, at most 32 amino acids, at most 33 amino acids, at most 34 amino acids, or at most 35 amino acids.

In some embodiments, the at least one base-linker comprises between 5 to 35 amino acids, 6 to 35 amino acids, 7 to 35 amino acids, 8 to 35 amino acids, 9 to 35 amino acids, 10 to 35 amino acids, 11 to 35 amino acids, 12 to 35 amino acids, 13 to 35 amino acids, 14 to 35 amino acids, 15 to 35 amino acids, 16 to 35 amino acids, 17 to 35 amino acids, 18 to 35 amino acids, 19 to 35 amino acids, 20 to 35 amino acids, 21 to 35 amino acids, 22 to 35 amino acids, 23 to 35 amino acids, 24 to 35 amino acids, 25 to 35 amino acids, 26 to 35 amino acids, 27 to 35 amino acids, 28 to 35 amino acids, 29 to 35 amino acids, 30 to 35 amino acids, 31 to 35 amino acids, 32 to 35 amino acids, 33 to 35 amino acids, or 34 to 35 amino acids. In some embodiments, the at least one base-linker comprises between 5 to 25 amino acids, between 6 to 25 amino acids, between 7 to 25 amino acids, between 8 to 25 amino acids, between 9 to 25 amino acids, between 10 to 25 amino acids, between 11 to 25 amino acids, between 12 to 25 amino acids, between 13 to 25 amino acids, between 14 to 25 amino acids, between 15 to 25 amino acids, between 16 to 25 amino acids, between 17 to 25 amino acids, between 18 to 25 amino acids, between 19 to 25 amino acids, between 20 to 25 amino acids, between 21 to 25 amino acids, between 22 to 25 amino acids, between 23 to 25 amino acids, or between 24 to 25 amino acids.

In some embodiments, the at least one base-linker comprises 4 amino acids, 5 amino acids, 6 amino acids, 7 amino acids, 8 amino acids, 9 amino acids, 10 amino acids, 11 amino acids, 12 amino acids, 13 amino acids, 14 amino acids, 15 amino acids, 16 amino acids, 17 amino acids, 18 amino acids, 19 amino acids, 20 amino acids, 21 amino acids, 22 amino acids, 23 amino acids, 24 amino acids, 25 amino acids, 26 amino acids, 27 amino acids, 28 amino acids, 29 amino acids, 30 amino acids, 31 amino acids, 32 amino acids, 33 amino acids, 34 amino acids, or 35 amino acids.

Non-limiting examples of the at least one linker provided herein are found in Table 1 (SEQ ID NOs. 2-8). In some embodiments, the at least one base-linker comprises GGGGSGGGGS (SEQ ID NO: 2); GSTGSGSKPGSGEGSTKG (SEQ ID NO:3; Whitlow/218 linker as described in Whitlow et al., Protein Eng, 1993, 6:989-95, which is incorporated by reference); ESKYGPPCPSCPAPEFLGGP (SEQ ID NO: 4; IgG4 hinge region between Fac and Fc); EPKSCDKTHTCPPCPAPELLGGP (SEQ ID NO: 5; hIgG1 hinge region), or AAGHVG (SEQ ID NO: 6).

In some embodiments, the mid-linker comprises at least 5 amino acids, at least 6 amino acids, at least 7 amino acids, at least 8 amino acids, at least 9 amino acids, at least 10 amino acids, at least 11 amino acids, at least 12 amino acids, at least 13 amino acids, at least 14 amino acids, at least 15 amino acids, at least 16 amino acids, at least 17 amino acids, at least 18 amino acids, at least 19 amino acids, at least 20 amino acids, at least 21 amino acids, at least 22 amino acids, at least 23 amino acids, at least 24 amino acids, at least 25 amino acids, at least 26 amino acids, at least 27 amino acids, at least 28 amino acids, at least 29 amino acids, at least 30 amino acids, at least 31 amino acids, at least 32 amino acids, at least 33 amino acids, at least 34 amino acids, or at least 35 amino acids.

In some embodiments, the mid-linker comprises at most 5 amino acids, at most 6 amino acids, at most 7 amino acids, at most 8 amino acids, at most 9 amino acids, at most 10 amino acids, at most 11 amino acids, at most 12 amino acids, at most 13 amino acids, at most 14 amino acids, at most 15 amino acids, at most 16 amino acids, at most 17 amino acids, at most 18 amino acids, at most 19 amino acids, at most 20 amino acids, at most 21 amino acids, at most 22 amino acids, at most 23 amino acids, at most 24 amino acids, at most 25 amino acids, at most 26 amino acids, at most 27 amino acids, at most 28 amino acids, at most 29 amino acids, at most 30 amino acids, at most 31 amino acids, at most 32 amino acids, at most 33 amino acids, at most 34 amino acids, or at most 35 amino acids.

In some embodiments, the mid-linker comprises between 5 to 35 amino acids, 6 to 35 amino acids, 7 to 35 amino acids, 8 to 35 amino acids, 9 to 35 amino acids, 10 to 35 amino acids, 11 to 35 amino acids, 12 to 35 amino acids, 13 to 35 amino acids, 14 to 35 amino acids, 15 to 35 amino acids, 16 to 35 amino acids, 17 to 35 amino acids, 18 to 35 amino acids, 19 to 35 amino acids, 20 to 35 amino acids, 21 to 35 amino acids, 22 to 35 amino acids, 23 to 35 amino acids, 24 to 35 amino acids, 25 to 35 amino acids, 26 to 35 amino acids, 27 to 35 amino acids, 28 to 35 amino acids, 29 to 35 amino acids, 30 to 35 amino acids, 31 to 35 amino acids, 32 to 35 amino acids, 33 to 35 amino acids, or 34 to 35 amino acids. In some embodiments, the at least one base-linker comprises between 5 to 25 amino acids, between 6 to 25 amino acids, between 7 to 25 amino acids, between 8 to 25 amino acids, between 9 to 25 amino acids, between 10 to 25 amino acids, between 11 to 25 amino acids, between 12 to 25 amino acids, between 13 to 25 amino acids, between 14 to 25 amino acids, between 15 to 25 amino acids, between 16 to 25 amino acids, between 17 to 25 amino acids, between 18 to 25 amino acids, between 19 to 25 amino acids, between 20 to 25 amino acids, between 21 to 25 amino acids, between 22 to 25 amino acids, between 23 to 25 amino acids, or between 24 to 25 amino acids.

In some embodiments, the mid-linker comprises 4 amino acids, 5 amino acids, 6 amino acids, 7 amino acids, 8 amino acids, 9 amino acids, 10 amino acids, 11 amino acids, 12 amino acids, 13 amino acids, 14 amino acids, 15 amino acids, 16 amino acids, 17 amino acids, 18 amino acids, 19 amino acids, 20 amino acids, 21 amino acids, 22 amino acids, 23 amino acids, 24 amino acids, 25 amino acids, 26 amino acids, 27 amino acids, 28 amino acids, 29 amino acids, 30 amino acids, 31 amino acids, 32 amino acids, 33 amino acids, 34 amino acids, or 35 amino acids.

In some embodiments, the mid-linker comprises a 14 amino acid linker or an 18 amino acid linker. In some embodiments, the mid-linker comprises GGGGSGGGGSGGGG (SEQ ID NO: 39) or SSGGGGSGGGGGGSSRSS (SEQ ID NO: 8).

In some embodiments, the base-linker comprises an amino acid sequence of any one of SEQ ID NOs: 2-6. In some embodiments, the mid-linker comprises an amino acid sequence of any one of SEQ ID NOs: 7-8. In some embodiments, the base-linker comprises the amino acid sequence of SEQ ID NO: 2 and the mid-linker comprises the amino acid sequence of SEQ ID NO: 7. In some embodiments, the base-linker comprises the amino acid sequence of SEQ ID NO: 2 and the mid-linker comprises the amino acid sequence of SEQ ID NO: 8. In some embodiments, the base-linker comprises the amino acid sequence of SEQ ID NO: 3 and the mid-linker comprises the amino acid sequence of SEQ ID NO: 7. In some embodiments, the base-linker comprises the amino acid sequence of SEQ ID NO: 3 and the mid-linker comprises the amino acid sequence of SEQ ID NO: 8. In some embodiments, the base-linker comprises the amino acid sequence of SEQ ID NO: 4 and the mid-linker comprises the amino acid sequence of SEQ ID NO: 7. In some embodiments, the base-linker comprises the amino acid sequence of SEQ ID NO: 4 and the mid-linker comprises the amino acid sequence of SEQ ID NO: 8. In some embodiments, the base-linker comprises the amino acid sequence of SEQ ID NO: 5 and the mid-linker comprises the amino acid sequence of SEQ ID NO: 7. In some embodiments, the base-linker comprises the amino acid sequence of SEQ ID NO: 5 and the mid-linker comprises the amino acid sequence of SEQ ID NO: 8. In some embodiments, the base-linker comprises the amino acid sequence of SEQ ID NO: 6 and the mid-linker comprises the amino acid sequence of SEQ ID NO: 7. In some embodiments, the base-linker comprises the amino acid sequence of SEQ ID NO: 6 and the mid-linker comprises the amino acid sequence of SEQ ID NO: 8.

In some embodiments, the amino acid sequence of the SB envelope plasmid comprises an amino acid sequence of any one of SEQ ID NOs: 9-15.

Diabody

In some embodiments, the binding moiety comprises the diabody. Diabody (DB) is a non-covalent dimer of scFv, thus, the size of a DB is about 55 kDa, which is about twice that of a scFv (about 25 kDa). In a DB, each $V_H$ domain is connected with one $V_L$ domain by a short linker to form two antigen binding sites, which provide a higher binding affinity of antigen in its structure. Thus, incorporating a DB into the viral envelope protein may provide a better binding ability to a target cell, thereby executing the stronger vector transduction efficiency.

In some embodiments, the diabody comprises a dimer of a single-chain variable fragment (scFv). In some embodiments, the diabody is encoded by a nucleic acid sequence inserted into the E2 domain of the SB envelope plasmid, and the nucleic acid sequence encodes at least one linker, at least one heavy chain of the variable fragment ($V_H$), or at least one light chain of the variable fragment ($V_L$). In some embodiments, the at least one linker comprises at least one base-linker, at least one mid-linker, or combination thereof. In some embodiments, the diabody is encoded from a nucleic acid sequence in the E2 domain, wherein the nucleic acid sequence encodes at least one base-linker, at least one $V_H$, at least one mid-linker, or at least one $V_L$. In some embodiments, the diabody is encoded from a nucleic acid sequence inserted into the E2 domain of the SB envelope plasmid, wherein the nucleic acid sequence encodes a first base-linker, a first $V_H$, a first mid-linker, a first $V_L$, a second mid-linker, a second $V_H$, a third mid-linker, a second $V_L$, and a second base-linker from the 5' end to the 3' end of the nucleic acid sequence. In some instances, the nucleic acid sequence encoding DB can be obtained by sequencing the amino acid sequences of heavy chain and light chain of an antibody. Information of the amino acid sequences is then used to assemble a nucleic acid sequence encoding DB. This nucleic acid sequence encoding the DB is then designed and generated to be flanked by restriction enzyme sites at both ends, so that the nucleic acid sequence can be incorporated into the envelope plasmid or envelope vector that has the same restriction enzyme sites. In some instances, the restriction enzyme sites at both ends of the nucleic acid sequence encoding the DB are the same restriction enzyme sites. In some instances, the restriction enzyme sites at both ends of the nucleic acid sequence encoding the DB are different restriction enzyme sites. In some embodiments, the nucleic acid sequence further comprises at least one restriction enzyme site. In some embodiments, the at least one restriction enzyme site is located upstream, downstream, or combination thereof, of the nucleic acid sequence in the E2 domain. In some embodiments, the at least one restriction enzyme site comprises BstEII sites.

In some instances, the at least one $V_H$ of the diabody comprises a chimeric scFv. This chimeric scFv can be derived from amino acid sequences of antibodies generated by different clones. In some embodiments, the dimer of the scFv of the diabody comprises a chimeric scFv. In some embodiments, the dimer of the scFv of the diabody is derived from antibodies generated from different clones. In some embodiments, the dimer of the scFv of the diabody is derived from the same antibody. In some embodiments, the dimer of the scFv of the diabody is derived from different antibodies. In some embodiments, the at least one $V_H$ of the diabody comprises a chimeric $V_H$. In some embodiments, the at least one $V_H$ of the diabody is derived from antibodies generated from different clones. In some embodiments, the at least one $V_H$ of the diabody is derived from the same antibody. In some embodiments, at least one $V_H$ of the diabody is derived from different antibodies. In some embodiments, the at least one $V_L$ of the diabody comprises a chimeric $V_L$. In some embodiments, the at least one $V_L$ of the diabody is derived from antibodies generated from different clones. In some embodiments, the at least one $V_L$ of the diabody is derived from the same antibody. In some embodiments, at least one $V_L$ of the diabody is derived from different antibodies.

In some embodiments, the diabody is encoded by a nucleic acid sequence derived from the antibody to target CD47, CEA, HER2, EGFR, PSMA, TfR, nectin-4, muc-1, endoglin, EphA2, EphB2, folate receptor, GRP78, IGF-1R, cMET/HGFR, Tn antigen, EpCAM, avP3 integrin, CD44, mesothelin, PSCA, uPAR, CAIX, CD13, FAP-α, matriptase, MT-1 MMP, MT6-MMP, KDR, KIT, CD276, CD-83, or combination thereof. In some embodiments, the diabody is encoded by a nucleic acid sequence derived from the antibody to target CD33, CD30, HER2, CD22, CD79b, nectin-4, Trop-2, BCMA, CD19, EGFR, Folate receptor u, CD3, CD38, CD20, BCMA, CEA, PSMA, OX40, 4-1BB, CD16A, PD-1, PD-L1, CTLA-4, LAG-3, TIM3, VEGF, CD47, ICOS, MET, LGR5, IGF-1R, HER3, ANG2, DLL4, FAP, DR5, Fibronectin ED-B, Tenascin C, EpCAM, TNFα, Digoxin, GPIIb/IIIa, Crotalidae venom, Centruroides venom, CA6, PLVAP, 5T4, EDB, EGFRvIII, 6B11, CXCR4, MSLN, FN1, GPC2, GPC3, VCAN1, COL11A1, or MMR. In some embodiments, the diabody is encoded by a nucleic acid sequence derived from an anti-CD47 antibody, an anti-HER2 antibody, an anti-nectin-4 antibody, an anti-HLA antibody, or an anti-EGFR antibody. In some embodiments, the nucleic acid sequence encodes the anti-CD47 antibody clone BRIC126. In some embodiments, the nucleic acid sequence encodes the anti-HER2 antibody, trastuzumab, or clone 191924. In some embodiments, the nucleic acid sequence encodes the anti-nectin-4 antibody Enfortumab vedotin. In some embodiments, the nucleic acid sequence encodes the anti-EGFR antibody clone 528. In some embodiments, the nucleic acid sequence encodes the anti-HLA antibody clone W6/32.

In some instances, the orientation of the at least one $V_H$ and the at least one $V_L$ can affect folding and stability of protein. In some embodiments, the orientation of the at least one $V_H$ and the at least one $V_L$ is the same from the N-terminus to the C-terminus of the envelope protein. For example, the orientation of the at least one $V_H$ and the at least one $V_L$ are not inverted, or the orientation of the at least one $V_H$ and the at least one $V_L$ are all inverted, from the N-terminus to the C-terminus of the envelope protein. In some embodiments, the orientation of the at least one $V_H$ and the at least one $V_L$ is different from the N-terminus to the C-terminus of the envelope protein. Examples of different orientation of the at least one $V_H$ and at least one $V_L$, include, but are not limited to, the first $V_H$ is inverted but the first $V_L$ is not while the second $V_H$ and the second $V_L$ are not inverted, or the first $V_H$ is not inverted but the first $V_L$ is inverted, while the second $V_H$ and the second $V_L$ are not inverted, or any combination thereof, from the N-terminus to the C-terminus of the envelope protein. In some embodiments, the orientation of the at least one $V_H$ is inverted. In some embodiments, the orientation of the at least one $V_L$ is inverted. In some embodiments, the orientation of the at least one $V_H$ is inverted, but the at least one $V_L$ is not inverted. In some embodiments, the orientation of the at least one $V_L$ is inverted, but the at least one $V_H$ is not inverted.

In some instances, the at least one linker assists folding structure of the modified envelope protein, thereby increasing transduction efficiency. The length of the at least one linker can also affect transduction efficiency. In some embodiments, the binding moiety, e.g., DB, and the envelope protein encoded by the modified envelope gene are connected by at least one peptide linker. In various embodiments, linkers have virtually any sequence that results in a generally flexible peptide. In some embodiments, the entire nucleic acid insert is flanked by nucleic acid sequence encoding cysteine residues, which can create a loop structure, closed by a disulfide bond. In some embodiments, the entire nucleic acid insert is flanked by restriction enzyme sites.

In some embodiments, the at least one linker comprises a peptide linker. In some embodiments, the at least one linker comprises at least one base-linker. In some embodiments, the at least one linker comprises at least two base-linkers. In some embodiments, the at least one linker comprises at least one mid-linker. In some embodiments, one linker comprises at least two mid-linkers. In some embodiments, the at least one linker comprises at least three mid-linkers. In some embodiments, the at least one linker comprises at least four mid-linkers. In some embodiments, the at least one linker comprises at least five mid-linkers. In some embodiments, the at least one linker comprises at least six mid-linkers.

In some embodiments, the at least one linker comprises at least one base-linker and at least one mid-linker. In some embodiments, the at least one linker comprises at least two base-linkers and at least one mid-linker. In some embodiments, the at least one linker comprises at least two base-linkers and at least one mid-linker. In some embodiments, the at least one linker comprises at least two base-linkers and at least two mid-linkers. In some embodiments, the at least one linker comprises at least two base-linkers and at least three mid-linkers. In some embodiments, the at least one linker comprises at least two base-linkers and at least four mid-linkers. In some embodiments, the at least one linker comprises at least two base-linkers and at least five mid-linkers. In some embodiments, the at least one linker comprises at least two base-linkers and at least six mid-linkers.

In some embodiments, the at least one linker comprises at least one mid-linker and at least one base-linker. In some embodiments, the at least one linker comprises at least two mid-linkers and at least one base-linker. In some embodiments, the at least one linker comprises at least three mid-linkers and at least one base-linker. In some embodiments, the at least one linker comprises at least four mid-linkers and at least one base-linker. In some embodiments, the at least one linker comprises at least five mid-linkers and at least one base-linker. In some embodiments, the at least one linker comprises at least six mid-linkers and at least one base-linker.

In some embodiments, the at least one linker comprises at least one mid-linker and at least two base-linkers. In some embodiments, the at least one linker comprises at least two mid-linkers and at least two base-linkers. In some embodiments, the at least one linker comprises at least three mid-linkers and at least two base-linkers. In some embodiments, the at least one linker comprises at least four mid-linkers and at least two base-linkers. In some embodiments, the at least one linker comprises at least five mid-linkers and at least two base-linkers. In some embodiments, the at least one linker comprises at least six mid-linkers and at least two base-linkers.

In some embodiments, the at least one linker comprises the same linker. In some embodiments, the at least one linker comprises different linkers. In some embodiments, the different linkers comprise different peptide linker sequences. In some embodiments, the different linkers comprise different lengths of linker.

In some embodiments, the at least one base-linker comprises at least 5 amino acids, at least 6 amino acids, at least 7 amino acids, at least 8 amino acids, at least 9 amino acids, at least 10 amino acids, at least 11 amino acids, at least 12 amino acids, at least 13 amino acids, at least 14 amino acids, at least 15 amino acids, at least 16 amino acids, at least 17 amino acids, at least 18 amino acids, at least 19 amino acids, at least 20 amino acids, at least 21 amino acids, at least 22 amino acids, at least 23 amino acids, at least 24 amino acids, at least 25 amino acids, at least 26 amino acids, at least 27 amino acids, at least 28 amino acids, at least 29 amino acids, at least 30 amino acids, at least 31 amino acids, at least 32 amino acids, at least 33 amino acids, at least 34 amino acids, or at least 35 amino acids.

In some embodiments, the at least one base-linker comprises at most 5 amino acids, at most 6 amino acids, at most 7 amino acids, at most 8 amino acids, at most 9 amino acids, at most 10 amino acids, at most 11 amino acids, at most 12 amino acids, at most 13 amino acids, at most 14 amino acids, at most 15 amino acids, at most 16 amino acids, at most 17 amino acids, at most 18 amino acids, at most 19 amino acids, at most 20 amino acids, at most 21 amino acids, at most 22 amino acids, at most 23 amino acids, at most 24 amino acids, at most 25 amino acids, at most 26 amino acids, at most 27 amino acids, at most 28 amino acids, at most 29 amino acids, at most 30 amino acids, at most 31 amino acids, at most 32 amino acids, at most 33 amino acids, at most 34 amino acids, or at most 35 amino acids.

In some embodiments, the at least one base-linker comprises between 5 to 35 amino acids, 6 to 35 amino acids, 7 to 35 amino acids, 8 to 35 amino acids, 9 to 35 amino acids, 10 to 35 amino acids, 11 to 35 amino acids, 12 to 35 amino acids, 13 to 35 amino acids, 14 to 35 amino acids, 15 to 35 amino acids, 16 to 35 amino acids, 17 to 35 amino acids, 18 to 35 amino acids, 19 to 35 amino acids, 20 to 35 amino acids, 21 to 35 amino acids, 22 to 35 amino acids, 23 to 35 amino acids, 24 to 35 amino acids, 25 to 35 amino acids, 26 to 35 amino acids, 27 to 35 amino acids, 28 to 35 amino acids, 29 to 35 amino acids, 30 to 35 amino acids, 31 to 35 amino acids, 32 to 35 amino acids, 33 to 35 amino acids, or 34 to 35 amino acids. In some embodiments, the at least one base-linker comprises between 5 to 25 amino acids, between 6 to 25 amino acids, between 7 to 25 amino acids, between 8 to 25 amino acids, between 9 to 25 amino acids, between 10 to 25 amino acids, between 11 to 25 amino acids, between 12 to 25 amino acids, between 13 to 25 amino acids, between 14 to 25 amino acids, between 15 to 25 amino acids, between 16 to 25 amino acids, between 17 to 25 amino acids, between 18 to 25 amino acids, between 19 to 25 amino acids, between 20 to 25 amino acids, between 21 to 25 amino acids, between 22 to 25 amino acids, between 23 to 25 amino acids, or between 24 to 25 amino acids.

In some embodiments, the at least one base-linker comprises 4 amino acids, 5 amino acids, 6 amino acids, 7 amino acids, 8 amino acids, 9 amino acids, 10 amino acids, 11 amino acids, 12 amino acids, 13 amino acids, 14 amino acids, 15 amino acids, 16 amino acids, 17 amino acids, 18 amino acids, 19 amino acids, 20 amino acids, 21 amino acids, 22 amino acids, 23 amino acids, 24 amino acids, 25 amino acids, 26 amino acids, 27 amino acids, 28 amino acids, 29 amino acids, 30 amino acids, 31 amino acids, 32 amino acids, 33 amino acids, 34 amino acids, or 35 amino acids.

In some embodiments, the mid-linker comprises at least 5 amino acids, at least 6 amino acids, at least 7 amino acids, at least 8 amino acids, at least 9 amino acids, at least 10 amino acids, at least 11 amino acids, at least 12 amino acids, at least 13 amino acids, at least 14 amino acids, at least 15 amino acids, at least 16 amino acids, at least 17 amino acids, at least 18 amino acids, at least 19 amino acids, at least 20 amino acids, at least 21 amino acids, at least 22 amino acids, at least 23 amino acids, at least 24 amino acids, at least 25 amino acids, at least 26 amino acids, at least 27 amino acids, at least 28 amino acids, at least 29 amino acids, at least 30 amino acids, at least 31 amino acids, at least 32 amino acids, at least 33 amino acids, at least 34 amino acids, or at least 35 amino acids.

In some embodiments, the mid-linker comprises at most 5 amino acids, at most 6 amino acids, at most 7 amino acids, at most 8 amino acids, at most 9 amino acids, at most 10 amino acids, at most 11 amino acids, at most 12 amino acids, at most 13 amino acids, at most 14 amino acids, at most 15 amino acids, at most 16 amino acids, at most 17 amino acids, at most 18 amino acids, at most 19 amino acids, at most 20 amino acids, at most 21 amino acids, at most 22 amino acids, at most 23 amino acids, at most 24 amino acids, at most 25 amino acids, at most 26 amino acids, at most 27 amino acids, at most 28 amino acids, at most 29 amino acids, at most 30 amino acids, at most 31 amino acids, at most 32 amino acids, at most 33 amino acids, at most 34 amino acids, or at most 35 amino acids.

In some embodiments, the mid-linker comprises between 5 to 35 amino acids, 6 to 35 amino acids, 7 to 35 amino acids, 8 to 35 amino acids, 9 to 35 amino acids, 10 to 35 amino acids, 11 to 35 amino acids, 12 to 35 amino acids, 13 to 35 amino acids, 14 to 35 amino acids, 15 to 35 amino acids, 16 to 35 amino acids, 17 to 35 amino acids, 18 to 35 amino acids, 19 to 35 amino acids, 20 to 35 amino acids, 21 to 35 amino acids, 22 to 35 amino acids, 23 to 35 amino acids, 24 to 35 amino acids, 25 to 35 amino acids, 26 to 35 amino acids, 27 to 35 amino acids, 28 to 35 amino acids, 29 to 35 amino acids, 30 to 35 amino acids, 31 to 35 amino acids, 32 to 35 amino acids, 33 to 35 amino acids, or 34 to 35 amino acids. In some embodiments, the at least one base-linker comprises between 5 to 25 amino acids, between 6 to 25 amino acids, between 7 to 25 amino acids, between 8 to 25 amino acids, between 9 to 25 amino acids, between 10 to 25 amino acids, between 11 to 25 amino acids, between 12 to 25 amino acids, between 13 to 25 amino acids, between 14 to 25 amino acids, between 15 to 25 amino acids, between 16 to 25 amino acids, between 17 to 25 amino acids, between 18 to 25 amino acids, between 19 to 25 amino acids, between 20 to 25 amino acids, between 21 to 25 amino acids, between 22 to 25 amino acids, between 23 to 25 amino acids, or between 24 to 25 amino acids.

In some embodiments, the mid-linker comprises 4 amino acids, 5 amino acids, 6 amino acids, 7 amino acids, 8 amino acids, 9 amino acids, 10 amino acids, 11 amino acids, 12 amino acids, 13 amino acids, 14 amino acids, 15 amino acids, 16 amino acids, 17 amino acids, 18 amino acids, 19 amino acids, 20 amino acids, 21 amino acids, 22 amino acids, 23 amino acids, 24 amino acids, 25 amino acids, 26 amino acids, 27 amino acids, 28 amino acids, 29 amino acids, 30 amino acids, 31 amino acids, 32 amino acids, 33 amino acids, 34 amino acids, or 35 amino acids.

In some embodiments, the first mid-linker of the diabody comprises at comprises 4 amino acids, 5 amino acids, 6 amino acids, 7 amino acids, 8 amino acids, 9 amino acids, 10 amino acids, 11 amino acids, 12 amino acids, 13 amino acids, 14 amino acids, 15 amino acids, 16 amino acids, 17 amino acids, 18 amino acids, 19 amino acids, 20 amino acids, 21 amino acids, 22 amino acids, 23 amino acids, 24 amino acids, 25 amino acids, 26 amino acids, 27 amino acids, 28 amino acids, 29 amino acids, 30 amino acids, 31 amino acids, 32 amino acids, 33 amino acids, 34 amino acids, or 35 amino acids. In some embodiments, the first mid-linker of the diabody comprises a 15 amino acid linker. In some embodiments, the first mid-linker of the diabody comprises an amino acid sequence of SSSSGSSSSGSSSSG (SEQ ID NO: 16).

In some embodiments, the second mid-linker of the diabody comprises 4 amino acids, 5 amino acids, 6 amino acids, 7 amino acids, 8 amino acids, 9 amino acids, 10 amino acids, 11 amino acids, 12 amino acids, 13 amino acids, 14 amino acids, 15 amino acids, 16 amino acids, 17 amino acids, 18 amino acids, 19 amino acids, 20 amino acids, 21 amino acids, 22 amino acids, 23 amino acids, 24 amino acids, 25 amino acids, 26 amino acids, 27 amino acids, 28 amino acids, 29 amino acids, 30 amino acids, 31 amino acids, 32 amino acids, 33 amino acids, 34 amino acids, or 35 amino acids. In some embodiments, the second mid-linker of the diabody comprises an 18 amino acid linker. In some embodiments, the second mid-linker of the diabody comprises an amino acid sequence of SSGGGGSGGGGGGSSRSS (SEQ ID NO: 8).

Single Variable Domain on a Heavy Chain (VHH)

VHH is the antigen binding fragment or variable domain comprising the heavy chain of an antibody. In some embodiments, the binding moiety comprises the VHH. In some instances, the VHH is an antibody obtained from camelids. Examples of camelids include, but are not limited to, camels, llamas, alpacas, vicuñas, and guanacos.

In some embodiments, the nucleic acid sequence encoding VHH can be obtained by sequencing the amino acid sequences of the heavy chain of an antibody obtained from camelids. Information of the amino acid sequences is then used to create a nucleic acid sequence encoding $V_HH$. This nucleic acid sequence encoding the $V_HH$, in some embodiments, is designed and generated to be flanked by restriction enzyme sites at both ends, so that the nucleic acid sequence can be incorporated into the envelope plasmid (or envelope vector) that has the same restriction enzyme sites. In some instances, the restriction enzyme sites at both ends of the nucleic acid sequence encoding the $V_HH$ are the same restriction enzyme sites. In some instances, the restriction enzyme sites at both ends of the nucleic acid sequence encoding the $V_HH$ are different restriction enzyme sites. In some embodiments, the nucleic acid sequence further comprises at least one restriction enzyme site. In some embodiments, the at least one restriction enzyme site is located upstream, downstream, or combination thereof, of the nucleic acid sequence in the E2 domain. In some embodiments, the at least one restriction enzyme site comprises BstEII sites.

In some embodiments, the $V_HH$ is encoded by a nucleic acid sequence inserted into the E2 domain of a SB envelope plasmid, and the nucleic acid sequence encodes at least one linker or a single variable domain on a heavy chain. In some instances, the at least one linker assists folding structure of the modified envelope protein, e.g., modified SB envelope protein, thereby increasing transduction efficiency. The length of the at least one linker can also affect transduction efficiency. In some embodiments, the binding moiety and an envelope protein encoded by the modified envelope gene are connected by at least one peptide linker. In various embodiments, linkers have virtually any sequence that results in a generally flexible peptide. In some embodiments, the entire nucleic acid insert is flanked by nucleic acid sequence encoding cysteine residues, which can create a loop structure, closed by a disulfide bond. In some embodiments, the entire nucleic acid insert is flanked by restriction enzyme sites.

In some embodiments, the $V_H$H is encoded by a nucleic acid sequence inserted into the E2 domain of a SB envelope plasmid, wherein the nucleic acid sequence encodes at least one base-linker or a single variable domain on a heavy chain. In some embodiments, at least one nucleic acid sequence encoding at least one $V_H$H is inserted into the nucleic acid sequence in the E2 domain of the SB envelope plasmid. In some embodiments, the $V_H$H is encoded from a nucleic acid sequence in the E2 domain, wherein the nucleic acid sequence encodes a first base-linker (linker 1), a $V_H$H, and a second base-linker (linker 2), from the 5' end to the 3' end of the nucleic acid sequence. In some embodiments, the $V_H$H comprises the following formula: linker 1-$V_H$H-linker 2. In some embodiments, the linker 1 is selected from the group consisting of (GGGGS)nAAGHVG (SEQ ID NO: 33), AAGHVG(GGGGS)n (SEQ ID NO: 34), (GGGGS)nAAGHVG(GGGGS)n (SEQ ID NO: 35), (GGGGS)nGVHGAA (SEQ ID NO: 36), GVHGAA(GGGGS)n (SEQ ID NO: 37), and (GGGGS)nGVHGAA(GGGGS)n (SEQ ID NO: 38), wherein n equals to 1, 2, 3, 4, 5, 6, 7, 8, 9, or 10. In some embodiments, the linker 2 is selected from the group consisting of (GGGGS)nAAGHVG (SEQ ID NO: 33), AAGHVG(GGGGS)n (SEQ ID NO: 34), (GGGGS)nAAGHVG(GGGGS)n (SEQ ID NO: 35), (GGGGS)nGVHGAA (SEQ ID NO: 36), GVHGAA(GGGGS)n (SEQ ID NO: 37), and (GGGGS)nGVHGAA(GGGGS)n (SEQ ID NO: 38), wherein n equals to 1, 2, 3, 4, 5, 6, 7, 8, 9, or 10. In some embodiments, the $V_H$H comprises any one of the following formulas: GGGGS-AAGHVG-$V_H$H-GVHGAA (SEQ ID NOS 27 and 40), AAGHVG-$V_H$H-GVHGAA-GGGGS (SEQ ID NOS 6 and 31), GGGGS-AAGHVG-$V_H$H-GVHGAA-GGGGS (SEQ ID NOS 27 and 31), GGGGS-GGGGS-AAGHVG-$V_H$H-GVHGAA (SEQ ID NOS 41 and 40), AAGHVG-$V_H$H-GVHGAA-GGGGS-GGGGS (SEQ ID NOS 6 and 42), GGGGS-GGGGS-AAGHVG-$V_H$H-GVHGAA-GGGGS-GGGGS (SEQ ID NOS 41 and 42).

In some embodiments, the $V_H$H is encoded by a nucleic acid sequence derived from the antibody obtained from camelids to target CD47, CEA, HER2, EGFR, PSMA, TfR, nectin-4, muc-1, endoglin, EphA2, EphB2, folate receptor, GRP78, IGF-1R, cMET/HGFR, Tn antigen, EpCAM, avP3 integrin, CD44, mesothelin, PSCA, uPAR, CAIX, CD13, FAP-α, matriptase, MT-1 MMP, MT6-MMP, KDR, KIT, CD276, CD-83, or combination thereof. In some embodiments, the $V_H$H is encoded by a nucleic acid sequence derived from the antibody obtained from camelids to target CD33, CD30, HER2, CD22, CD79b, nectin-4, Trop-2, BCMA, CD19, EGFR, Folate receptor a, CD3, CD38, CD20, BCMA, CEA, PSMA, OX40, 4-1BB, CD16A, PD-1, PD-L1, CTLA-4, LAG-3, TIM3, VEGF, CD47, ICOS, MET, LGR5, IGF-1R, HER3, ANG2, DLL4, FAP, DR5, Fibronectin ED-B, Tenascin C, EpCAM, TNFα, Digoxin, GPIIb/IIIa, Crotalidae venom, Centruroides venom, CA6, PLVAP, 5T4, EDB, EGFRvIII, 6B11, CXCR4, MSLN, FN1, GPC2, GPC3, VCAN1, COL11A1, or MMR. In some embodiments, the $V_H$H is encoded by a nucleic acid sequence derived from an anti-CD47 antibody, an anti-HER2 antibody, an anti-nectin-4 antibody, an anti-HLA antibody, or an anti-EGFR antibody obtained from camelids.

In some embodiments, the at least one linker comprises a peptide linker. In some embodiments, the at least one linker comprises at least one base-linker. In some embodiments, the at least one linker comprises at least two base-linkers.

In some embodiments, the at least one linker comprises the same linker. In some embodiments, the at least one linker comprises different linkers. In some embodiments, the different linkers comprise different peptide linker sequence. In some embodiments, the different linkers comprise linkers of differing lengths.

In some embodiments, the at least one base-linker comprises at least 5 amino acids, at least 6 amino acids, at least 7 amino acids, at least 8 amino acids, at least 9 amino acids, at least 10 amino acids, at least 11 amino acids, at least 12 amino acids, at least 13 amino acids, at least 14 amino acids, at least 15 amino acids, at least 16 amino acids, at least 17 amino acids, at least 18 amino acids, at least 19 amino acids, at least 20 amino acids, at least 21 amino acids, at least 22 amino acids, at least 23 amino acids, at least 24 amino acids, at least 25 amino acids, at least 26 amino acids, at least 27 amino acids, at least 28 amino acids, at least 29 amino acids, at least 30 amino acids, at least 31 amino acids, at least 32 amino acids, at least 33 amino acids, at least 34 amino acids, or at least 35 amino acids.

In some embodiments, the at least one base-linker comprises at most 5 amino acids, at most 6 amino acids, at most 7 amino acids, at most 8 amino acids, at most 9 amino acids, at most 10 amino acids, at most 11 amino acids, at most 12 amino acids, at most 13 amino acids, at most 14 amino acids, at most 15 amino acids, at most 16 amino acids, at most 17 amino acids, at most 18 amino acids, at most 19 amino acids, at most 20 amino acids, at most 21 amino acids, at most 22 amino acids, at most 23 amino acids, at most 24 amino acids, at most 25 amino acids, at most 26 amino acids, at most 27 amino acids, at most 28 amino acids, at most 29 amino acids, at most 30 amino acids, at most 31 amino acids, at most 32 amino acids, at most 33 amino acids, at most 34 amino acids, or at most 35 amino acids.

In some embodiments, the at least one base-linker comprises between 5 to 35 amino acids, 6 to 35 amino acids, 7 to 35 amino acids, 8 to 35 amino acids, 9 to 35 amino acids, 10 to 35 amino acids, 11 to 35 amino acids, 12 to 35 amino acids, 13 to 35 amino acids, 14 to 35 amino acids, 15 to 35 amino acids, 16 to 35 amino acids, 17 to 35 amino acids, 18 to 35 amino acids, 19 to 35 amino acids, 20 to 35 amino acids, 21 to 35 amino acids, 22 to 35 amino acids, 23 to 35 amino acids, 24 to 35 amino acids, 25 to 35 amino acids, 26 to 35 amino acids, 27 to 35 amino acids, 28 to 35 amino acids, 29 to 35 amino acids, 30 to 35 amino acids, 31 to 35 amino acids, 32 to 35 amino acids, 33 to 35 amino acids, or 34 to 35 amino acids. In some embodiments, the at least one base-linker comprises between 5 to 25 amino acids, between 6 to 25 amino acids, between 7 to 25 amino acids, between 8 to 25 amino acids, between 9 to 25 amino acids, between 10 to 25 amino acids, between 11 to 25 amino acids, between 12 to 25 amino acids, between 13 to 25 amino acids, between 14 to 25 amino acids, between 15 to 25 amino acids, between 16 to 25 amino acids, between 17 to 25 amino acids, between 18 to 25 amino acids, between 19 to 25 amino acids, between 20 to 25 amino acids, between 21 to 25 amino acids, between 22 to 25 amino acids, between 23 to 25 amino acids, or between 24 to 25 amino acids.

In some embodiments, the at least one base-linker comprises 4 amino acids, 5 amino acids, 6 amino acids, 7 amino acids, 8 amino acids, 9 amino acids, 10 amino acids, 11 amino acids, 12 amino acids, 13 amino acids, 14 amino acids, 15 amino acids, 16 amino acids, 17 amino acids, 18 amino acids, 19 amino acids, 20 amino acids, 21 amino acids, 22 amino acids, 23 amino acids, 24 amino acids, 25 amino acids, 26 amino acids, 27 amino acids, 28 amino acids, 29 amino acids, 30 amino acids, 31 amino acids, 32 amino acids, 33 amino acids, 34 amino acids, or 35 amino acids.

Non-limiting examples of the at least one linker provided herein are found in Table 1 (SEQ ID NOs. 2-8). In some embodiments, the at least one base-linker comprises GGGGSGGGGS (SEQ ID NO: 2); GSTGSGSKPGSGEG-STKG (SEQ ID NO:3; Whitlow/218 linker as described in Whitlow et al., Protein Eng, 1993, 6:989-95, which is incorporated by reference); ESKYGPPCPSCPAPEFLGGP (SEQ ID NO: 4; IgG4 hinge region between Fac and Fc); EPKSCDKTHTCPPCPAPELLGGP (SEQ ID NO: 5; hIgG1 hinge region), or AAGHVG (SEQ ID NO: 6). In some embodiments, the at least one base-linker comprises an amino acid sequence of any one of SEQ ID NOs: 2-6.

Protease Cleavage Sites of the Binding Moiety

In some instances, the nucleic acid sequence encoding the binding moiety, such as a scFv, a diabody, or a $V_H H$, can comprise at least one protease cleavage site. The at least one protease cleavage site can interfere with the generation of a functional binding moiety on the envelope protein of the engineered viral vector. An example of the at least one protease cleavage site includes, but is not limited to, a furin cleavage site.

Furin is a protease that cleaves specific peptide sequences, contributing to many proteins processing and activation of signaling molecules. Furin protease is known to play an important role in viral envelope processing as it involves in the maturation of functional viral envelope protein. In some instances, the protease cleavage site located on the binding moiety can be predicted using an online tool such as the ProP −1.0 site, which predicts the arginine and lysine pro-peptide cleavage sites in eukaryotic protein sequences. Once the potential protease cleavage site, e.g., furin cleavage site, is predicted, modification of amino acid sequence at that location can be performed to remove the protease cleavage site.

In some embodiments, the binding moiety further comprises at least one modification compared to the sequence of the wild-type binding moiety. In some embodiments, the at least one modification comprises an amino acid substitution, an amino acid insertion, or an amino acid deletion, or a combination thereof, that remove a protease cleavage site from the binding moiety.

In some embodiments, the protease cleavage site is a furin cleavage site. In some embodiments, the at least one modification to remove the protease cleavage site, e.g., the furin cleavage site, comprises an amino acid substitution. In some embodiments, the at least one modification comprises the amino acid substitution of a lysine to a histidine. In some embodiments, the at least one modification comprises the amino acid substitution of a lysine to an arginine.

Ligand for a Cell Surface Receptor

In various aspects of engineered viral vectors provided herein, in some embodiments, the targeting moiety of the envelope protein is modified to comprise a ligand that can bind to a specific cell surface receptor of the target cell. As described herein, in some embodiments, the at least one targeting moiety comprises a nucleic acid sequence encoding a ligand that can bind to a specific cell surface receptor of the target cell, and this strategy can be used to initiate transduction of the engineered viral vector.

In some embodiments, the ligand is encoded from a nucleic acid sequence inserted into the E2 domain of the envelope plasmid. In some embodiments, the targeting moiety comprises a nucleic acid sequence encoding an antigen binding fragment thereof. In some embodiments, the antigen binding fragment thereof comprises a receptor ligand. In some embodiments, the receptor ligand binds to a target receptor of the target cell. Examples of these receptor ligands include, but are not limited to, G protein-coupled receptor ligands such as endorphins and oxytocin, ligand peptides for G-protein coupled receptor 78 (GPR78) (Mandelin et al., PNAS, 2015, 112:3776-81), small peptide ligands of epidermal growth factor receptor (EGFR) (Hossein-Nejad-Ariani et al., Sci Rep, 2019, 9:2723), programmed cell death protein 1 (PD-1) receptor, and the C-terminal domain of thrombospondin for CD47 (Gao et al., J Biol Chem, 1996, 271:21-4). In some embodiments, the ligand comprises a G protein-coupled receptor ligand, a small peptide ligand, or a C-terminal domain of thrombospondin. In some embodiments, the G protein-coupled receptor ligand comprises endorphins or oxytocin. In some embodiments, the small peptide ligand comprises a ligand for GPR78, EGFR, programmed cell death protein 1 (PD-1) receptor, or CD47 receptor. In some embodiments, the ligand for PD-1 receptor comprises programmed cell death ligand-1 (PD-L1), programmed cell death ligand-2 (PD-L2), or combination thereof. In still other embodiments, at least two receptor ligands are combined either together or separately with the engineered viral vectors disclosed herein. In some instances, the at least two receptor ligands comprise GPR78, HER2, PD-1, or CD47 receptor. In some embodiments, the combination of receptor ligands provides an increased effect, in some instances a synergistic effect, on activity of the engineered viral vectors disclosed herein.

In some embodiments, the small peptide ligand is epidermal growth factor (EGF) or a subunit of EGF. In some embodiments, the subunit of EGF is a EGF core domain. In some embodiments, the EGF core domain comprises an amino acid sequence with at least 70%, at least 75%, at least 80%, at least 85%, at least 90%, or at least 95% sequence identity to SEQ ID NO: 24. In some embodiments, the EGF core domain comprises SEQ ID NO: 24. In some embodiments, the targeting moiety comprises an amino acid sequence with at least 70%, at least 75%, at least 80%, at least 85%, at least 90%, or at least 95% sequence identity to SEQ ID NO: 25 or 26. In some embodiments, the targeting moiety comprises SEQ ID NO: 25 or 26. In some embodiments, the cell surface receptor is EGFR or a EGFR mutant. In some embodiments, the EGFR mutant comprises a deletion of EGFR. In some embodiments, the EGFR mutant comprises a deletion of domain I (L1) and domain II (CRI) of EGFR. In some embodiments, the EGFR mutant comprises a deletion of amino acids 6-273 of EGFR. In some embodiments, the EGFR mutant is constitutively active. In some embodiments, the EGFR mutant comprises a substitution of amino acid. In some embodiments, the EGFR mutant comprises at least one, at least two, at least three, at least four, at least five, at least 10, at least 15, or at least 20 substitutions. In some embodiments, the EGFR mutant comprises an insertion. In some embodiments, the EGFR mutant comprises at least one, at least two, at least three, at least four, at least five, at least 10, at least 15, or at least 20 insertions.

In some embodiments, the target cell is a cancer cell. In some embodiments, the cancer cell comprises a human cancer cell. In some embodiments, the cancer cell comprises a leukemia cell, a myeloblastic cell, a promyelocytic cell, a myelomonocytic cell, a monocytic cell, an erythroleukemia cell, a chronic myelocytic (granulocytic) leukemia cell, a chronic lymphocytic leukemia cell, a lymphoma cell, e.g. Hodgkin's disease and non-Hodgkin's disease, a fibrosarcoma cell, a myosarcoma cell, a liposarcoma cell, a chondrosarcoma cell, an osteogenic sarcoma cell, an angiosarcoma cell, an endotheliosarcoma cell, an Ewing's tumor cell, a colon cancer cell, a pancreatic cancer cell, a breast cancer cell, an ovarian cancer cell, a prostate cancer cell, a squamous cell carcinoma cell, a basal cell carcinoma cell, an adenocarcinoma cell, a renal cell carcinoma cell, hepatoma cell, a Wilms' tumor cell, a cervical cancer cell, an uterine cancer cell, a testicular tumor cell, a lung carcinoma cell, a small cell lung carcinoma cell, a bladder carcinoma cell, an epithelial carcinoma cell, a glioma cell, an astrocytoma cell, an oligodendroglioma cell, a melanoma cell, neuro-blastoma cell, a retinoblastoma cell, a dysplasia and hyperplasia cell, a prostatitis cell, a benign prostatic hypertrophic cell, a benign prostatic hyperplasia (BPH) cell, a prostatic paraganglioma cell, a prostate adenocarcinoma cell, a prostatic intraepithelial neoplasia cell, a prostato-rectal fistulas cell, an atypical prostatic stromal lesion cell, a bladder cancer cell, a lung cancer cell, a head and neck cancer cell, a non-small cell lung cancer cell, a kidney cancer cell, a glioblastoma cell, a Merkel Cell cancer cell, an angiosarcoma cell, a cutaneous T-cell lymphoma cell, a cutaneous B-cell lymphoma cell, a dermatofibrocarcoma protuberans cell, a Sebaceous carcinoma cell, or a cutaneious neuroendocrine carcinoma cell.

Immunogenic Protein

In various aspects of engineered viral vectors provided herein, in some embodiments, the at least one targeting moiety comprises an antigenic protein such as an immunogenic protein or an immunogen. In some instances, the immunogen is encoded by a heterologous nucleic acid sequence, which is inserted into the envelope plasmid. As described herein, the engineered viral vector generated from the modified SB envelope plasmid to also express the immunogen on the envelope protein can stimulate an immune response in a subject. In some instances, the engineered viral vector can be modified as a vaccine by not only carrying a payload, e.g., immunogenic protein, but can also express the immunogenic protein on the envelope protein. The engineered viral vector can present the immunogenic protein at longer duration, which allows stimulation of intrinsic immune response at different phases.

In some embodiments, the antigenic protein is derived from an autoantigen, an allergen, a tumor-associated antigen, a pathogenic virus, a pathogenic bacterium, a pathogenic protozoan, a pathogenic helminth, or any other pathogenic organism that infects a subject. For example, a nucleic acid sequence encoding N-terminal domain (NTD) of SARS-CoV-2 spike protein can be inserted into the SB envelope plasmid, and the engineered viral vectors, e.g., MLV vectors, can be generated using conventional three plasmid transfection. This engineered viral vector comprises MLV core and modified SB envelope protein to also express NTD of SARS-CoV-2's spike protein. The MLV core of the engineered viral vector can carry any gene of interest, e.g., a full-length spike or specific region of the SARS-CoV-2 virus. This engineered viral vector can be used as a vaccine to stimulate an immune response against the SARS-CoV-2 virus.

In some embodiments, the immunogenic protein comprises a viral protein. In some embodiments, the viral protein comprises a viral envelope protein, a spike protein, or a combination thereof. In some embodiments, the viral protein is derived from a virus. In some embodiments, the virus comprises a respiratory virus. In some embodiments, the respiratory virus comprises a SARS-CoV-2 or an influenza virus. In some embodiments, the viral protein comprises an N-terminal domain of SARS-CoV-2. In some embodiments, the viral protein comprises a hemagglutinin (HA) of influenza virus.

In some embodiments, the immunogenic protein comprises a viral antigen. In some instances, viral antigens are derived from known causative agents responsible for diseases including, but not limited to, SARS-CoV-2, measles, mumps, rubella, poliomyelitis, hepatitis A, B (e.g., GenBank Accession No. E02707), and C (e.g., GenBank Accession No. E06890), as well as other hepatitis viruses, influenza, adenovirus (e.g., types 4 and 7), rabies (e.g., GenBank Accession No. M34678), respiratory syncytial virus (RSV), yellow fever, Japanese encephalitis (e.g., GenBank Accession No. E07883), dengue virus (e.g., GenBank Accession No. M24444), hantavirus, and human immunodeficiency virus (e.g., GenBank Accession No. U18552).

In some embodiments, the immunogenic protein comprises a bacteria antigen or a parasitic antigen. In some instances, the bacterial antigen or the parasitic antigen comprises those derived from known causative agents responsible for diseases including, but not limited to, diphtheria, pertussis (e.g., GenBank Accession No. M35274), tetanus (e.g., GenBank Accession No. M64353), tuberculosis, bacterial and fungal pneumonias (e.g., *Haemophilus influenzae, Pneumocystis carinii*, etc.), cholera, typhoid, plague, shigellosis, salmonellosis (e.g., GenBank Accession No. L03833), Legionnaire's Disease, Lyme disease (e.g., GenBank Accession No. U59487), malaria (e.g., GenBank Accession No. X53832), hookworm, onchocerciasis (e.g., GenBank Accession No. M27807), schistosomiasis (e.g., GenBank Accession No. L08198), trypanosomiasis, leishmaniasis, giardiasis (e.g., GenBank Accession No. M33641), amoebiasis, filariasis (e.g., GenBank Accession No. J03266), borreliosis, and trichinosis.

Modification in the E1 Domain

In various aspects of engineered viral vectors provided herein, in some embodiments, the E1 domain of the SB envelope protein is modified. In some embodiments, the SB envelope protein further comprises at least one amino acid modification in an E1 domain relative to a wild-type protein sequence (SEQ ID NO: 1). In some embodiments, the at least one amino acid modification in the E1 domain comprises at least one amino acid substitution relative to a wild-type protein sequence (SEQ ID NO: 1). In some embodiments, the at least one amino acid substitution comprises an amino acid substitution at position 226, an amino acid substitution at position 227, or a combination thereof, and this amino acid position is based on the number of amino acids on the E1 domain. In some embodiments, the at least one amino acid substitution comprises an amino acid substitution at position 770, an amino acid substitution at position 771, or a combination thereof, and this amino acid position is based on the number of amino acids in SEQ ID NO: 1.

In some embodiments, the amino acid substitution at position 226 comprises an A226S or an A226Y substitution. In some embodiments, the amino acid substitution at position 227 comprises a K227G substitution. In some embodiments, the at least one amino acid substitution comprises an A226S substitution, an A226Y substitution, a K227G substitution, or a combination thereof. In some embodiments, the at least one amino acid substitution comprises an A226S substitution or a K227G substitution. In some embodiments, the at least one amino acid substitution comprises an A226Y substitution or a K227G substitution.

In some embodiments, the at least one amino acid substitution further comprises an amino acid substitution at position 160, and this amino acid position is based on the number of amino acids on the E1 domain. In some embodiments, the amino acid substitution at position 160 comprises an E160G substitution.

Additional Modification in the E2 Domain

In additional aspects of engineered viral vectors provided herein, in some embodiments, the at least one modification in the E2 domain comprises a substitution of one or more amino acids relative to a wild-type protein sequence (SEQ ID NO: 1). In some embodiments, the substitution of the one or more amino acids comprises an amino acid substitution, or a combination thereof, wherein an amino acid position is based on the number of amino acids on the E2 domain. In some embodiments, the substitution of the one or more amino acids comprises an amino acid substitution at position 134, an amino acid substitution at position 135, an amin acid substitution at position 136, an amino acid substitution at position 137, an amino acid substitution at position 225, an amino acid substitution at position 226, or a combination thereof, wherein an amino acid position is based on the number of amino acids of SEQ ID NO: 1

In some embodiments, the amino acid substitution at position 134 comprises a S134A substitution of SEQ ID NO: 1. In some embodiments, the amino acid substitution at position 135 comprises a L135A substitution of SEQ ID NO: 1. In some embodiments, the amino acid substitution at position 136 comprises a K136A substitution of SEQ ID NO: 1. In some embodiments, the amino acid substitution at position 137 comprises a Q137A substitution of SEQ ID NO: 1. In some embodiments, the amino acid substitution at position 225 comprises a K225A substitution of SEQ ID NO: 1. In some embodiments, the amino acid substitution at position 226 comprises an E226A substitution of SEQ ID NO: 1.

Payloads

In various aspects of engineered viral vectors provided herein, in some embodiments, the engineered viral vector further comprises a payload. In some embodiments, the payload encodes a transgene or gene of interest. In some embodiments, the payload encodes at least one therapeutic agent. In some embodiments, the at least one therapeutic agent comprises nucleic acid molecules. In some embodiments, the nucleic acid molecules comprise DNA, RNA, or combination thereof. In some embodiments, the RNA comprises a mRNA. In some embodiments, the at least one therapeutic agent comprises at least one therapeutic polypeptide. In some embodiments, the at least one therapeutic polypeptide comprises a suicide protein. In some embodiments, the suicide protein comprises a thymidine kinase, a cytosine deaminase, an IL-12, an IL-2, a nitroreductase (NR), a carboxylesterase, a beta-glucuronidase, a cytochrome p450, a beta-galactosidase, a diphtheria toxin A-chain (DT-A), a carboxypeptidase G2 (CPG2), a purine nucleoside phosphorylase (PNP), or a deoxycytidine kinase (dCK).

Thymidine kinase is a salvage enzyme which phosphorylates natural nucleoside substrates as well as nucleoside analogues. Thymidine kinase can convert a prodrug into an active ingredient for treating a disease or condition. In some embodiments, the prodrug refers to any compound that is inactive but can be converted to an active form later. In some embodiments, the active form comprises a toxic product or a suicide protein, which can kill target cells, e.g., tumor or cancer cells. Thymidine kinase, such as viral thymidine kinase, can be exploited therapeutically by administration of a nucleoside analogue such as ganciclovir or acyclovir to a cell expressing viral thymidine kinase, wherein the viral thymidine kinase phosphorylates the nucleoside analogue, creating a toxic product capable of killing the cell. Viral thymidine kinase of the present disclosure can be derived from a wide variety of viral thymidine kinases. In some embodiments, the thymidine kinase is derived from Herpes Simplex Virus (HSV-TK) or vesicular stomatitis virus (VSV-TK). In some embodiments, the thymidine kinase is modified. In some embodiments, the thymidine kinase is derived from Herpesviridae thymidine kinase including, but is not limiting to, for example, both primate herpes viruses, and non-primate herpes viruses such as avian herpes viruses. Representative examples of suitable herpes viruses include, but are not limited to, for example, a Herpes Simplex Virus (HSV) Type 1, a Herpes Simplex Virus Type 2, a Varicella zoster Virus, a marmoset herpes virus, a feline herpes virus type 1, a pseudorabies virus, equine herpes virus type 1, a bovine herpes virus type 1, a turkey herpes virus, a Marek's disease virus, a herpesvirus saimiri, or an Epstein-Barr virus. In some aspects, the thymidine kinase described herein can be a mutant thymidine kinase, where the mutant thymidine kinase comprises at least one amino acid mutation. In some embodiments, the mutant thymidine kinase is described, for example, U.S. Pat. No. 9,925,276, which is incorporated by reference in its entirety.

In some cases, the at least one therapeutic agent can be a nucleic acid. Nucleic acids that can be delivered to an individual using methods described herein include, but are not limited to, non-translated RNAs, such as an antisense RNA, a ribozyme, an RNAi, and an siRNA. In some embodiments, the nucleic acid comprises heterogenous nucleic acids.

FIG. 1A illustrates a diagram of modifications introduced to a Sindbis (SB) viral envelope protein to increase targeting efficiency of an engineered viral vector generated by methods described herein. Wild-type Sindbis envelope protein can be engineered to have a ZZ protein domain (ZZ SINDBIS). For example, a ZZ protein domain can be introduced into the E2 domain. In some aspects, the wild-type Sindbis envelope protein can be modified to have an m168 modification, which comprises three modifications that are introduced at locations indicated by the arrows as shown in FIG. 1A. The m1 modification is located between the E2-E3 border, and m1 modification is a deletion of the E3 amino acid 61-64 of SEQ ID NO: 1. The m6 modification is located in the E2 domain, and this is an amino acid substitution from K225E226 to A225A226. Lastly, the m8 modification is also located in the E2 domain, and this modification comprises an amino acid substitution from S134L135K136Q137 to A134A135A136A137. In some aspects, the modified Sindbis envelope protein can be encoded from a 2.2 (2.2-SG) plasmid, where an A226K227 to S226G227 mutation is introduced in the E1 domain. In some aspects, the modified Sindbis envelope protein can be engineered to introduce or remove a protease (e.g., furin) cleavage site (denoted as "F" in FIG. 1A). As shown in the engineered plasmids of m168, 2.2, 2.2-AK, or GVO2.2, a furin cleavage site is removed as compared to wild-type Sindbis envelope protein. As shown in FIG. 1A, "tm" or targeting moiety can be a replacement of a ZZ protein domain with nucleic acid sequence encoding antigen binding fragments such as a single-chain variable fragment (scFv), a diabody (DB), or a single variable domain on a heavy chain ($V_HH$) derived from nucleic acid sequence of a targeted antibody.

In one aspect, the present disclosure provides a system that comprises the engineered viral vector as described herein. In some instances, the system is a cell. In some embodiments, the cell comprises the engineered viral vector. In some embodiments, the cell can be a packaging cell line that is used to generate the engineered viral vector by transfection with one or more plasmids as described herein. In some instances, the cell can be the target cell that the engineered viral vector binds and fuses with cell membrane of the target cell.

Pharmaceutical Composition

In another aspect, the present disclosure provides a pharmaceutical composition that comprises the engineered viral vector, the cell, or the system, as described herein. In some embodiments, the composition comprises at least one additional active ingredient. In some embodiments, the composition comprises at least one pharmaceutically acceptable excipient. In some embodiments, the pharmaceutical composition stimulates an immune response of a subject.

Described herein is a pharmaceutical composition comprising a therapeutic agent (e.g., the engineered viral vector or the cell comprising the engineered viral vector). In some aspects, the cell contacted with the engineered viral vector described herein expresses at least one therapeutic. For example, the cell can express a mutant thymidine kinase described herein.

In some aspects, the pharmaceutical composition comprises a pharmaceutically acceptable carrier, excipient, or diluent. In some aspects, the pharmaceutical composition described herein comprises at least one additional active agent other than the engineered viral vector described herein. In some aspects, the at least one additional active agent is a chemotherapeutic agent, a cytotoxic agent, a cytokine, a growth-inhibitory agent, an anti-hormonal agent, an anti-angiogenic agent, or a checkpoint inhibitor.

In some embodiments, the pharmaceutical composition further comprises one or more pH adjusting agents or buffering agents, such as acids such as acetic, boric, citric, lactic, phosphoric, and hydrochloric acids; bases such as sodium hydroxide, sodium phosphate, sodium borate, sodium citrate, sodium acetate, sodium lactate and tris-hydroxymethylaminomethane; amino acids, such as histidine, arginine, and glycine; and buffers such as citrate/dextrose, sodium bicarbonate and ammonium chloride. Such acids, bases, and buffers are added in an amount required to maintain pH of the composition in an acceptable range.

In some embodiments, the pharmaceutical composition further comprises one or more salts in an amount required to bring osmolality of the pharmaceutical composition into an acceptable range. Such salts include, but are not limited to, those having sodium, potassium or ammonium cations and chloride, citrate, ascorbate, borate, phosphate, bicarbonate, sulfate, thiosulfate, or bisulfite anions; suitable salts include sodium chloride, potassium chloride, sodium thiosulfate, sodium bisulfite, and ammonium sulfate.

Methods

Disclosed herein, in some embodiments, are methods of using the engineered viral vectors described herein. In one aspect, the present disclosure provides methods of delivering a therapeutic agent to a target cell in a subject. In some embodiments, the methods comprise administering to the subject the pharmaceutical composition comprising the engineered viral vector, via intravenous administration, subcutaneous administration, intraperitoneal administration, intramuscular administration, or combination thereof. In some embodiments, the methods comprise administering to the subject the pharmaceutical composition comprising the engineered viral vector via bronchial lavage, sublingual, intravenous, intraarterial, oral, parenteral, buccal, topical, transdermal, rectal, intramuscular, subcutaneous, intraosseous, transmucosal, inhalation, or intraperitoneal administration routes. In some embodiments, the pharmaceutical composition comprising the engineered viral vector can be administered to the subject by oral, bronchial lavage, sublingual, intratumoral, parenteral, intravenous, subcutaneous, intramuscular, intradermal, intraperitoneal, intracerebral, subarachnoid, intraocular, intrasternal, ophthalmic, endothelial, local, intranasal, intrapulmonary, rectal, intraarterial, intrathecal, inhalation, intralesional, intradermal, epidural, intracapsular, subcapsular, intracardiac, transtracheal, subcuticular, or intraspinal administration, e.g., injection or infusion. In some embodiments, the pharmaceutical composition comprising the engineered viral vector can be administered to the subject by absorption through epithelial or mucocutaneous linings (e.g., oral mucosa, rectal and intestinal mucosa administration). In some embodiments, the pharmaceutical composition is delivered via multiple administration routes.

In some aspects, the present disclosure provides methods of inducing cell kill activity in a cancer cell in a subject. In some embodiments, the methods comprise administering to the subject the engineered viral vector carrying a thymidine kinase, which can convert a prodrug into an active ingredient. In some embodiments, the prodrug refers to any compound that is inactive but can be converted to an active form, e.g., by enzyme such as by a thymidine kinase. In some embodiments, the active form comprises a toxic product or a suicide protein, which can kill target cells, e.g., tumor or cancer cells. In some embodiments, the methods comprise administering to the subject the engineered viral vector carrying a thymidine kinase, which converts a prodrug to a toxic product, thereby inducing cell kill activity.

In various aspects, the present disclosure provides methods of inducing an immune response in a subject. In some embodiments, the methods comprise administering to the subject the engineered viral vector carrying an immunogenic protein, thereby inducing an immune response initiated from a target cell in the subject.

In some embodiments, the method comprises treating a disease or condition in a subject in need thereof by administering the engineered vector or the pharmaceutical composition comprising the engineered viral vector described herein to the subject. In some embodiments, the cell contacted with the engineered viral vector is an autologous cell. For example, the cell can be first isolated from the subject and optionally cultured or expanded prior to being contacted with the engineered viral vector. In some embodiments, the method comprises administering a pharmaceutical composition comprising the engineered viral vector or the cell comprising the engineered viral vector to the subject. In some embodiments, the subject is a human. In some embodiments, the subject is non-human animal. In some embodiments, the non-human animal comprises cow, mouse, rat, rabbit, guinea pig, chicken, fish, bird, reptile, camelid, bovine, chimpanzee, sheep, goat, dog, cat, horse, or non-human primate. In some embodiments, the disease or condition comprises cancer.

In a further embodiment, the present disclosure is directed to the use of the engineered viral vector provided herein for the preparation of a medicament. In another embodiment, the present disclosure is directed to the use of the engineered viral vector for the preparation of a medicament for the treatment or prevention of cancers, chronical infections, e.g., HIV infection, inherited monogenetic diseases, cardiovascular diseases, and neurodegenerative diseases. In another embodiment, the cancer is selected from the group consisting of leukemia, myeloblastic, promyelocytic, myelomonocytic, monocytic, erythroleukemia, chronic myelocytic (granulocytic) leukemia, and chronic lymphocytic leukemia, lymphoma, e.g. Hodgkin's disease and non-Hodgkin's disease, fibrosarcoma, myosarcoma, liposarcoma, chondrosarcoma, osteogenic sarcoma, angio-sarcoma, endotheliosarcoma, Ewing's tumor, colon carcinoma, pancreatic cancer, breast cancer, ovarian cancer, prostate cancer, squamous cell carcinoma, basal cell carcinoma, adenocarcinoma, renal cell carcinoma, hepatoma, Wilms' tumor, cervical cancer, uterine cancer, testicular tumor, lung carcinoma, small cell lung carcinoma, bladder carcinoma, epithelial carcinoma, glioma, astrocytoma, oligodendroglioma, melanoma, neuro-blastoma, retinoblastoma, dysplasia and hyperplasia, prostate cancer, prostatitis, benign prostatic hypertrophy, benign prostatic hyperplasia (BPH), prostatic paraganglioma, prostate adenocarcinoma, prostatic intraepithelial neoplasia, prostato-rectal fistulas, Merkel Cell cancer, angiosarcoma, cutaneous T-cell lymphoma, cutaneous B-cell lymphoma, dermatofibrocarcoma protuberans, Sebaceous carcinoma, cutaneious neuroendocrine carcinoma, and atypical prostatic stromal lesions. In a further embodiment the pharmaceutical compositions of the present invention are administered alone or in combination with other types of cancer treatment.

In some embodiments, the engineered viral vector can be used to vaccinate a subject. For example, the engineered viral vector can encode an antigen that triggers an immune response in the subject, thus conferring immunity to the subject against the antigen. In some embodiments, described herein, is a method of treating or preventing a disease or condition in a subject by vaccinating the subject, the method comprising administering to the subject the engineered viral vector, the cell comprising the engineered viral vector, or the pharmaceutical composition described herein.

In some embodiments, the engineered viral vector, the cell comprising the engineered viral vector, or the pharmaceutical composition, is administered to increase local concentration of a therapeutic such as a thymidine kinase (e.g., the mutated HSV1-TK) in the cell or the microenvironment associated with the disease or condition (e.g., cancer).

In some embodiments, the method comprises delivering a therapeutic to a target cell in a subject by administering the engineered viral vector, the cell comprising the engineered viral vector, or the pharmaceutical composition to the subject. In some embodiments, the specificity or efficiency of therapeutic delivery to the target cell by the engineered viral vector, the cell comprising the engineered viral vector, or the pharmaceutical composition, is increased by at least 2.0-fold, 5.0-fold, 10.0-fold, or more compared to specificity or efficiency of therapeutic delivery to the target cell by a wild-type viral vector.

As described herein, in some instances, the engineered viral vector generated from the modified SB envelope plasmid increases targeting efficiency or therapeutic delivery to the target cell as compared to targeting efficiency or therapeutic delivery to the target cell mediated by a viral vector generated from a wild-type SB envelope plasmid by at least 1.0-fold, 2.0-fold, 5.0-fold, 10.0-fold, 50.0-fold, or more.

Definitions

Use of absolute or sequential terms, for example, "will," "will not," "shall," "shall not," "must," "must not," "first," "initially," "next," "subsequently," "before," "after," "lastly," and "finally," are not meant to limit scope of the present embodiments disclosed herein but as an example.

As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "or" can refer to "and", "or," or "and/or" and can be used both exclusively and inclusively. For example, the term "A or B" can refer to "A or B", "A but not B", "B but not A", and "A and B". In some cases, context can dictate a particular meaning.

As used herein, the term "about" when referring to a number or a numerical range means that the number or numerical range referred to is an approximation within experimental variability (or within statistical experimental error), and the number or numerical range can vary from, for example, from 1% to 15% of the stated number or numerical range. In examples, the term "about" refers to +10% of a stated number or value.

As used herein, the terms "increased", "increasing", or "increase" are used herein to generally mean an increase by a statically significant amount. In some aspects, the terms "increased," or "increase," mean an increase of at least 10% as compared to a reference level, for example an increase of at least about 10%, at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, standard, or control. Other examples of "increase" include an increase of at least 2-fold, at least 5-fold, at least 10-fold, at least 20-fold, at least 50-fold, at least 100-fold, at least 1000-fold or more as compared to a reference level.

As used herein, the terms "decreased", "decreasing", or "decrease" are used herein generally to mean a decrease by a statistically significant amount. In some aspects, "decreased" or "decrease" means a reduction by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (e.g., absent level or non-detectable level as compared to a reference level), or any decrease between 10-100% as compared to a reference level. In the context of a marker or symptom, by these terms is meant a statistically significant decrease in such level. The decrease can be, for example, at least 10%, at least 20%, at least 30%, at least 40% or more, and is preferably down to a level accepted as within the range of normal for an individual without a given disease.

As used herein, the term "vector", "plasmid", or "construct" can be used interchangeably to refer to a nucleic acid sequence, which can be used to clone and to amplify genetic sequences or genes encoding protein of interest. In some instances, a "vector" is a nucleic acid that is capable of transporting another nucleic acid sequence. In some instances, a "vector" is a small circular DNA that is used to carry genetic information and nucleic acid sequence on the vector can be modified. However, a "viral vector" or "viral particle" described herein refers to viral vector that is generated from transfection of a packaging cell with one or more plasmids comprising an envelope plasmid, a payload plasmid, or one or more gagpol plasmids.

As used herein, the term "pseudotype" refers to a virus particle or a viral vector, where the envelope or capsid is derived from heterologous viral proteins. A "pseudotyped" virus or a "pseudotyped" viral vector has an envelope protein that is from a virus other than the virus from which the genome is derived. The envelope protein can be a native envelope protein or an envelope protein that is modified, mutated, recombinant, or engineered as described herein.

As used herein, the term "chimeric" refers to antibody or antibody-derived molecule in which (a) the constant region, or a portion thereof, is altered, replaced or exchanged so that the antigen binding site (variable region) is linked to a constant region of a different or altered class, effector function and/or species, or an entirely different molecule which confers new properties to the chimeric antibody, e.g., an enzyme, toxin, hormone, growth factor, drug, etc.; or (b) the variable region, or a portion thereof, is altered, replaced or exchanged with a variable region having a different or altered antigen specificity.

EXAMPLES

The following examples are given for the purpose of illustrating various embodiments of the disclosure and are not meant to limit the present invention in any fashion. The present examples, along with the methods described herein are presently representative of preferred embodiments, are exemplary, and are not intended as limitations on the scope of the disclosure. Changes therein and other uses which are encompassed within the spirit of the disclosure as defined by the scope of the claims will occur to those skilled in the art.

Example 1. Generation GVO2.2 Plasmid and Transduction of GVO2.2-Pseudotyped Viral Vectors In this example, GVO2.2 plasmid and other modified GVO2.2 plasmids encoding Sindbis (SB) viral envelope protein were designed and generated.

Materials and Methods

Molecular Cloning
Plasmids were from GVO stocks, subcloned, or synthesized by GenScript. Conventional molecular cloning techniques were used to generate new plasmids, such as restriction enzyme digestion, agarose gel purification, enzyme-mediated ligation, drug selection, and mutagenesis. Plasmid preparation was performed using commercial kits such as QIAGEN kits. All GVO plasmids were confirmed by restriction enzyme digestion and plasmid sequencing at Primordium.

Tissue Culture
Human and mouse cell lines were maintained in the respective media using 5% CO2 humidified tissue culture incubators. 293T cells were used for DNA transfection and vector transduction experiments. 293T cells were cultured in 10% FBS/DMEM supplemented with sodium pyruvate, GlutaMAX®, and pen/strep.

Engineered Viral Vector Production
Recombinant or engineered viral vectors such as amphotropic MLV and SB-pseudotyped MLV were produced by plasmid DNA transfection using calcium phosphate. In brief, 293T cells were seeded on a tissue culture plate or flask on day 0. Next day, 20-24 hrs post-seeding, transfection mixture comprising plasmid DNA [plasmid encoding MLV gagpol, envelope (i.e. A4070 for amphotropic, GVO constructs for SB), and payload (a vector with firefly luciferase as a reporter or other)], $MgCl_2$ and $CaCl_2$) solution, 2×HBS (HEPES buffered saline) was added to the seeded cells in 6% FBS/DMEM (1 g/L glucose) (day 1). On day 2, 16 hours post-transfection, the transfection media was replaced with 10% FBS/DMEM (4.5 g/L glucose) for 9 hours and final formulation media (FFM) was placed until harvest. Culture supernatant was collected 36-40 hours post-FFM placement, filtered through 0.45 μm PES filter, aliquoted, and stored at −80° C.

Viral Titration
Titration of vector was performed and the physical titer (RNA genome copies/mL) was estimated by RT-qPCR assays. In brief, vector RNA was extracted from the source (e.g., cell culture supernatant of transfected cells) using a commercial kit. Following DNase treatment, RT-qPCR assays were performed for a psi packaging sequence of MLV with the primers and probe for payload vector. Genome copy titer was employed in most of the experiments described herein.

Vector Preparation for SB-Pseudotyped Viral Vectors
When engineered viral vectors generated from GVO2.2 or GVO2.2F plasmids were conjugated to antibodies before transduction, the engineered viral vectors with a predetermined amount based on RT-qPCR were mixed with antibodies at a concentration of 1-10 μg/mL. The mixture was let stand for 15 to 60 minutes before being used for transduction. Antibodies used for conjugation included mAbs of anti-HLA, anti-CD47, anti-HER2, anti-EGFR, and anti-PSMA. Antibodies were purchased from respective vendors. Some antibodies were submitted for protein sequencing to use it for designing scFv or diabody vector construction, which are described in later examples.

Viral Vector Transduction

Amphotropic MLV or various SB-pseudotyped viral vectors were used for transducing cells to assess the transduction activity (transducibility) of the engineered viral vector; that was, if they could bind, internalize, reverse-transcribe its genome, and express a gene of interest as a reporter protein. Cells used for transduction were selected based on the purpose of transduction. For example, SB vectors conjugated with HLA antibody can be used for most human cell lines; however, anti-EGFR and anti-HER2 antibodies were used for cell lines (over)expressing those target molecules. Transduction procedure was as follows: On Day 0, cells were seeded 20-24 hours before transduction. Twenty-four (24)-well plate was mainly used. Next day, cells were transduced with vectors with the luciferase reporter and incubated for 3 days. For a fluorescent protein reporter, 12- or 6-well plate was used and incubated for 3 to 5 days. For GCV-mediated cell-kill assay using HSV1-TK as a transgene, 96-well plate was used. In all, the vector was added to the media at predetermined concentration in the presence of polybrene at 6-8 μg/mL.

Reporter Gene Assay

Most of the transduction experiments described above were performed using the luciferase reporter. In brief, after 3 days of incubation with vectors, the culture supernatant was removed by aspiration. Then, luciferase cell lysis buffer (Thermo) was added to wells to lyse cells. After 5-10 minutes of incubation at room temperature, the lysate was transferred to a luciferase assay plate and mixed with the luciferase substrate (Perkin Elmer). The luminescence of the samples was read and analyzed with a SpectraMax M5 plate reader (Molecular Devices).

The envelope gene of SB virus encodes for four compartments, which are E3, E2, 6K, and E1, from the N-terminus to the C-terminus. The SB envelope protein with these four compartments is synthesized as a single 108 kDa polypeptide, which is then proteolytically separated to form a trimer of quaternate components. These four compartments of the SB envelope protein have their own functions. The E3 domain is dissociated upon maturation of the E2 domain. The E2 domain serves as a binding domain while the E1 domain regulates fusion. Therefore, modification of E2 should not affect the E1 structure and function.

An SB envelope protein can be modified as shown in FIG. 1A, a ZZ protein domain, which is the IgG-binding domain of bacterial Protein A was added to an E2 domain of a wild-type SB envelope protein (Ohno et al., Nat Biotechnol, 1997, 15:763-7; Morizono et al., J. Virol., 2001, 75:8016-20; Yang et al., PNAS, 2006, 103:11479-84; Lowenadler et al., Gene, 1987, 58:87-97). This is ZZ SINDBIS construct. Further, the m168 construct encoding a modified SB envelope protein has three modifications: ml, m6, and m8 (Morizono et al., 2001; Morizono et al., Nat. Med., 2005, 11:346-52; Pariente et al., Mol. Ther., 2007, 15:1973-81). The ml modification is located between the E2-E3 border, and ml modification is a deletion of the E3 amino acid 61-64. The m6 modification is located in the E2 domain, and this is an amino acid substitution from K159E160 to A159A160. Lastly, the m8 modification is also located in the E2 domain, and this modification comprises an amino acid substitution from S68L69K70Q71 to A68A69A70A71. A construct named 2.2 has similar modification as the m168 construct with additional modification in the E1 domain, which is an amino acid substitution from A226K227 to S226G227. In this example, the base construct, which was named GVO2.2, has a different substitution in the E1 domain, and this substitution is modified to Y226G227. The amino acid sequence of the E1 subunit in the GVO2.2 plasmid is shown in FIG. 1B (SEQ ID NO: 19). Overall, the GVO2.2 plasmid has ml, m6, m8 modifications, an addition of the ZZ domain, and the Y226G227 substitution in the E1 domain when compared to a wild-type SB envelope protein.

In some instances, a modified SB envelope protein comprises a targeting moiety (tm) instead of the ZZ domain. Different modifications of the modified SB envelope protein are also shown in FIG. 1A. GVO2.2 with A226K227 is named 2.2-AK in the figure, and GVO2.2 with S226G227 is named GVO2.2-SG (the numbering of the amino acids is based on SEQ ID NO: 19). GVO2.2F refers to a modified SB envelope protein with a furin cleavage site located between E3 and E2 domain. ZZ refers to an IgG-binding ZZ domain; tm refers to targeting moiety. Different modification of the GVO2.2 construct is also referred to as a modified GVO2.2 construct.

In order to generate an engineered viral vector such as a pseudotyped MLV vector with SB envelope protein, MLV vectors pseudotyped with GVO2.2 envelope were generated by transient transfection of 293T cells with the following three plasmids: a GVO2.2 SB envelope or a modified GVO2.2 envelope plasmid, a pCGPN plasmid (gagpol), and a payload plasmid. The pseudotyped MLV vectors with SB envelope protein resulted in similar physical titers to those of recombinant MLV vector with amphotropic (4070A) MLV envelope protein. Since the same payload plasmid is used for both MLV amphotropic and SB-pseudotyped MLV vectors, the physical titer method measuring RNA genome copy number by RT-qPCR was used to measure the physical titer of pseudotyped vectors. For the payload, a firefly luciferase reporter plasmid (pCL-Gm-luc2 reporter plasmid) was used to examine the transduction efficiency of the SB-pseudotyped MLV vectors.

To determine whether the ZZ protein domain of the engineered viral vectors generated with GVO2.2 plasmid was functional, an anti-Human Leukocyte Antigen (HLA) antibody was conjugated to the viral envelope of the SB-pseudotyped MLV vectors (or GVO2.2-pseudotyped MLV vectors), and human cells were transduced with the antibody-conjugated SB-pseudotyped MLV vectors. The payload used here was firefly luciferase. HLA is a type of cell surface molecule expressed on the surface of most cells in the human body. Therefore, it served as a positive control for transduction experiments of the engineered viral vectors generated from the modified GVO2.2 envelope plasmid. The anti-HLA monoclonal antibody (mouse, ThermoFisher) was conjugated at various concentrations ranging from 0.156 to 10 mcg/mL (in the conjugation) to the GVO2.2-pseudotyped MLV vectors. The negative control was the GVO2.2-pseudotyped MLV vector with no antibody conjugation.

For antibody conjugation to the pseudotyped viral vectors, after incubating the engineered viral vector and the antibody together at room temperature for 30 minutes, the engineered viral vector was added to 293T cells plated in a 24-well plate in the presence of 8 mcg/mL polybrene. Three days later, cells were harvested and assayed for luciferase expression. As shown in FIG. 2, the negative control (no Ab) had only baseline activity. Transduction of 293T cells with the engineered viral vectors generated from the modified GVO2.2 plasmid conjugated to anti-HLA antibody demonstrated a dose-dependent response, up to 5 mcg/mL of antibody.

After confirming the transduction capability of the GVO2.2-pseudotyped MLV vector, optimization experiments were conducted to determine the best transfection conditions for physical titer and infectivity. The GVO2.2- pseudotyped MLV vectors were produced under conditions with different plasmid ratios in the transfection mixture. As a result, the physical titer did not show a significant difference, but 10 mcg of plasmid per T80 flask showed the highest transduction by luciferase activity. A total plasmid of higher than 10 mcg did not increase the transduction efficiency.

Figure 3A:
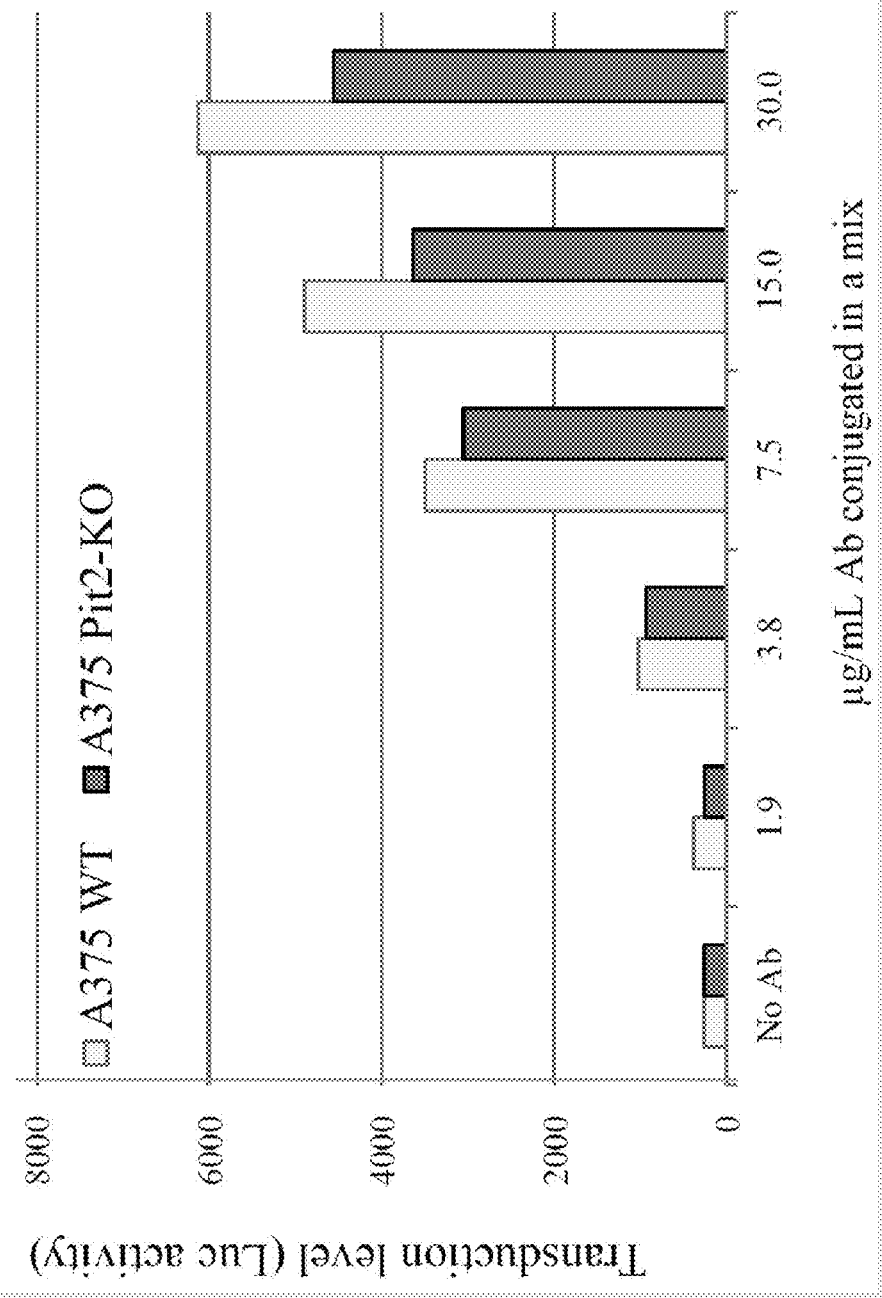
FIGS. 3A-3B show transduction of A375 human melanoma or Pit-2-knock-out (Pit-2-KO) A375 cells with either anti-HLA mAb-conjugated with engineered viral vectors or amphotropic (retrovirus envelope (RVE)) viral vectors, which are Pit-2 dependent.
Figure 3B:
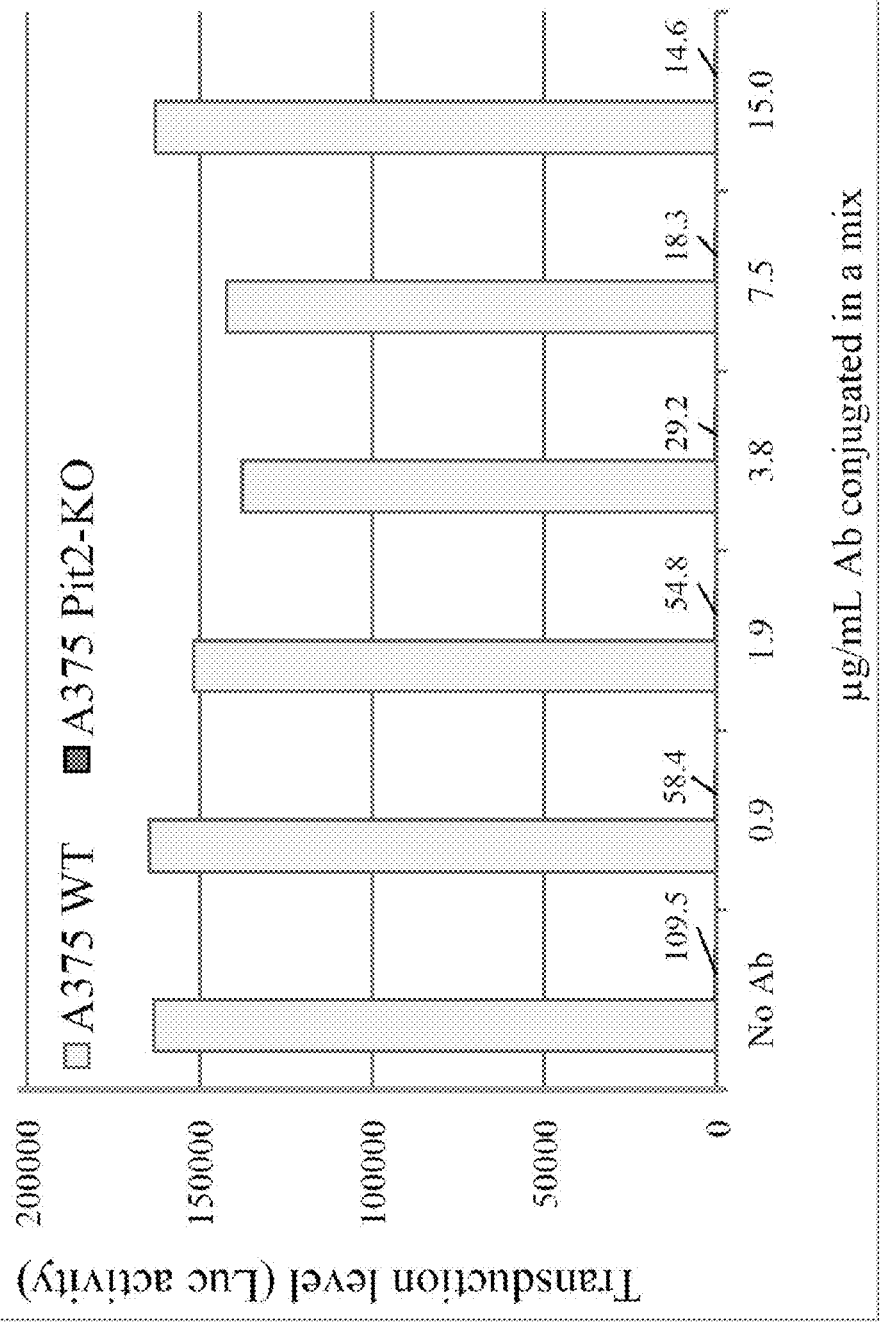

Transduction of recombinant MLV with amphotropic MLV envelope protein is mediated by Pit-2, in contrast to transduction of GVO2.2-pseudotyped vectors which was not mediated by Pit-2. Thus, the presence or absence of Pit-2 should not affect the infectivity of GVO2.2-pseudotyped MLV vectors. As shown in FIG. 3A, the engineered viral vectors generated from GVO2.2 plasmid conjugated with anti-HLA antibody showed antibody-dose dependent transduction in both wild-type A375 cells (open bar) and Pit-2-knockout A375 cells (filled bar). In contrast, in FIG. 3B, amphotropic MLV vector was unable to transduce this Pit-2-KO A375 cells regardless of the conjugation of anti-HLA antibody. RVE indicates amphotropic envelope protein. Luciferase (Luc) was used as a reporter. Various concentrations of antibody were used in conjugation and were examined for transduction.

This result indicates that the transduction of the engineered viral vectors generated from GVO2.2 plasmid conjugated with antibody was mediated by the target molecule, which is HLA in this experiment, but not via Pit-2 receptor. Because GVO2.2-pseudotyped MLV vectors can transduce cells that lack a Pit-2 receptor, this result demonstrates beneficial application of GVO2.2-pseudotyped MLV vectors over the conventional amphotropic MLV vector for targeting cells, such as cancer cells, that lack Pit-2 by using antibodies to target proteins of interest.

Overall, results show that i) MLV vectors can be pseudotyped with a modified GVO2.2 SB envelope protein while having MLV core, ii) the GVO2.2-pseudotyped MLV vectors can be conjugated with antibody targeting a protein of interest, and iii) the GVO2.2-pseudotyped MLV vector shows the antibody-dose dependent transduction. Transduction of this GVO2.2-pseudotyped MLV vector can occur with a targeting antibody even without the presence of Pit-2 receptors, which allows transduction of this engineered viral vector to another type of cells.

Example 2. Transduction of Cancer Cell Lines Using Conjugation of Antibodies Against Cell Surface Proteins In this example, antibodies that target various cell surface proteins, such as HLA, CD47, CEA, HER2, EGFR, PSMA, nectin-4, Pit-2, and TfR were examined on multiple cancer cell lines. Various human cancer cell lines were examined for the transduction activity of antibody-conjugated engineered viral vectors, e.g., antibody-conjugated GVO2.2-pseudotyped MLV vectors. In this example, luciferase payload was used as a reporter to examine the transduction of the engineered viral vector. Methods were performed as described in Example 1.

CD47 is an integrin associated protein which is expressed on the cell surface. Many cancer cells can evade macrophages of the immune system by expressing the CD47. Thus, CD47 is considered as a therapeutic target on cancer cells. Several different monoclonal antibodies (mAb) were used to examine if they could mediate the transduction of the engineered viral vectors, e.g., GVO2.2-pseudotyped viral vectors.

Figure 4A:
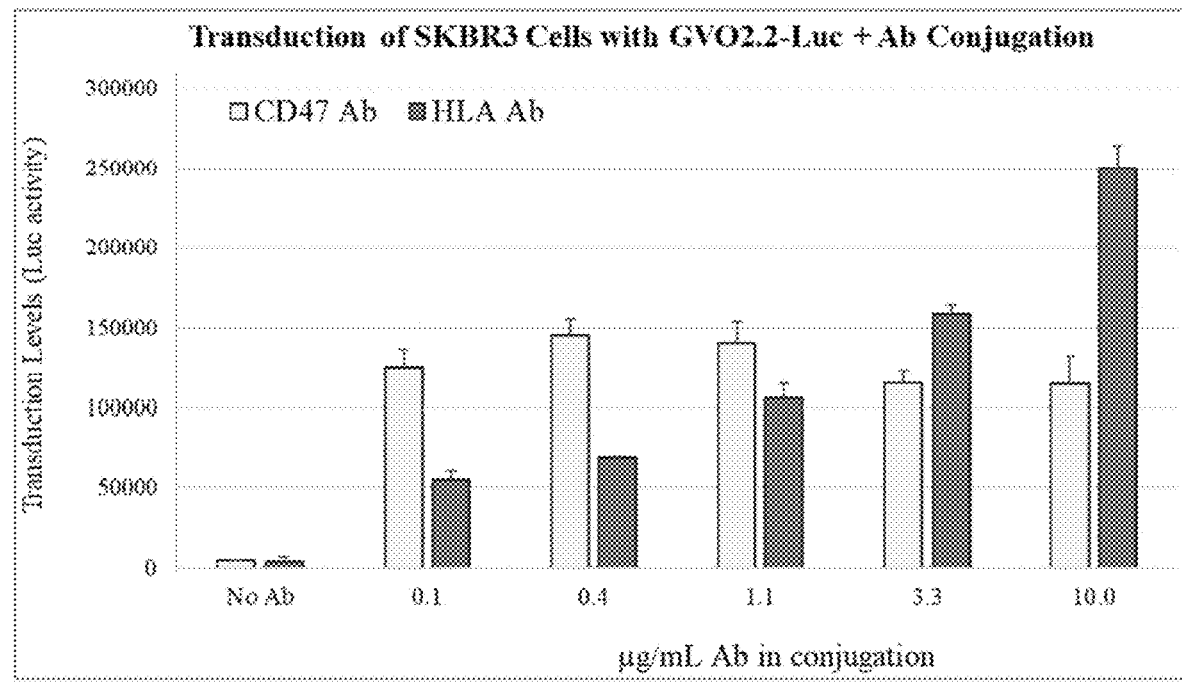
FIGS. 4A-4D show transduction results of various antibody conjugations of the engineered viral vectors. Different human cancer cell lines were tested.

As CD47 is expressed in most cancer cell lines, the engineered viral vectors generated from GVO2.2 plasmid conjugated with anti-CD47 antibody exhibited transduction capability in most cancer cell lines tested. FIG. 4A shows representative data of the transduction experiment. In FIG. 4A, SKBR3 human breast cancer cells were used to test transduction efficiency of antibody-conjugated GVO2.2-pseudotyped MLV vectors. Unlike the anti-HLA antibody, the amount of anti-CD47 mAb conjugation did not proportionally increase the transduction. For anti-CD47 mAb conjugation, a range of 0.1 to 1.1 mcg/mL shows the peak activity, and this result is different than anti-HLA conjugation, which shows the highest transduction efficiency at 10 mcg/mL, the highest concentration tested. The same results were also observed in 293T cells. When conjugating the antibody with the engineered viral vectors generated with the GVO2.2 envelope plasmid, the transduction efficiency varied between different CD47 mAbs, suggesting the ability of antibodies to mediate the transduction can vary. Several anti-CD47 antibodies were tested, and anti-CD47 mAb obtained from clone BRIC126 showed the highest transduction.

Figure 4B:
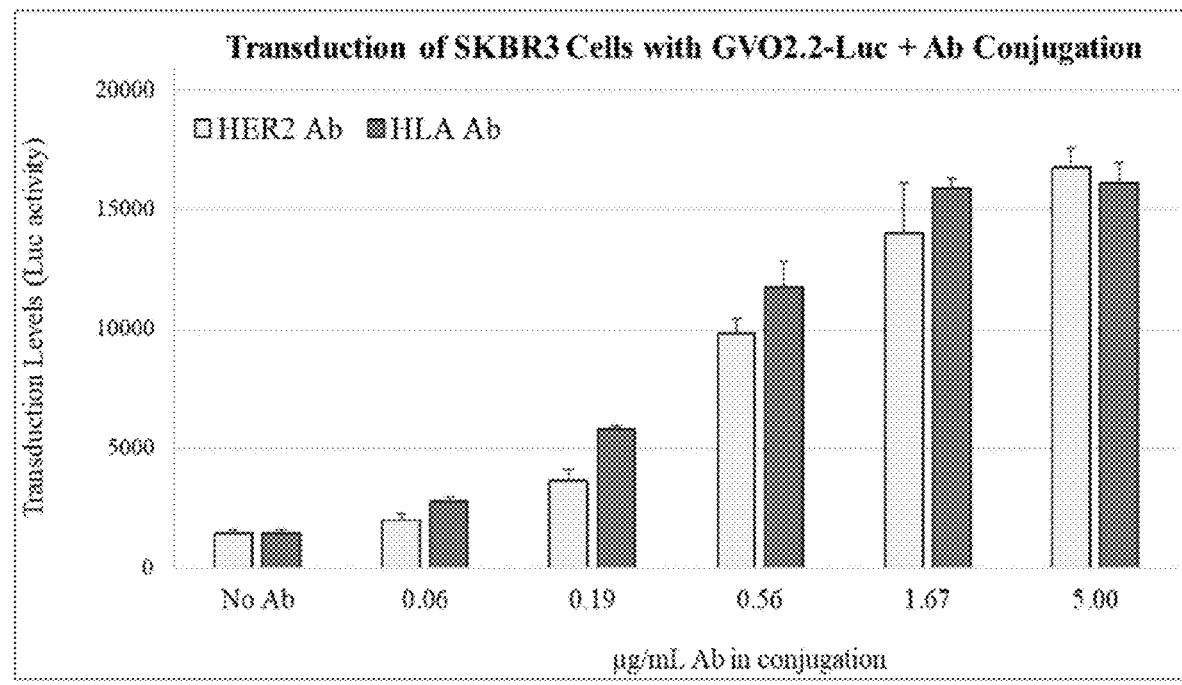

The transduction ability of anti-HER2 antibody-conjugated GVO 2.2-pseudotyped viral vectors was also investigated. HER2 is a receptor tyrosine kinase also known as ERBB-2. HER2 is an oncogene and a member of epidermal growth factor receptor. It is amplified or over-expressed in many cancer types, such as breast cancer. Several antibody-based therapeutics have been commercialized as antibody therapeutic such as pertuzumab and trastuzumab. Thus, such characteristics of this protein are attractive as a targeting molecule. SKBR3 is a human breast cancer cell line over-expressing HER2. As shown in FIG. 4B, SKBR3 cells exhibited excellent transduction with GVO 2.2-pseudotyped viral vectors conjugated with a monoclonal antibody against HER2, clone 191924. Anti-HLA mAb was used as a positive control.

EGFR is involved in cell growth, and thus it is reasonable to use it as one of the cancer cell targets for the targeting vector. Transduction of engineered viral vectors conjugated with anti-EGFR antibody was investigated in the EGFR overexpressing cancer cells. Similar to other target molecules, transduction levels of antibody-conjugated viral vectors depend on the Ab clone used for conjugation. For anti-EGFR antibody, anti-EGFR Clone 528 was the best mAb among tested.

Figure 4C:
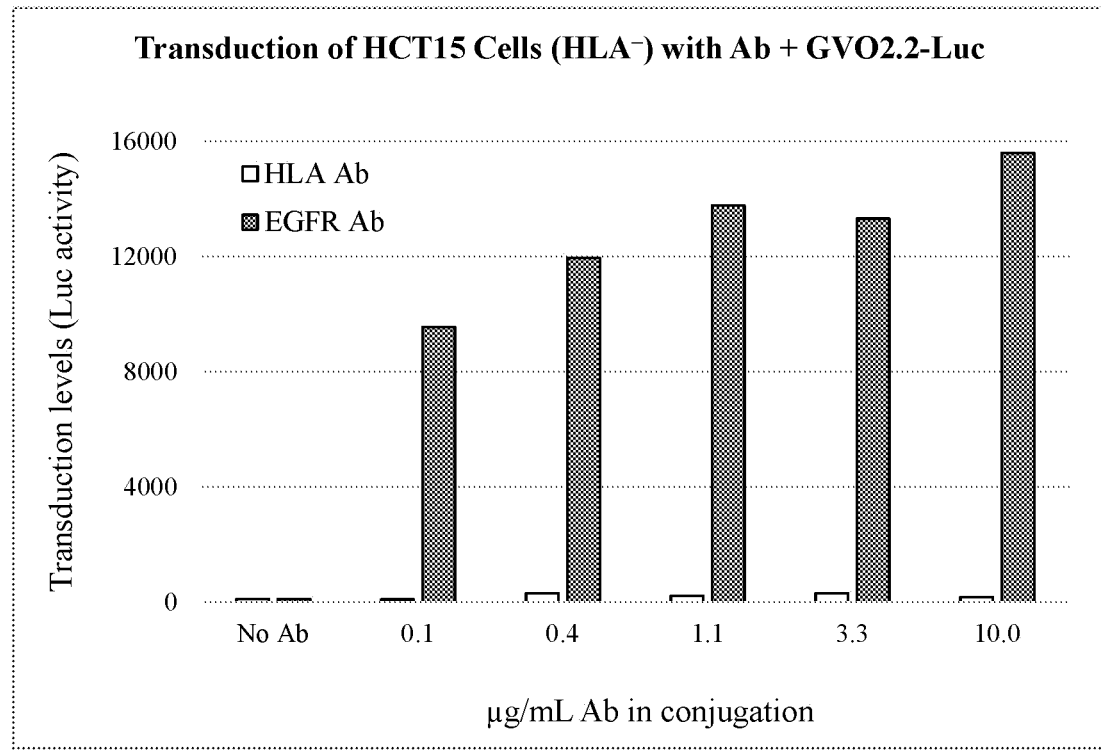

HCT-15, a human colorectal cancer cell line, is a representative cell line to indicate the specificity of antibody-mediated transduction because HCT-15 cells lack HLA expression (Gattoni-Celli et al., Cancer Res, 1992, 52:1201-4). As shown in FIG. 4C, when conjugating the engineered viral vector with anti-EGFR antibody, HCT-15 cells showed transduction; however, when conjugating the engineered viral vector with anti-HLA antibody, transduction was almost negligible. This was due to the HCT-15 cell line lacking HLA expression. The anti-HLA mAb is clone W6/32. This clearly indicates that the transduction by the engineered viral vector conjugated with HLA mAb is dependent on the expression of the target molecule, HLA.

Figure 4D:
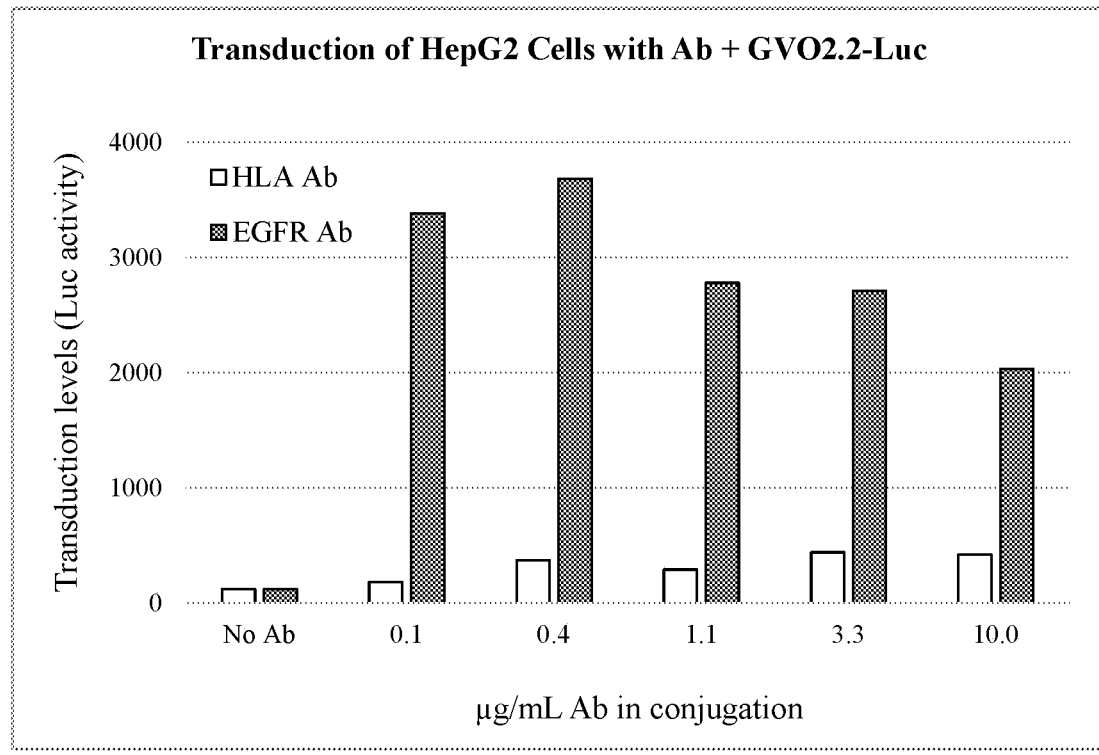

As in FIG. 4D, HepG2, a human liver cancer cell line, was transduced with the engineered viral vector conjugated with anti-HLA mAb or anti-EGFR mAb and showed similar results. Transduction levels were higher with anti-EGFR mAb-conjugated GVO2.2-pseudotyped viral vectors when compared to anti-HLA mAb conjugation.

Overall, this indicated that the GVO2.2-pseudotyped viral vectors conjugated with antibody can bind to the target molecule. Targeted transduction of a particular target is feasible using the specific target on the target cells or lesions. The results support the functionality of the engineered viral vectors, e.g., GVO2.2-pseudotyped viral vectors, conjugated with various cell surface molecules and usefulness, because a single vector can be used for multiple targets by changing the antibody for conjugation.

Example 3. Generation and Testing of GVO2.2-scFv Vector

Based on the outcomes of the engineered viral vectors from the previous examples, a targeting moiety, such as a single-chain variable fragment (scFv), was introduced into the SB envelope plasmid to replace the ZZ protein domain. Although the ZZ protein domain specifically binds to the Fc domain of IgG, binding affinity of the ZZ protein domain to the Fc domain of each IgG varies. Therefore, it is quite challenging to predict how stable the binding is, especially in vivo. In addition, incorporating monoclonal antibodies into drug manufacturing requires complicated procedures and regulations. As such incorporating scFv into the envelope protein derived from SB virus can be an excellent option to address the issues described above. Therefore, replacement of the ZZ domain with scFv can simplify the production process and increase stable target binding ability.

Methods were performed as described in Example 1.

An antibody was first screened for sufficient transduction. Antibodies, that worked in the conjugation system described in the previous examples, were subjected to amino acid sequence determination. The resulting amino acid sequences of the heavy chain and light chains were utilized to assemble a scFv. Nucleic acid sequence encoding a base-linker, heavy chain of the variable fragment ($V_H$), mid-linker, light chain of the variable fragment ($V_L$), and another base-linker were then synthesized at GenScript. These sequences were flanked by BstEII sites, which are also present on the GVO2.2 envelope plasmid. The BstEII fragment containing scFv was cloned into GVO2.2 plasmid to replace ZZ domain in the GVO2.2 plasmid. As shown in FIG. 1, targeting moiety (tm) used in this example is scFv. Additional modifications can also be performed based on the GVO2.2 envelope with tm.

To incorporate nucleic acid sequence encoding scFv into the SB envelope gene of the GVO2.2 envelope plasmid, as shown in Table 1, seven different linker configurations comprising base-linker and mid-linker were designed because different structures or lengths of the linkers can greatly affect transduction efficiency. The five base-linkers tested were: GGGGSGGGGS (SEQ ID NO:2), Whitlow linker (SEQ ID NO: 3) (Whitlow et al., Protein Eng, 1993, 6:989-95), IgG4 hinge region between Fab and Fc (SEQ ID NO:4), hIgG1 hinge region (SEQ ID NO:5), and AAGHVG (SEQ ID NO:6). The mid-linkers tested comprise different combinations of 14 or 18 amino acids sequences, which are SEQ ID NO:7 for 14 amino acid linker and SEQ ID NO:8 for 18 amino acid linker (Aires da Silva et al., Hum. Gene Ther., 2005, 16:223-34). Table 2 shows the sequence alignment (SEQ ID NOs: 9-15) of all seven constructs integrated with the different linker configuration. scFv of human CD47 was tested as a proof-of-concept.

TABLE 1

Amino acid sequence of linkers for SB envelope protein with scFv as a targeting moiety.

|  | #1 | #2 | #3 | #4 | #5 | #6 | #7 |
|---|---|---|---|---|---|---|---|
| Base-linker | GGGGSG GGGS (SEQ ID NO: 2) | GSTGSGS KPGSGEG STKG (SEQ ID NO: 3) | ESKYGPP CPSCPAP EFLGGP (SEQ ID NO: 4) | EPKSCDK THTCPPC PAPELLG GP (SEQ ID NO: 5) | GGGGSG GGGS (SEQ ID NO: 2) | AAGHVG (SEQ ID NO: 6) | ESKYGPP CPSCPAP EFLGGP (SEQ ID NO: 4) |
| Mid-linker | GGGGSG GGGSGG GGS (SEQ ID NO: 7) | GGGGSG GGGSGG GGS (SEQ ID NO: 7) | GGGGSG GGGSGG GGS (SEQ ID NO: 7) | GGGGSG GGGSGG GGS (SEQ ID NO: 7) | SSGGGGS GGGGGG SSRSS (SEQ ID NO: 8) | SSGGGGS GGGGGG SSRSS (SEQ ID NO: 8) | SSGGGGS GGGGGG SSRSS (SEQ ID NO: 8) |

TABLE 2

Amino acid alignment of construct #1 to #7 of GVO2.2 plasmid with CD47-scFv (SEQ ID NOS 9-15, respectively, in order of appearance)

```
#1     --------------GGGGSGGGGSEVQLQQSGADLVRPGALVKLSCKASGFNIKDYYLYWV    47
#2     -----GSTGSGKPGSGEGSTKGEEVQLQQSGADLVRPGALVKLSCKASGFNIKDYYLYWV    55
#3     ---ESKYGPPCPSCPAPEFLGGPEVQLQQSGADLVRPGALVKLSCKASGFNIKDYYLYWV    57
#4     EPKSCDKTKTCPPCPAPELLGGPEVQLQQSGADLVRPGALVKLSCKASGFNIKDYYLYWV    60
#5     --------------GGGGSGGGGSEVQLQQSGADLVRPGALVKLSCKASGFNIKDYYLYWV    47
#6     ------------------AAGHVGEVQLQQSGADLVRPGALVKLSCKASGFNIKDYYLYWV    43
#7     ---ESKYGPPCPSCPAPEFLGGPEVQLQQSGADLVRPGALVKLSCKASGFNIKDYYLYWV    57
(ALL)                       ************************************   117

#1     KQRPEQGLEWIGWIDPQNVNTLFDPKFQGKASLTADTSSNTVYLQLSSLTSEDTAVYYCA   164
#2     ************************************************************   172
#3     RGGKRAMDYWGQGTSVTVSSGGGGSGGGGSG---GGGSDVLMTQSPLSLPVTLGDQASIS   174
```

TABLE 2-continued

Amino acid alignment of construct #1 to #7 of
GVO2.2 plasmid with CD47-scFv (SEQ ID NOS 9-15,
respectively, in order of appearance)

```
#4      RGGKRAMDYWGQGTSVTVSSGGGGSGGGGSG---GGGSDVLMTQSPLSLPVTLGDQASIS 177
#5      RGGKRAMDYWGQGTSVTVSSGGGGSGGGGSGG---GGGSDVLMTQSPLSLPVTLGDQASIS 167
#6      RGGKRAMDYWGQGTSVTVSSGGGGSGGGGSG---GGGSDVLMTQSPLSLPVTLGDQASIS  163
 #7     RGGKRAMDYWGQGTSVTVSSSSGGGGSGGGGGGSSRSSDVLMTQSPLSLPVTLGDQASIS  177
        *******************..**.*.**.*      .***********************

(ALL)   CRSSQTIVHSNGYTYLGWYLQKPGQSPKLLIYKVSNRFSGVPDRFSGSGSGTDFTLKISR  234
        ************************************************************

#1      VEAEDLGVYYCFQGSHVPFTFGSGTKLEIKSGGGGSGGGG-------------         264
#2      VEAEDLGVYYCFQGSHVPFTFGSGTKLEIKGKTSGEGSGPKSGSGTSG-----         280
#3      VEAEDLGVYYCFQGSHVPFTFGSGTKLEIKPGGLLEPAPCSPCPPGYKSE---         284
#4      VEAEDLGVYYCFQGSHVPFTFGSGTKLEIKPGGLFEPAPCPPCTHTKDCSKPE         290
#5      VEAEDLGVYYCFQGSHVPFTFGSGTKLEIKSGGGGSGGGG-------------         267
#6      VEAEDLGVYYCFQGSHVPFTFGSGTKLEIKPGGLLEPAPCSPCPPGYKSE---         259
#7      *******************************                              287
```

An engineered viral vector with scFv of CD47 as a targeting moiety was generated by transient transfection of the modified GVO2.2 plasmid carrying scFv (GVO2.2-scFv plasmid) along with a pCGPN(gagpol) plasmid and a payload plasmid. The methods to generate the engineered viral vectors were described in the previous example. The engineered viral vectors were measured for their physical titers by RT-qPCR, aliquoted, and stored at ≤−65° C. until use. This engineered viral vectors with scFv as a targeting moiety were then tested with CD47 positive cell lines to examine targeted transduction. Luciferase reporter plasmid was used for most experiments to determine the transduction efficiency.

Figure 5A:
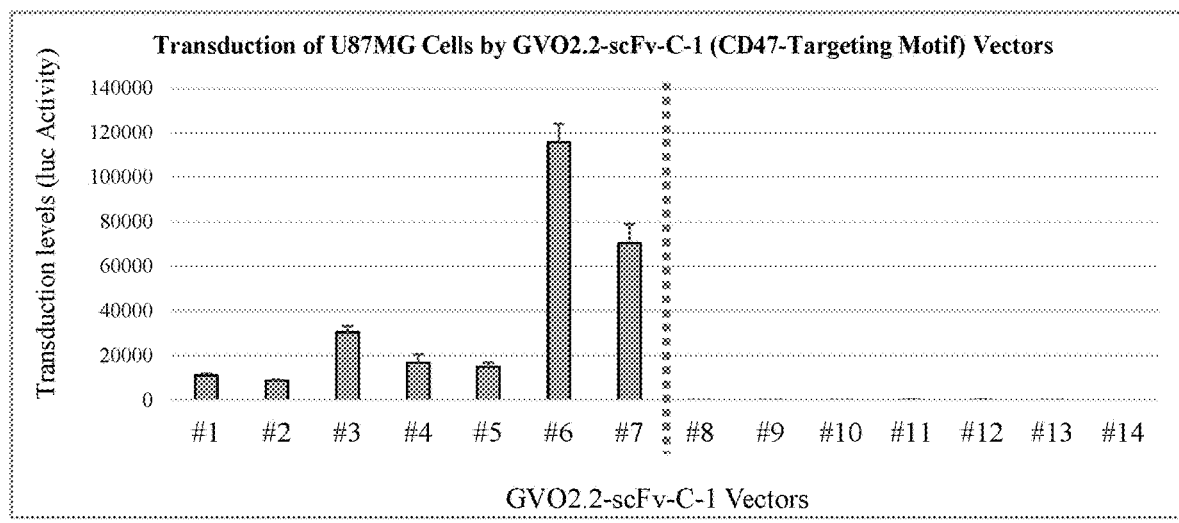
FIGS. 5A-5B show transduction of U87MG human glioblastoma with the engineered viral vectors generated with GVO2.2-scFv plasmids with various base sequences and configurations of mid-linkers and base-linkers (#1-#14). In this experiment, a human CD47-scFv-embedded SB plasmid (or GVO2.2-scFv-C-1 plasmid) was used to generate the engineered viral vectors.
Figure 5B:
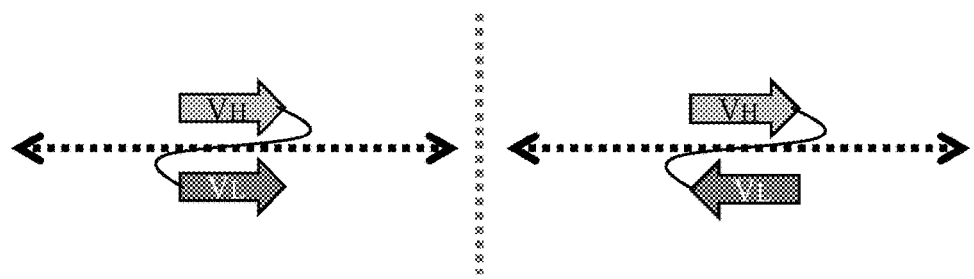
Figure 6:
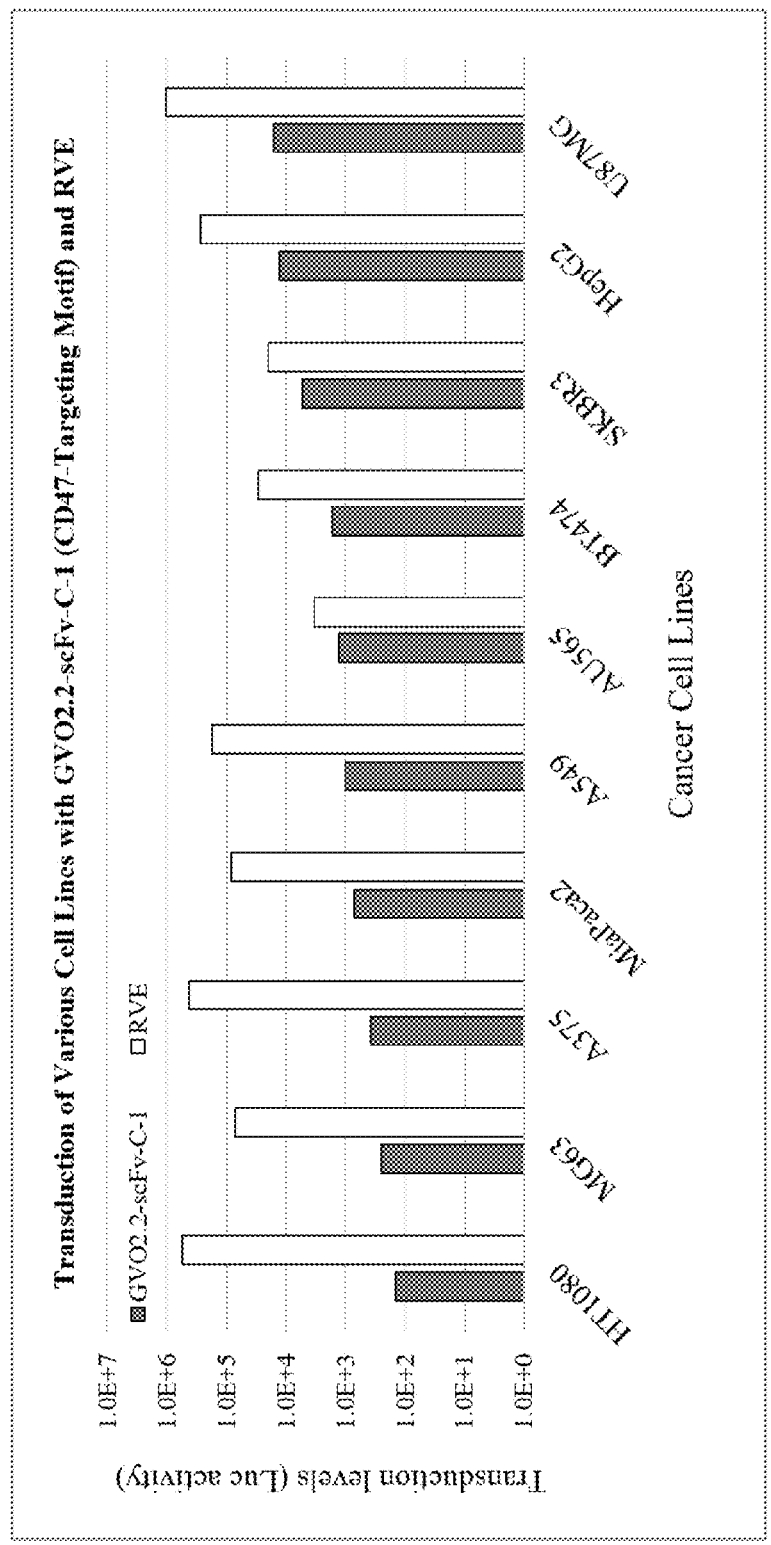
FIG. 6 illustrates luciferase assay results from the transduction of various human cancer cell lines with the engineered viral vector generated with GVO2.2-scFv-C-1 plasmid compared to amphotropic (RVE) viral vector whose transduction levels were relatively comparable among different cancer cell lines.

Transduction of various cancer cell lines were examined with human CD47 scFv-embedded GVO2.2-pseudotyped viral vectors (GVO2.2-scFv-C-1). As shown in FIG. 5A, the CD47 scFv-embedded GVO2.2-pseudotyped viral vectors showed transduction activity but the levels depended on the linker structure and configurations. In this figure, numbers (#) correspond to the configuration shown in Table 1. Numbers from #8 to #14 have identical linkers to #1 to #7; however, #8 to #14 have inverted $V_L$, which are shown in FIG. 5B. This trend was also seen in other cell lines. FIG. 6 shows transduction of various cancer cell lines with human CD47 scFv-embedded GVO2.2-pseudotyped MLV vector (GVO2.2-scFv-C-1) or with amphotropic envelope (RVE)-pseudotyped MLV vector. As shown in FIG. 6, luciferase expression varies in different cell lines. This may be due to the variation in the level of surface CD47 expression among different cell lines.

The linker #6, comprising base-linker of SEQ ID NO: 6 and mid-linker of SEQ ID NO: 8, was selected for other GVO2.2-scFv plasmids since it shows the highest transduction in tested cells. Multiple SB-scFv plasmids with different scFv targeting such as mCD47, CD47, CEA, HER2, EGFR, PSMA, and nectin-4 were generated with different base and mid-linkers.

Currently, the relationship between the viral vector transduction and the type and length of base and mid-linkers remains unclear. However, for the mid-linker, viral vectors with longer mid-linker exhibited higher transduction whereas for the base-linkers, viral vectors with shorter base-linkers demonstrated relatively higher transduction. Further study is required to determine the relationship between linker type and length and transduction.

Overall, this experiment shows that a targeting moiety such as scFv can be embedded in SB envelope protein and can replace a ZZ domain. Additionally, different configuration of mid-linker and base-linker play important roles in transduction efficiency of the engineered viral vectors.

Example 4. Generation and Testing of GVO2.2-Diabody Vector

Following the successful application of scFv-incorporated GVO2.2 plasmids, diabodies (DB, a noncovalent dimer of scFv) were designed and incorporated into the SB envelope protein of GVO2.2 envelope plasmid. In this example, this DB serves as a targeting moiety instead of the scFv. In a DB, each $V_H$ domain is connected to one $V_L$ domain by a short linker to form two antigen binding sites. Having twice the higher of antigen binding structure, a DB may show better binding to a target and hence, execute the stronger vector transduction ability. One difficulty compared to a scFv, which is an approximately 25 kDa insert, is that a DB has a molecular weight of approximately 55 kDa, which is almost the same size as the E2 domain of SB envelope protein or about a half of entire SB envelope polypeptide. Therefore, addition of a DB to the SB envelope gene of GVO2.2 was considered challenging.

Methods were performed as described in Example 1.

Figure 7:
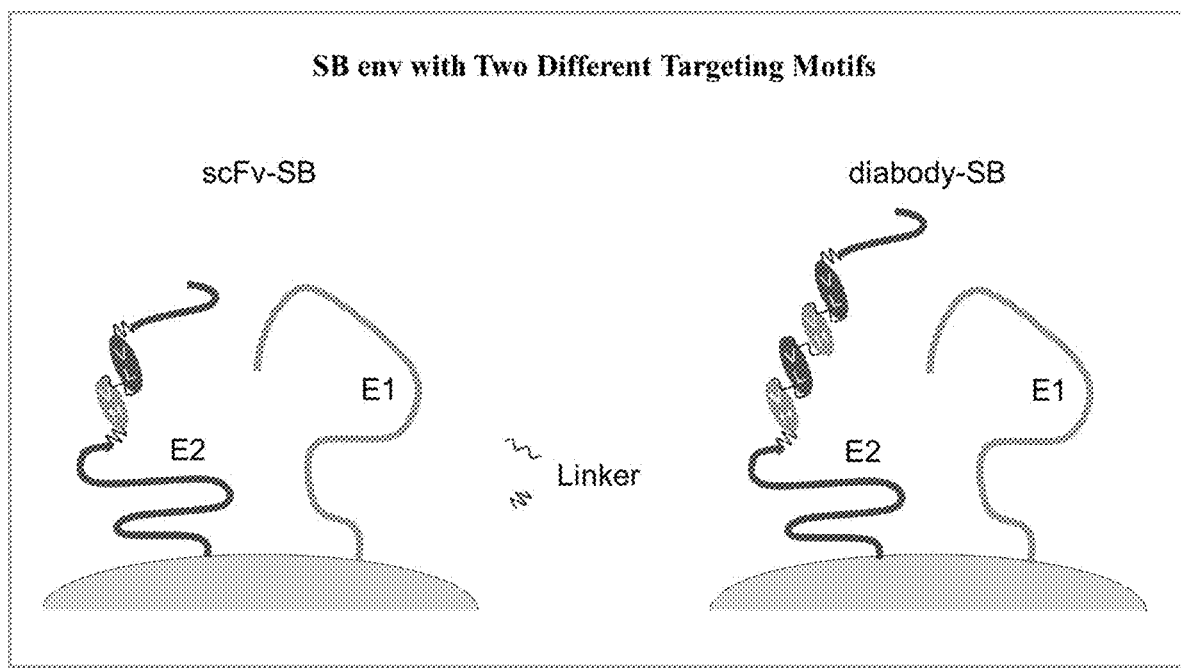
FIG. 7 illustrates a diagram of a scFv (left panel) or diabody (right panel) incorporated into the E2 domain of the SB envelope protein as a targeting moiety.
Figure 8:
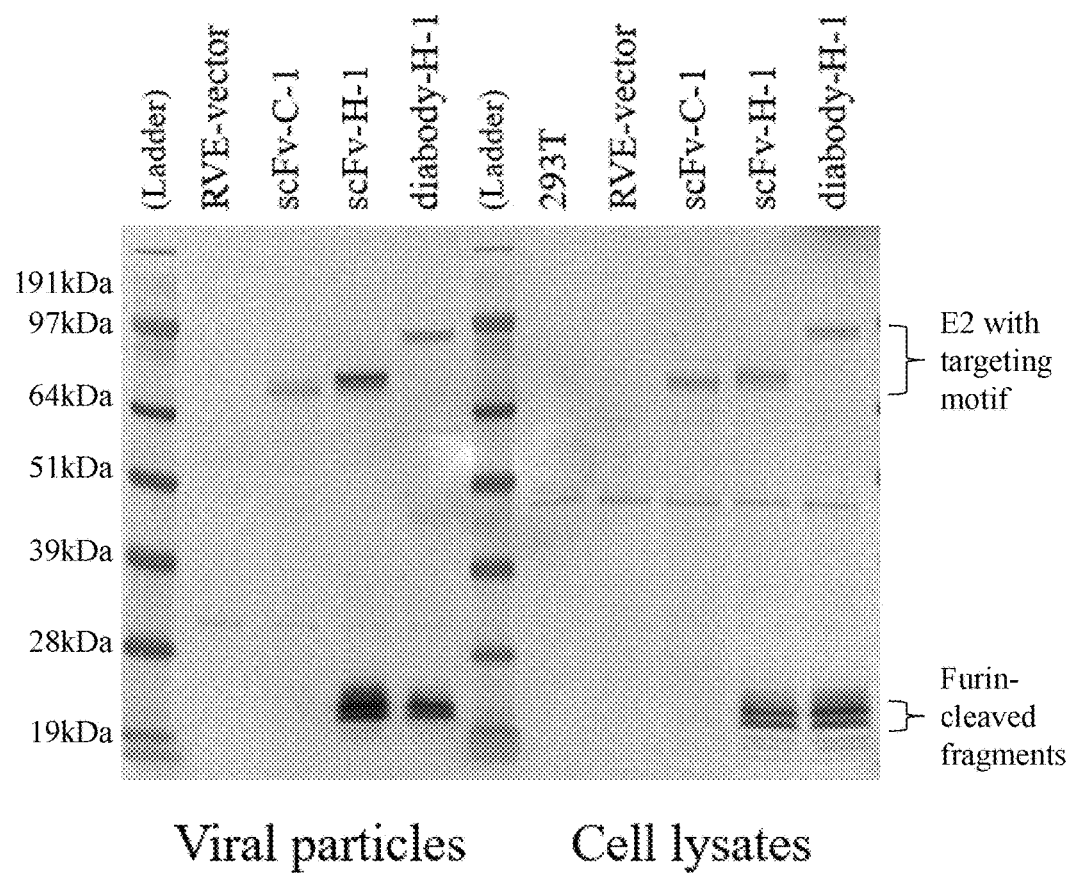
FIG. 8 illustrates a Western blot with anti-E2 domain of SB envelope antibody on various vector particles (engineered viral vectors) or cell lysates of plasmid transfected cells. Predicted size for the engineered viral vector generated with GVO2.2-scFv-C-1 plasmid is 81 kDa; the engineered viral vector generated with GVO2.2-scFv-H-1 plasmid is 81.6 kDa; and the engineered viral vector generated with GVO2.2-DB-H-1 plasmid is 110 kDa. Assuming that the small fragments seen in lanes 3 and 4 are due to furin cleavage, the size of those are 15.6 kDa and the remaining 65.8 kDa for engineered viral vector generated with GVO2.2-scFv-H-1 plasmid and 15.6 kDa, 28.5 kDa, 65.9 kDa for engineered viral vector generated with GVO2.2-DB-H-1 plasmid, respectively.
Figure 9:
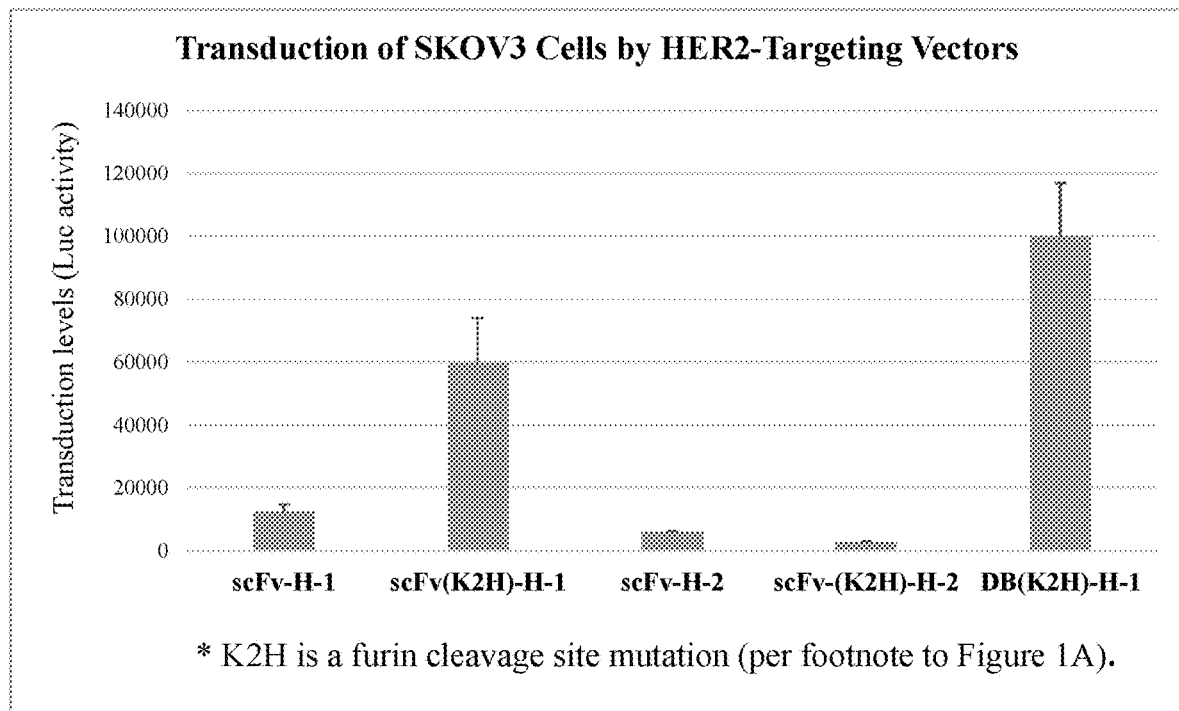
FIG. 9 illustrates luciferase assay from transduction of SKOV3 human ovarian cancer cells by the engineered viral vectors carrying HER2 targeting scFv (scFv-H-1 plasmid or scFv-H-2 plasmid) or HER2 targeting diabody (DB-H-1 plasmid) in the targeting moiety of the E2 domain. The modification involved the coding nucleotides from AAG(K) to CAC(H) in the targeting moiety of HER2 scFv or HER2 DB is called K2H (K to H; lysine to histidine) modification. In this experiment, the vectors with K2H modification are scFv(K2H)-H-1, scFv-(K2H)-H-2, and DB(K2H)-H-1 plasmids. The data indicates that K2H modification increased transduction of SKOV3 cells for the engineered viral vectors generated with scFv-H-1 and DB-H-1 plasmids (but not for H-2 due to low activity), targeting HER2 on the cell surface.

FIG. 7 shows the schematic configurations of scFv (left panel) and of DB (right panel) in SB envelope protein. Briefly, inside the E2 region of SB envelope protein, where the ZZ domain is located, is replaced with a targeting moiety, either scFv or DB. On the left panel, scFv-SB envelope protein construct comprises two base-linkers and one mid-linker that connects $V_H$ and $V_L$. On the right panel, DB-SB envelope protein construct comprises two base-linkers and three mid-linkers with two sets of $V_H$ and $V_L$. Based on diagram in FIG. 1A, the scFv or the DB is embedded at the targeting moiety (tm). For the DB embedded plasmid, from the N-terminus to the C-terminus of SB envelope protein, a base-linker comes after the first BstEII site on the N-terminus, then $V_H$, 18 amino acid-linker, $V_L$, 18 amino acid-linker, $V_H$, 18 amino acid-linker, and $V_L$ to link to another base-linker before the second BstEII site on the C-terminus.

Discovery of Furin Cleavage Site in the Targeting Moiety of scFv or DB of HER2

First, SB envelope gene was designed to incorporate a nucleic acid sequence encoding diabody of HER2. This GVO2.2-DB-H-1 plasmid was engineered in the $V_H$-$V_L$-linker-$V_H$-$V_L$ orientation with two different mid-linkers between the two scFvs. The first mid-linker (linker 1) has a 15mer of SSSSGSSSSGSSSSG (SEQ ID NO: 16) whereas the second mid-linker (linker 2) has an 18mer of SSGGGGSGGGGGGSSRSS (SEQ ID NO: 8). These HER2 targeting engineered viral vectors were generated using methods described in the previous examples. The engineered viral vectors targeting HER2 resulted in low transduction with slightly higher activity with the engineered viral vector with the linker 2. As shown in FIG. 8, Western blotting analysis using a rabbit anti-E2 polyclonal antibody (in-house made by GenScript) was performed with the samples of concentrated vector particles and the end of vector production cells. This analysis was run to figure out the reason for low transduction. Compared to the engineered viral vector generated from GVO2.2-scFv-C-1 plasmid, which was described in the Example 3, both engineered viral vectors generated from GVO2.2-scFv-H-1 and GVO2.2-DB-H-1 plasmids to target HER2 presented unexpected, smaller fragments of ~20 kDa. The intensity of small fragments of ~20 kDa bands became very low when the engineered viral vectors were generated in the presence of furin inhibitors, while the predicted bands with scFv or DB became much more visible. Therefore, the involvement of a furin cleavage site inside the scFv-H-1 or DB-H-1 was suspected of causing low transduction.

As shown in FIG. 8, predicted sizes for each SB envelope construct are: GVO2.2-scFv-C-1 (targeting CD47), 81 kDa; GVO2.2-scFv-H-1 (targeting HER2), 81.6 kDa; GVO2.2-DB-H-1 (targeting HER2), 110 kDa. It was assumed that the small fragments are due to furin cleavage, the size of those are 15.6 kDa and the remaining 65.8 kDa for GVO2.2-scFv-H-1 and 15.6 kDa, 28.5 kDa, 65.9 kDa for GVO2.2-DB-H-1.

Potential furin cleavage sites were estimated using the ProP-1.0 site (services.healthtech.dtu.dk/services/ProP-1.0/), which predicts the arginine and lysine pro-peptide cleavage sites in eukaryotic protein sequences. The amino acid sequence of HER2 antibody was reviewed and potential furin cleavage sites were found, and these furin cleavage sites could interfere with the generation of a functional HER2 targeting scFv or DB engineered viral vectors. Results indicate that potential furin cleavage sites existed in both scFv and diabody constructs of H-1 (HER2-targeted) GVO2.2.

Furin is a protease that cleaves specific peptide sequences, contributing to many proteins processing and activation of signaling molecules. The crucial role of furin is also known in viral envelope processing, and it plays a key role in the maturation of viral envelope protein to be functional. Based on the speculation that furin may digest consensus sequences within scFv-H-1 and DB-H-1 sequence, resulting in failing of the engineered viral vectors to transduce cells, furin inhibitors were added during the production of diabody engineered viral vectors. As a result, the diabody engineered viral vectors generated in the presence of furin inhibitors successfully showed a significant increased level of transduction in HER2-overexpressing cell line, SKBR3. In response to this observation, the potential furin site was mutated. Based on the amino acid sequence analysis, a lysine residue was mutated to a histidine, and this mutation can remove the furin cleavage site from the scFv and DB of HER2. This modification involved the coding nucleotides from AAG to CAC, therefore, it is called K2H (K to H; lysine to histidine) modification.

As shown in FIG. 9, the engineered viral vectors generated from the modified HER2-targeting constructs, both scFv(K2H) and DB(K2H), exhibited a great improvement in transduction. The transduction level of the engineered viral vectors generated with scFv(K2H)-H-1 or DB(K2H)-H-1 plasmids is dependent on the HER2 expression on the cells used for transduction. In this figure, scFv-H-1 and scFv-H-2 are based on two different antibodies, H-1 or H-2, which resulted in different transduction levels. scFv-H-1 refers to HER2-targeting scFv derived from H-1 mAb sequence; scFv(K2H)-H-1 refers to HER2-targeting scFv derived from H-1 mAb sequence and further comprises a modification to remove a furin cleavage site located in the HER2 scFv sequence; scFv-H-2 refers to HER2-targeting scFv derived from H-2 mAb sequence; scFv(K2H)-H-2 refers to HER2-targeting scFv derived from H-2 mAb sequence and further comprises a modification to remove a furin cleavage site located in the HER2 scFv sequence; DB(K2H)-H-1 refers to HER2-targeting DB derived from H-1 mAb sequence with a modification to remove a furin cleavage site located in the HER2 DB sequence. H-1 indicates anti-HER2 mAb, trastuzumab. H-2 indicates anti-HER2 mAb obtained from clone 191924.

In addition to HER2-diabody, EGFR diabody construct was also developed based on a mAb clone demonstrated high transduction in multiple cell lines by both conjugated and scFv forms. The diabody construct was generated in a similar way to the HER2-DB construct. However, transduction ability of the engineered viral vectors generated with the EGFR-DB envelope was very poor. The engineered viral vectors with EGFR-DB modification showed lower transduction than the corresponding scFv vector. Thus, testing each modification of the GVO2.2 construct is necessary to determine transduction ability of the engineered viral vector.

Overall, this experiment shows that a targeting moiety such as DB can be embedded in SB envelope protein. Also, this example shows that the presence of protease cleavage sites such as a furin cleavage site inside the targeting moiety can affect the transduction efficiency of the engineered viral vector.

Example 5. Modification of GVO2.2 into GVO2.2F Vector

Although the engineered viral vectors generated from the GVO2.2 plasmid show targeted transduction when conjugated with respective antibodies, absolute transduction levels have been lower compared to the viral vectors with the amphotropic envelope (RVE). One of the biggest questions about the mutations in the m168 construct was regarding ml, a deletion (amino acid 61-64) in the E3-E2 border (the numbering of the amino acids is based on SEQ ID NO: 1). This mutation removed the amino acid sequence RSKR (SEQ ID NO: 43) at the C-terminus of the E3 domain, which is a recognition sequence of furin cleavage site. This furin cleavage site is present in the wild-type sequence of the SB envelope protein. Thus, this ml mutation prevents furin cleavage from the construct, resulting in the E3 domain, which would normally be separated from the E2 domain, remaining as part of the E2 domain. Since this seemed to go against the original process of envelope protein maturation, the furin recognition sequence was re-introduced by inserting the original sequence into the GVO2.2 plasmid, and this new plasmid with a furin cleavage site at the E3-E2 border was named GVO2.2F. Overall, the GVO2.2F has m6, m8 modifications, an addition of the ZZ protein domain, the Y226G227 substitution in the E1 domain, and the furin cleavage site located at the E3-E2 border (replacing m1 modification in GVO2.2) when compared to a wild-type SB envelope protein.

Methods were performed as described in Example 1.

Figure 10:
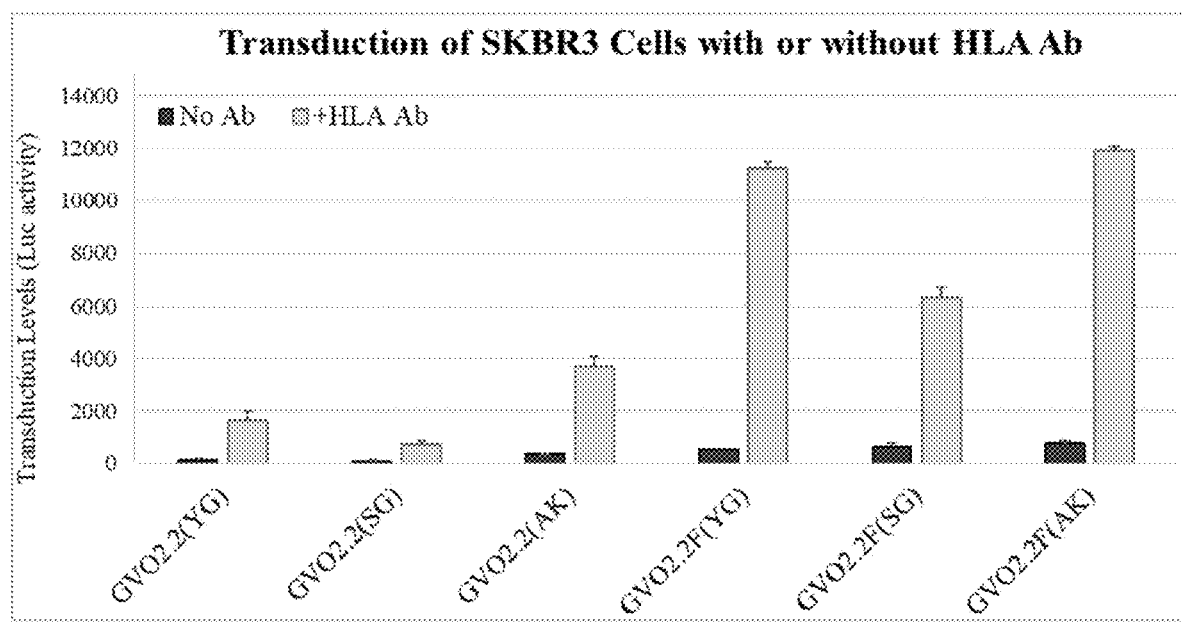
Figure 11:
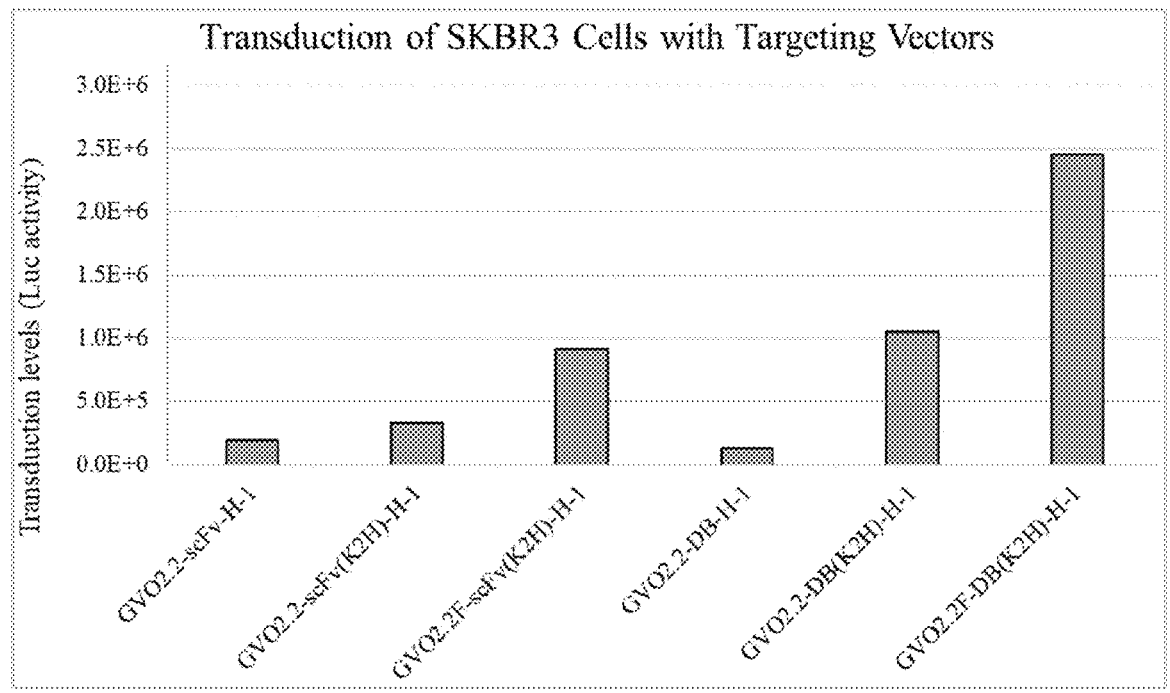
Figure 12:
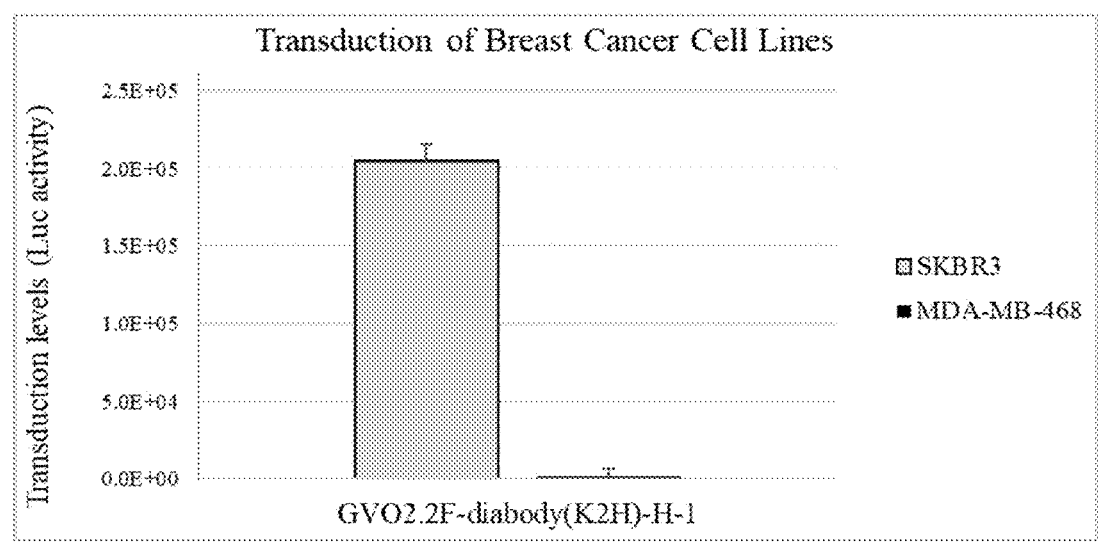
Figure 13A:
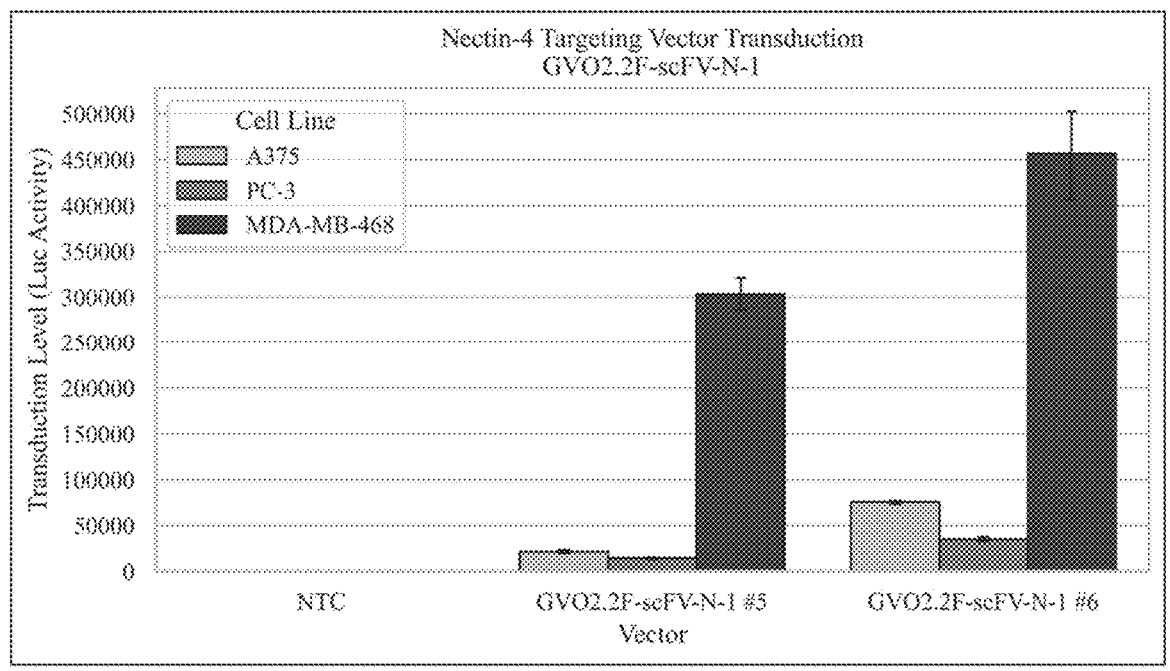
Figure 13B:
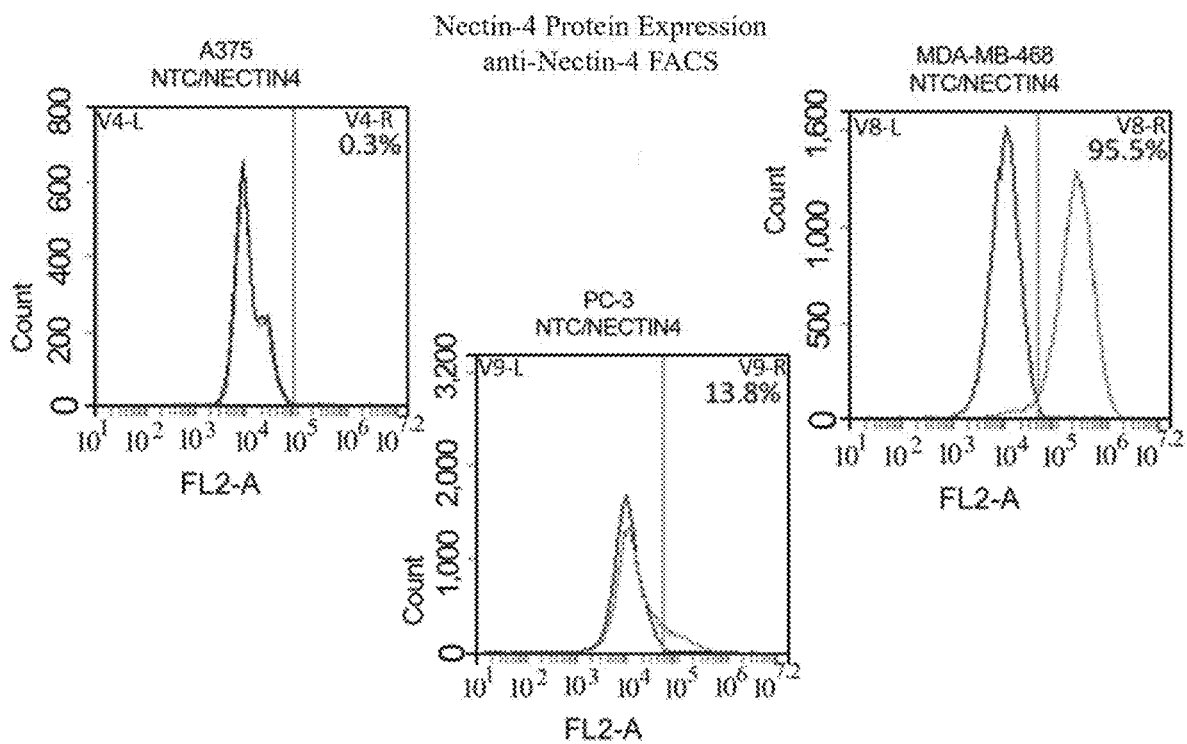

As shown in FIG. 10, the engineered viral vectors generated with modified GVO2.2F envelope plasmids, e.g., GVO2.2F-YG, GVO2.2F-SG, and GVO2.2F-AK conjugated with antibodies demonstrate a significant increase in transduction in every Abs examined, averaging 10-20 times higher than GVO2.2 with antibodies. Detailed mechanisms of action remain unclear, but dissociation of the E3 domain from the E2 domain might play a key role in this robust transduction. Importantly, this modification shows only a small increase in background transduction, such as transduction without conjugating antibodies. Also, when the engineered viral vectors generated with GVO2.2 or GVO2.2F plasmids conjugated with antibody, the transduction level of each engineered viral vector is different. The engineered viral vectors generated with GVO2.2F-AK and GVO2.2F-YG plasmids show the highest transduction, followed by GVO2.2F-SG plasmid in SKBR3 cells. Every cancer cell line shows different results with different mutations.

Overall, this result shows the improvement in transduction efficiency of engineered viral vectors generated with GVO2.2F plasmid by re-introducing the furin cleavage site to the E3-E2 border of modified SB envelope protein compared to transduction efficiency of engineered viral vectors generated from GVO2.2 plasmid.

Example 6: Modification of Targeting Moiety of GVO2.2F with scFv or Diabody

The GVO2.2F constructs from Example 5 can further be modified by inserting the scFv- or diabody-fragment into the GVO2.2F plasmid to replace a ZZ domain. Since all of scFv and DB fragments have BstEII sites at both ends, those constructs could be easily generated by inserting a scFv- or DB-fragment franked by BstEII restriction enzyme sites into the GVO2.2F plasmid.

Methods were performed as described in Example 1.

As shown in FIG. 11, HER2 targeting scFv and HER2 targeting diabody constructs with the GVO2.2F along with K2H modification (GVO2.2F-(K2H) [see GVO2.2F-scFv (K2H)-H-1 and GVO2.2F-DB(K2H)-H-1]) to remove a furin cleavage site in the targeting moiety, which was described in the example 4, show an improved transduction in SKBR3 cells when compared to the GVO2.2 construct with K2H modification [see GVO2.2-scFv(K2H)-H-1 and GVO2.2-DB(K2H)-H-1] or without K2H modification [see GVO2.2-scFv-H-1 and GVO2.2-DB-H-1].

Example 7: Specificity of the Targeting Moiety of the GVO2.2F Vectors

As described in Example 6, using GVO2.2F construct with the targeting moiety to generate engineered viral vectors, significant levels of transduction were demonstrated in the cells where targeted molecules were expressed. However, it is still unclear whether the targeting moiety specifically binds the targeted molecule before the transduction process, including internalization of the vector particle. To investigate this hypothesis, cancer cell lines from similar cancer types but with different levels of targeted receptor expression were utilized in this example.

Methods were performed as described in Example 1.

Breast cancer cell lines, SKBR3 and MDA-MB-468, express different levels of HER2 on the cell surface (confirmed by fluorescence-labeled HER2 antibody using FACS). As shown FIG. 12, engineered viral vectors generated from GVO2.2F-DB(K2H)-H-1 plasmid exhibit high transduction in HER2 overexpressing SKBR3 cells while low transduction is observed in MDA-MB-468 cells, which has low expression of HER2.

In addition, as shown in FIG. 13A, engineered viral vectors generated with GVO2.2F-scFv-N-1 (nectin-4) with two different linkers (configuration #5 and #6 in Table 1) could also specifically bind and transduce nectin-4 positive cell line, such as MDA-MB-468 cell line, but not cell lines low in nectin-4 expression, such as PC-3 and A375 cell lines. Such transduction efficiency is correlated with the expression level of nectin-4 on the cell surface, which is shown in FIG. 13B. NTC refers to the negative control of no transduced cells in the well (only non-transduced cells).

Alternatively, the specificity of the targeting vectors was examined using CHO-K1 cells. This cell line is not susceptible to amphotropic-pseudotyped MLV vectors. CHO-K1 cells were transduced with either lenti-EGFR-puro or lenti-HER2-puro vector to establish EGFR- or HER2-expressing stable cell lines. Next, the engineered viral vectors generated from GVO2.2F-scFv-E-1 plasmid showed transduction in CHO-K1-EGFR cell lines but not in parental CHO-K1 and CHO-K1-HER2 cells. Similarly, the engineered viral vectors generated from GVO2.2F-scFv(K2H)-H-1 plasmid demonstrated transduction in CHO-K1-HER2 cells but not in other cell lines. Based on these data, the engineered viral vectors with targeting moiety of scFv or DB showed good specificity.

Example 8: GCV-Mediated Cytotoxicity of GVO2.2F Vectors with HSV1-TK

In order to investigate functionality of the expressed protein when the target cells are transduced with the engineered viral vectors, Herpes Simplex Virus 1-Thymidine Kinase (HSV1-TK) was incorporated as a transgene, and ganciclovir (GCV)-mediated cytotoxicity in testing cells was examined. Mutant HSV1-TK has a higher substrate binding affinity to GCV over the natural substrate, thymidine, and its intracellular localization is altered by genetic modifications as presented in the U.S. Pat. No. 9,925,276 patent.

Methods were performed as described in Example 1.

GCV-Mediated Cell Kill Assay (Also Known as Relative Potency Assay)

SKBR3 cells plated in a 96-well plate were transduced with RDRS (amphotropic-pseudotyped MLV vector with the HSV1-TK mutant, clarified material from GVO manufacturing) and GVO2.2F-scFv-H-1 or GVO202F-DB-H-1 at the same genome copy titer in the presence of polybrene (8 μg/mL). Vectors were 2-fold serially diluted; starting from 4e7 to 1.56e5 RNA genome copies per well. Next day, culture medium was replaced with the medium containing 20 μM GCV. Since SKBR3 cells are relatively slowly growing cells, cells were cultured 5 days after adding GCV as opposed to 3 days with A375 cells (cell doubling time of less than 1 day), for example. Cell viability was determined by PrestoBlue and the cell kill was analyzed using the 4PL curve (SpectraMax M5).

Some breast cancer cell lines with high HER2 expression, such as SKBR3 and SKOV3 cells, were examined with engineered viral vectors generated from GVO2.2F-scFv (K2H)-H-1 or GVO2.2F-DB(K2H)-H-1 plasmids bearing payload genes for the expression of human granulocyte-macrophage colony stimulating factor (GM-CSF) and HSV1-TK. Cell kill experiments were performed accordingly to assess transduction efficiency in comparison with a previously qualified reference standard (Research and Development Reference Standard (RDRS) 20A) bearing the same payload genes.

Figure 14A:
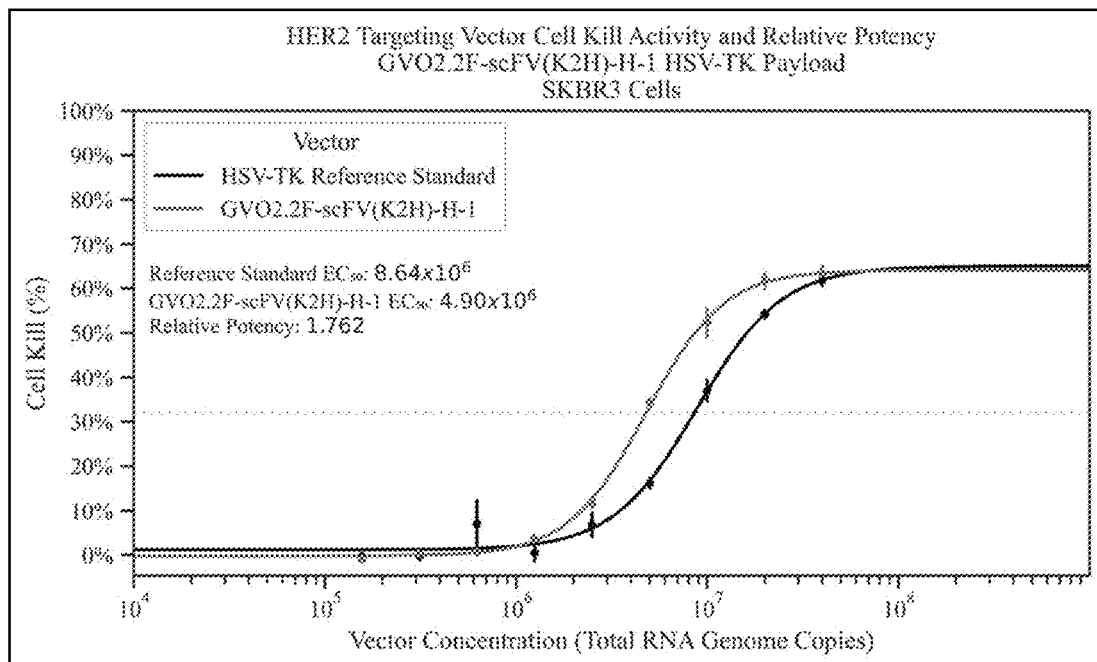
Figure 14B:
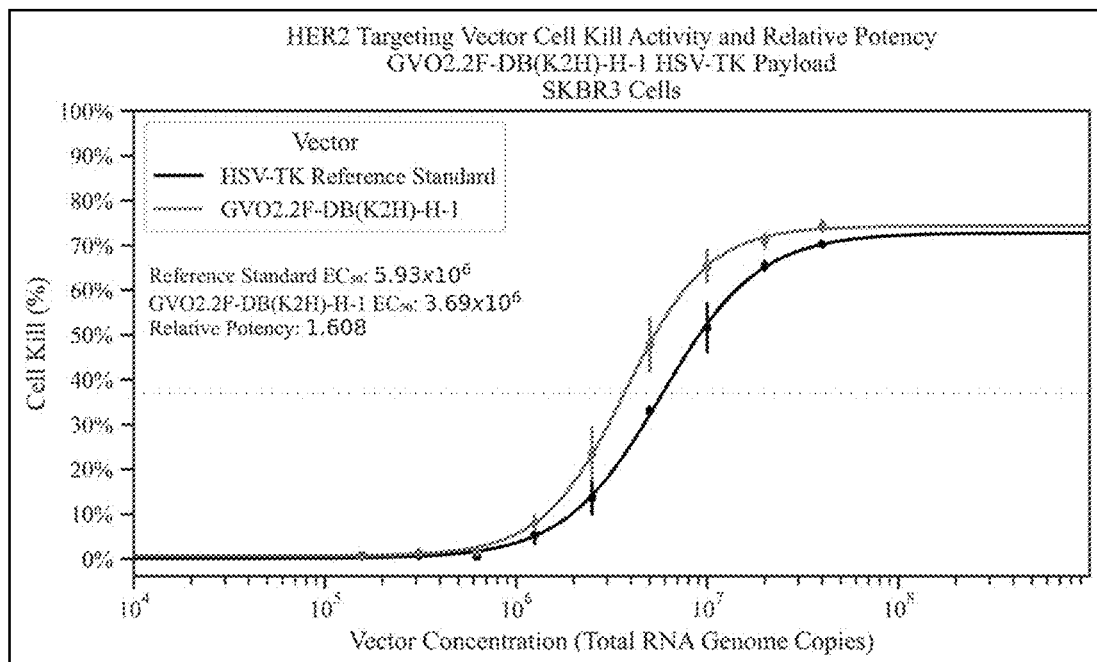

As shown in FIGS. 14A-14B, the engineered viral vectors generated with GVO2.2F-scFv(K2H)-H-1 (FIG. 14A) and GVO2.2F-DB(K2H)-H-1 plasmids (FIG. 14B) exhibit significant cell kill activity in SKBR3 cells. In particular, the cell kill from the engineered viral vectors generated from either scFv(K2H)-H-1 or DB(K2H)-H-1 plasmids in SKBR3 cells was higher than the RDRS20A reference standard material. In SKOV3 cells, the cell kill rate by the engineered viral vector generated with either scFv(K2H)-H-1 or DB(K2H)-H-1 plasmid was slightly lower than the RDRS20A.

Example 9: Incorporation of Receptor Ligands as Targeting Moieties in GVO2.2F Vectors Based on the successful results obtained from incorporating targeting moiety of either scFv or DB into the SB envelope protein, pseudotyped engineered viral vector, e.g., pseudotyped MLV vectors with SB envelope protein, should be able to incorporate other ligands for cell surface receptors and can be used as binding mechanisms to initiate transduction into the target cells. Those ligands include, but are not limited to, G protein-coupled receptor ligands such as endorphins and oxytocin, ligand peptides for GPR78, small peptide ligands of EGFR, and the C-terminal domain of thrombospondin for CD47. This system has the potential to be applied to many other ligand-receptor relationships.

Example 10: Application of GVO2.2 or GVO2.2F Vectors to Vaccine Products

New types of vaccine products have been recently authorized for SARS-CoV-2, including mRNA and adenoviral vectors. Both vaccines are introduced to cells and generate immunogens to trigger an immune reaction. This differs significantly from traditional vaccine products, which are comprised of the immunogen itself. Therefore, retroviral vectors can also function as vaccines, where the RNA genome is reverse transcribed to a complementary DNA, which subsequently is transcribed into multiple mRNA copies over an extended period of time. Accordingly, there is the potential of a greater duration of immunogen expression and associated immune reaction compared to vaccines delivering mRNA alone. These considerations are independent of the envelope protein(s) expressed on the surface of the viral or vector particles; retroviral vectors bearing either wild-type or engineered envelope proteins (or mixtures thereof) all have the potential to serve as vaccines by bearing genomes encoding for immunogenic payloads, including those bearing Sindbis envelope proteins.

GVO-wtSB Vector

Wild-type SB (wtSB) has a broad tropism. Therefore, the envelope protein derived from wtSB is a strong candidate for use in retroviral vectors intended for vaccines. To generate GVO-wtSB, part of the wild-type sequence was synthesized to replace the mutated sequence in GVO2.2 (SEQ ID NO: 20). Transduction experiments were conducted using multiple cell lines. The absolute transduction levels were lower than for antibody-conjugated or scFv- or diabody-vectors; however, most cell lines showed susceptibility to the GVO-wtSB vector.

GVO-E160G-SB Vector

In addition to the wild-type construct, a mutant with a single amino acid substitution of the wild-type construct, GVO-E160G-wtSB (SEQ ID NO: 22), was also generated to preferentially target antigen-presenting cells (Gardner et al. J. Virol. 2000, 74: 11849-57). Antigen-presenting cells are a gateway to the immune reaction; therefore, targeting the antigen-presenting cells, such as dendritic cells, may induce an immune response. The construct GVO-E160G-wtSB was generated by a mutagenesis using GVO-wtSB plasmid (SEQ ID NO: 21) as a template. The vectors were generated and tested on cancer cell lines. However, the transduction levels are lower than the engineered viral vectors generated with GVO-wtSB plasmid. When the vectors with this envelope were examined in murine dendritic cells, transduction efficiency was also very low.

GVO2.2F-CoVec(N) Vector

The E2 of SB envelope protein has a capacity to incorporate additional component regardless of its size. Thus, partial, or entire viral proteins, such as envelope or spike protein, can be inserted into the E2 domain. In the previous examples, the use of the SB envelope protein as a scaffold to incorporate IgG Fc binding domain (ZZ protein domain), scFv, and diabody was described. These different components are inserted to the BstEII site in the E2 region of GVO2.2 constructs. To date, not enough information regarding the size limitation is available; however, the capacity seems to be fairly high because the diabody insert is about 55 kDa in length, encoding a polypeptide of 531 amino acids, while the wtSB has only a few amino acids in the corresponding region (the entire wtSB is about 108 kDa, and the E2 region is about 47 kDa).

As an example of immunogenic protein, N-terminal domain (NTD) of SARS-CoV-2 spike protein was inserted into the BstEII site to generate GVO2.2F-CoVec(N) construct (SEQ ID NO: 23). The SB-CoVec(N)-pseudotyped MLV vector was generated by conventional triple-plasmid transfection. This vector has an MLV core with an SB envelope protein incorporating the NTD of SARS-CoV-2's spike protein. The MLV core is capable of bearing any gene of interest of sizes comparable to the full-length Spike or specific region of the SARS-CoV-2 virus. The vector was then assembled and examined in an animal model for an immune response against the SARS-CoV-2. This vector provides the protein on the vector surface as an immunogen in addition to the MLV payload. Such an engineered viral vector is suitable for evaluation in animal models to investigate if an immune reaction is stimulated against the SARS-CoV-2 envelope spike protein.

Example 11: Combination Therapy of Two GVO-Pseudotyped Vectors

Transduction of BT474 cells was examined with either a single agent (GVO2.2-scFv-C-1, GVO2.2-scFv-H-1, or GVO2.2-DB(K2H)-H-1 vector) or a combination of two GVO-pseudotyped vectors.

Methods were performed as described in Example 1.

Figure 15A:
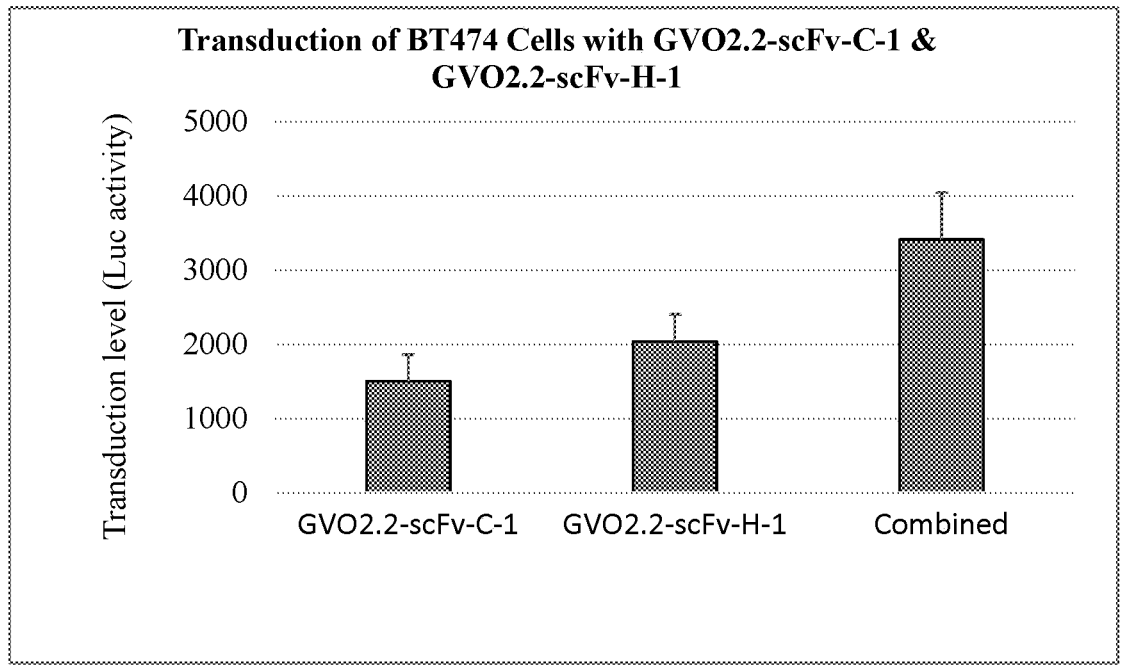
Figure 15B:
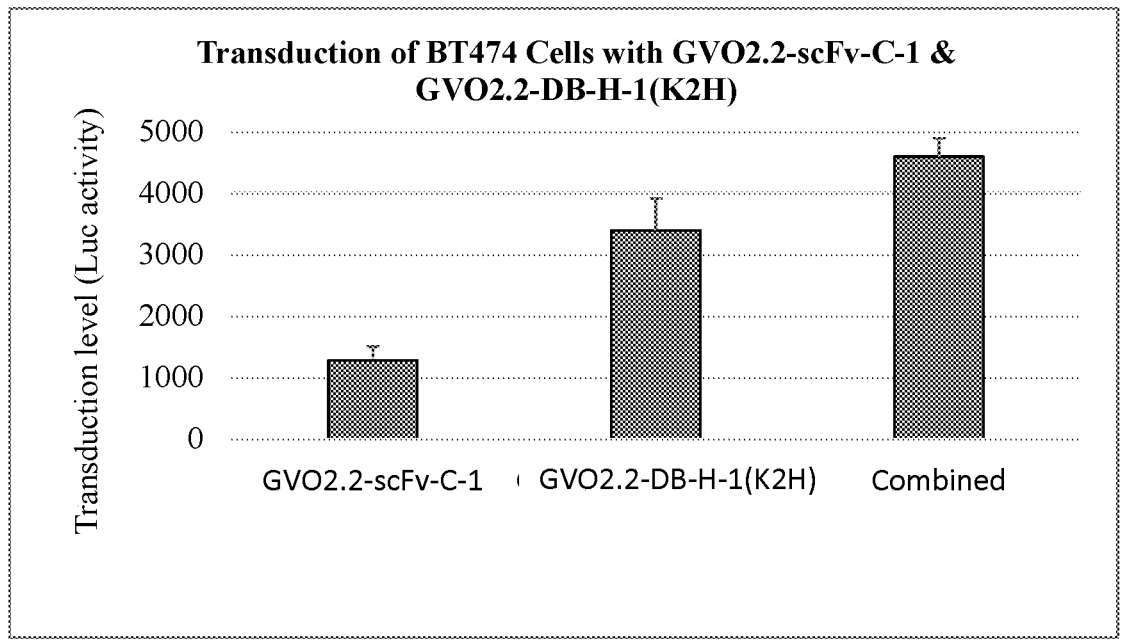

As shown in FIG. 15A, a combination of two GVO-pseudotyped vectors, GVO2.2-scFv-C-1 and GVO2.2-scFv-H-1, shows an increased effect of transduction in BT474 cells as compared to a single agent GVO2.2-scFv-C-1 or GVO2.2-scFv-H-1. As shown in FIG. 15B, a combination of two GVO-pseudotyped vectors, GVO2.2-scFv-C-1 and GVO2.2-DB(K2H)-H-1, shows an increased effect of transduction in BT474 cells as compared to a single agent GVO2.2-scFv-C-1 or GVO2.2-DB(K2H)-H-1. These results demonstrate that different combinations of GVO-pseudotyped vectors can be used to target two different surface molecules in the same cell population.

Figure 16A:
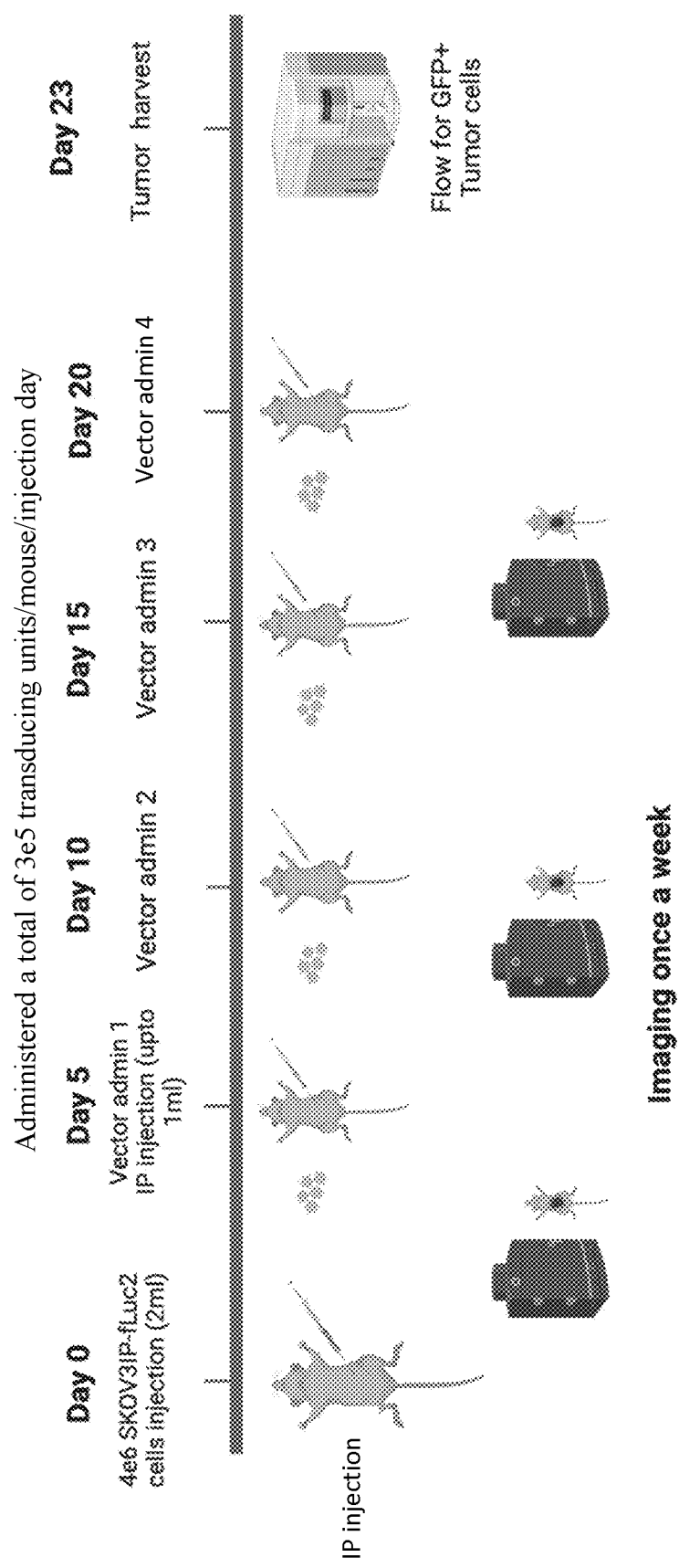

Example 12: Effective Transduction by GVO2.2F-DB(K2H)-H-1 Vector Over RVE Control Vector In Vivo As shown in FIG. 16A, human ovarian cancer SKOV3ip-fLuc2 cells were intraperitoneally injected into immunodeficient mice. Five days post injection, GFP-expressing GVO2.2F-DB(K2H)-H-1 vector, GFP-expressing RVE control vector, or control media was injected intraperitoneally 4 times every 5 days to each group of mice (n=6). For each injection, the vector at the same infectious titer was injected per mouse per day. Tumor growth was tracked by bioluminescence imaging, and overall growth was monitored by animal weight (no difference between groups, data not shown). On day 23, animals were sacrificed, and tumors were harvested from the abdominal cavity. Collected cells were dissociated and subjected to flow cytometry, using an antibody against anti-human β2 macroglobulin (huβ2M) to identify the SKOV3ip-fLuc2 human tumor cells.

Figure 16B:
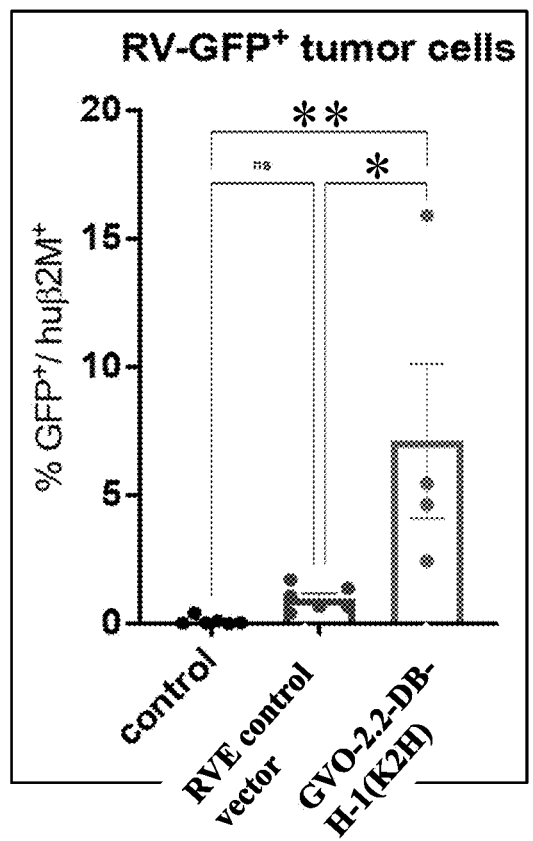
Figure 16C:
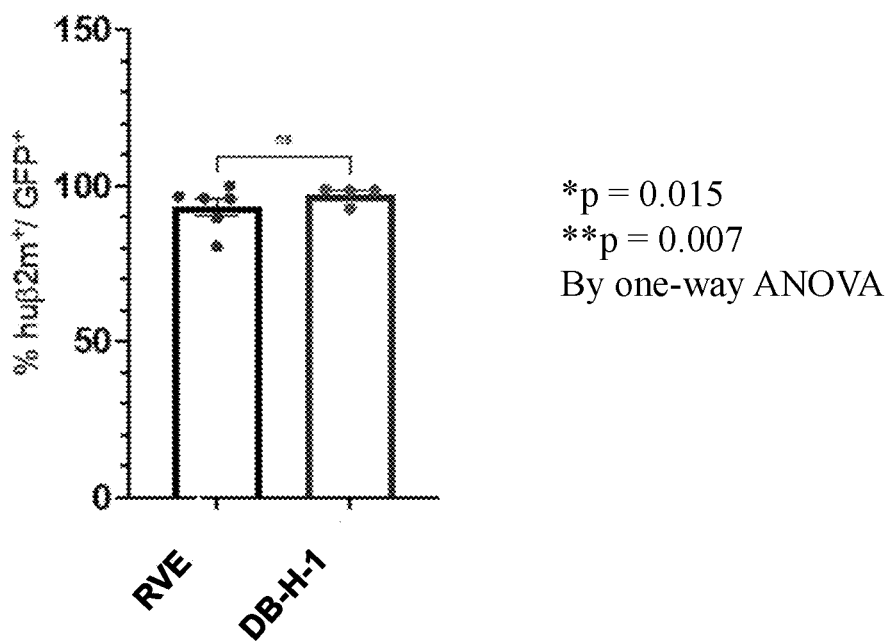

The transduction of the corresponding vector is represented by the percentage of $GFP^+$/hu $β2M^+$ tumor cells. As shown in FIG. 16B, the population of GFP-positive human tumor cells ($GFP^+$/hu $β2M^+$) was significantly higher in the GVO2.2F-DB(K2H)-H-1 group than in control group and RVE control vector group. Meanwhile, the percentage of tumor cells within GFP-positive population was comparable between the GVO2.2F-DB(K2H)-H-1 group and the RVE control vector group (shown in FIG. 16C). These results demonstrate effective transduction by GVO2.2F-DB(K2H)-H-1 over RVE control vector in tumor cell in vivo.

Figure 17A:
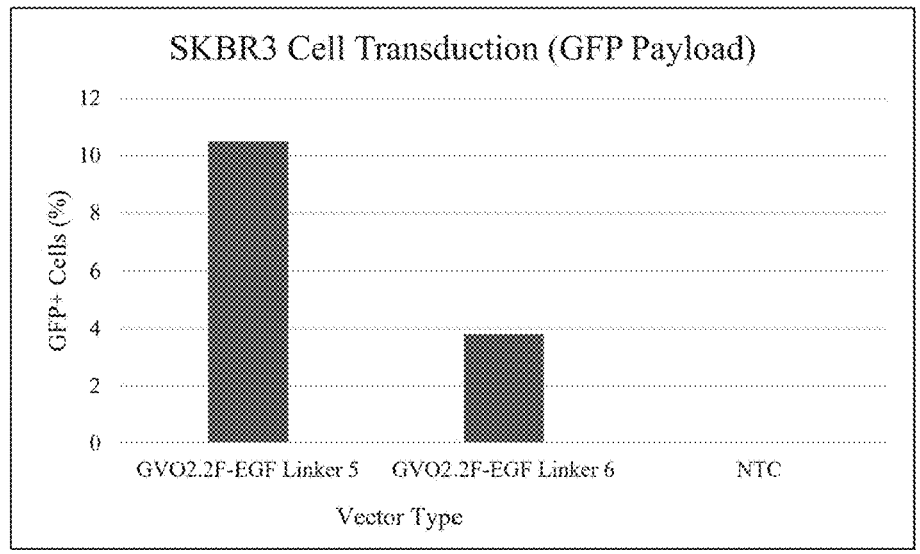
Figure 17B:
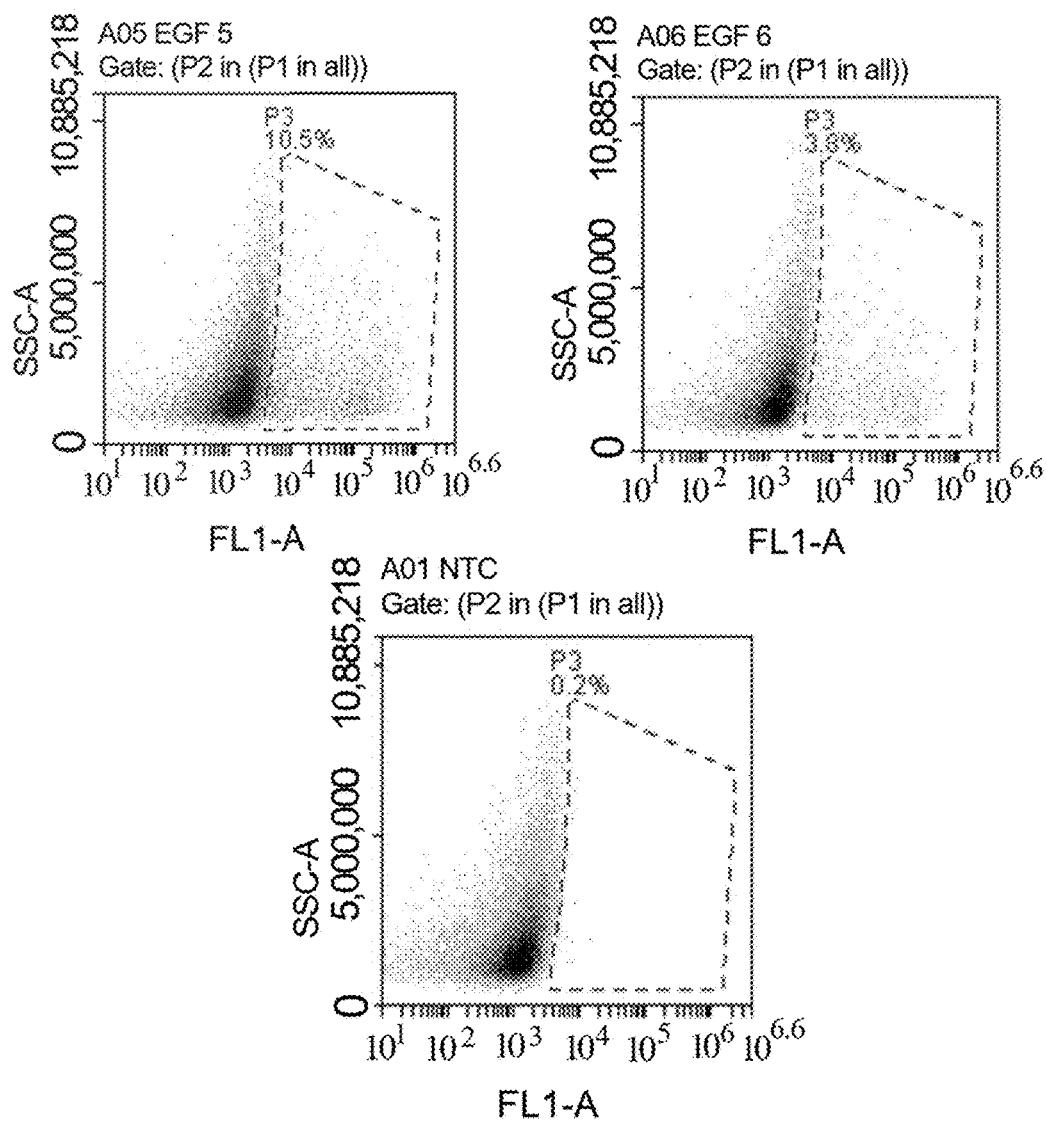

Example 13: EGFR-Targeting Vector Effectively and Specifically Transduces Target Cells Expressing EGFR EGFR-targeting vector was constructed using EGF core domain (53 amino acids) incorporating modified Sindbis envelope. The EGFR-targeting vector was used to transduce SKBR3 cells. The physical titer of GVO2.2F-EGF Linker 5 used for transduction was 4.6e6 vector genome copies/well. The physical titer of GVO2.2F-EGF Linker 6 used for transduction was 5.2e6 vector genome copies/well. FIGS. 17A and 17B show that the EGFR-targeting vector successful transduced SKBR3 cells using EGF ligand targeting. The EGFR-targeting vector comprising Linker 5 transduced the cells better under these conditions.

Figure 18:
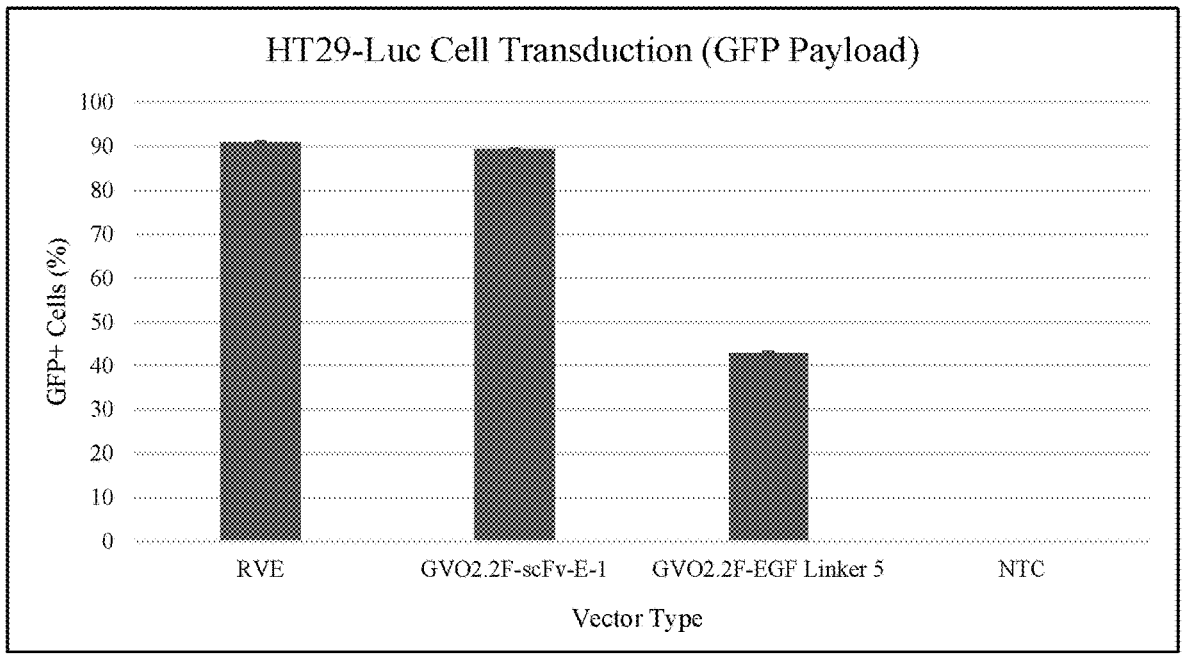

The EGFR-targeting vector was used to transduce HT29-Luc cells. The physical titer of RVE control vector used for transduction was 2.75e8 vector genome copies/well. The physical titer of GVO2.2F-scFv-E-1 used for transduction was 2.6e8 vector genome copies/well. The physical titer of GVO2.2F-EGF Linker 5 used for transduction was 6.6e7 vector genome copies/well. NTC is the non-transduced control cells. FIG. 18 shows that when accounting for difference in physical titer used for transduction, EGF ligand targeting had similar relative infectivity compared to RVE vectors and GVO2.2F-scFv-E-1 in HT-29-Luc cells.

Figure 19:
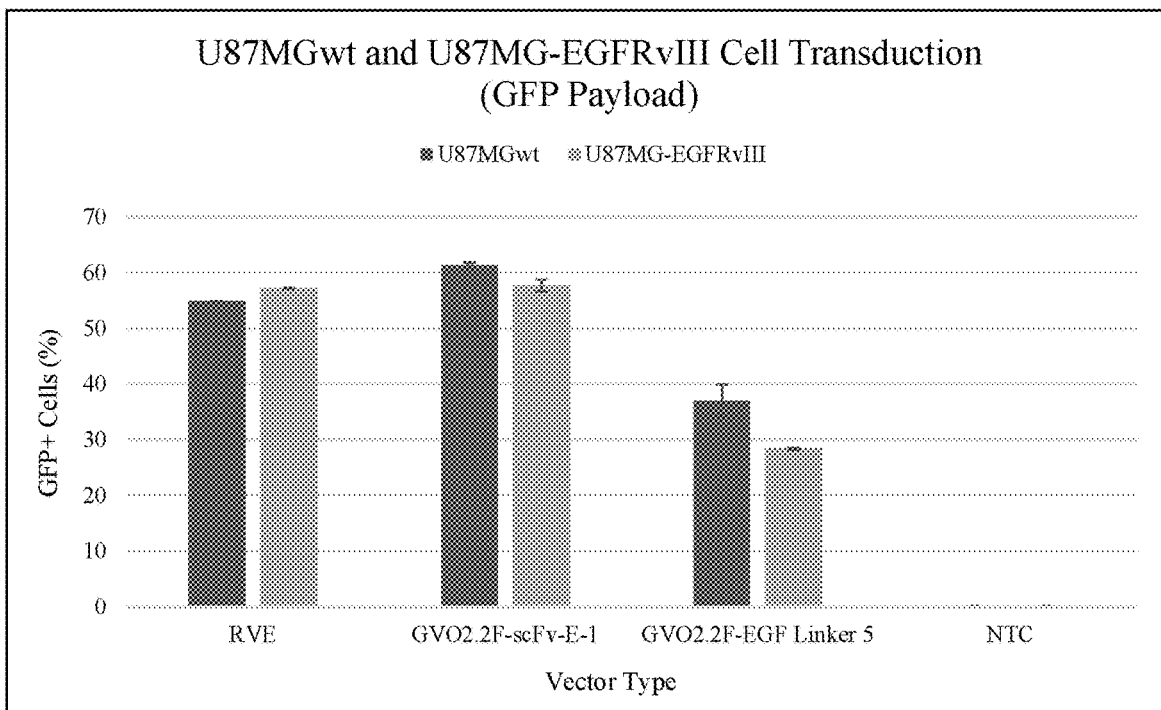

EGFRvIII is a constitutively active EGFR mutant that cannot bind to EGF ligand due to extracellular truncation. EGFRvIII comprises the deletion of domain I (L1) and domain II (CRI) or deletion of amino acids 6-273 of EGFR. The EGFR-targeting vector was evaluated for transduction using U87MG wild-type (U87MGwt) cells and U87MG-EGFRvIII cells. FIG. 19 shows that GVO2.2F-scFv-E-1 and GVO2.2F-EGF Linker 5 vectors can both transduce U87-EGFRvIII cells.

Figure 20:
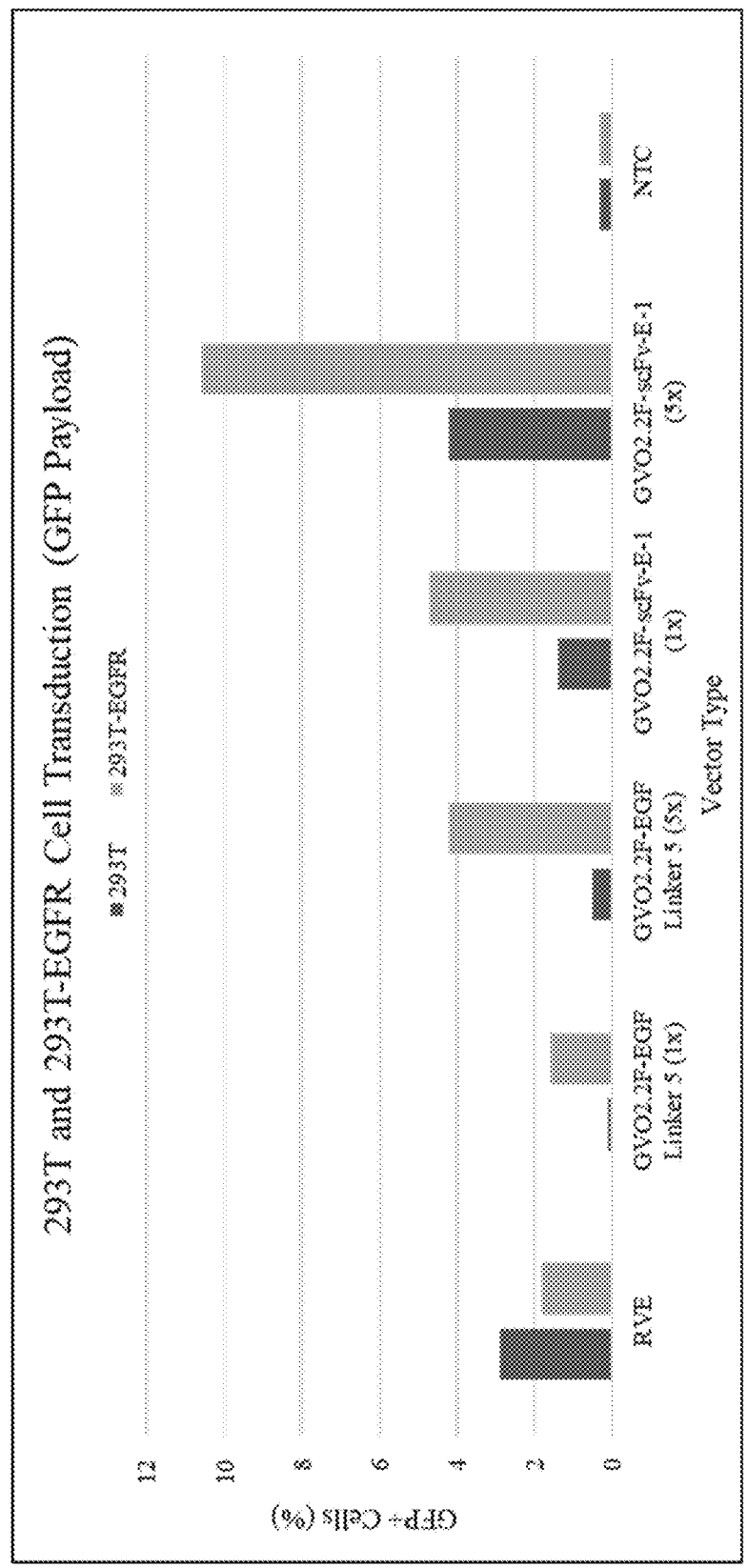

The EGFR-targeting vector was evaluated for transduction specificity by transducing wild-type 293T cells and EGFR-expressing 293T cells at two different multiplicity of infection (MOI). 5× in FIG. 19 indicates 5 times more vector was used in the experiment. The physical titer of all vectors used for transduction was 5e7 vector genome copies/well. FIG. 20 shows the binding specificity of the targeting vectors, including GVO2.2F-scFv-E-1 and GVO2.2F-EGF Linker 5 vectors.

Figure 21:
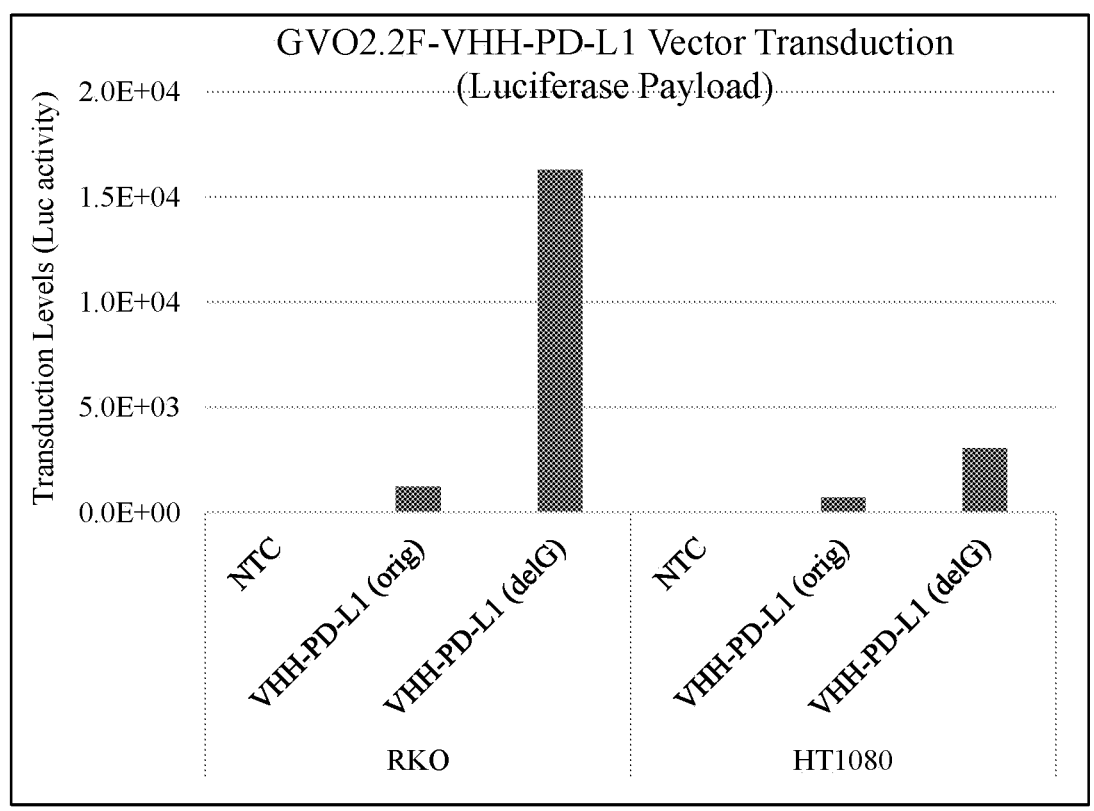

Example 14: PD-L1-Targeting Vector Comprising Anti-PD-L1 $V_HH$ Successfully Transduce PD-L1-Expressing Cells PD-L1-targeting vector was a retroviral vector that was constructed to comprise modified Sindbis envelope comprising anti-PD-L1 $V_HH$. The PD-L1-targeting vector was used to transduce PD-L1-expressing cells, including RKO cells and HT1080 cells. orig and delG are two different anti-PD-L1 $V_HH$ vectors. Amino acid sequence is optimized in delG. FIG. 21 shows that the PD-L1-targeting vector successfully transduced both RKO cells and HT1080 cells. The transduction level in RKO cells were higher due to the higher expression of PD-L1 compared to HT1080 cells.

Figure 22:
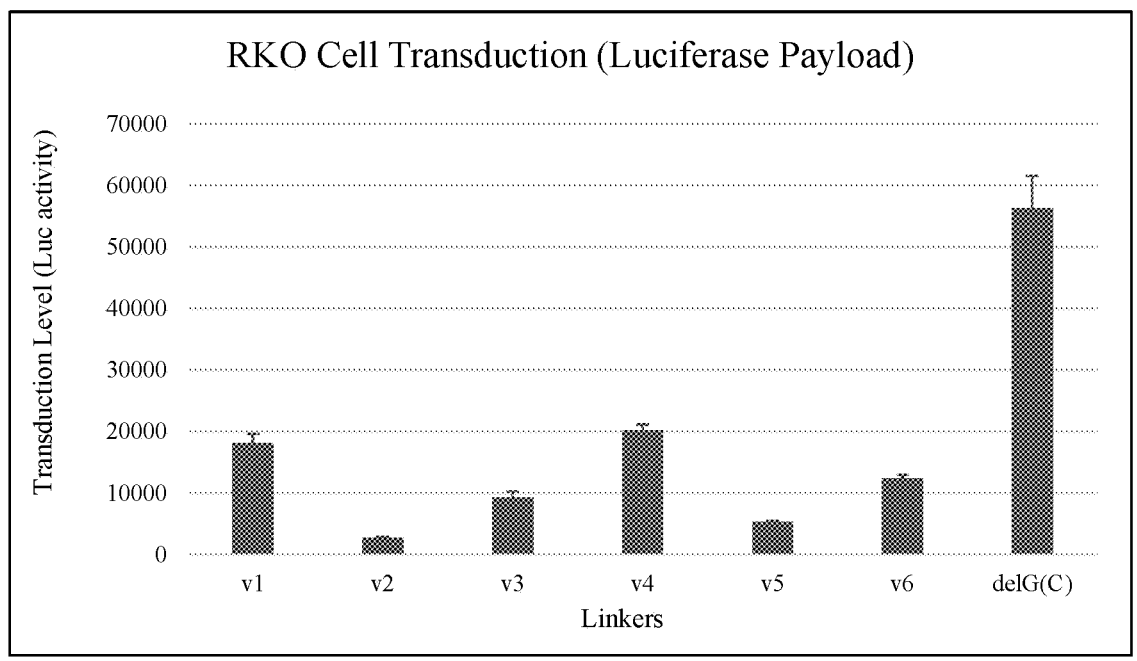
Figure 23:
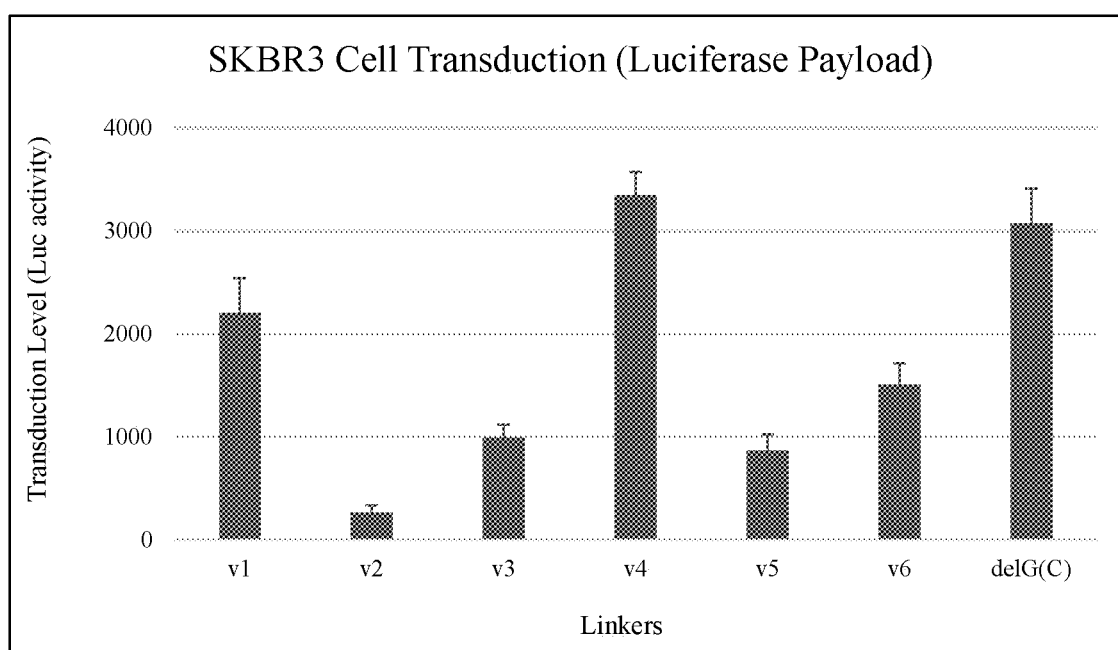

Various linkers were evaluated for their impact on transduction efficiency of the targeting vector. The linkers and their configurations are v1: GGGGS-AAGHVG-$V_H$H-GVHGAA (SEQ ID NOS 27 and 40), v2: AAGHVG-$V_H$H-GVHGAA-GGGGS (SEQ ID NOS 6 and 31), v3: GGGGS-AAGHVG-$V_H$H-GVHGAA-GGGGS (SEQ ID NOS 27 and 31), v4: GGGGS-GGGGS-AAGHVG-$V_H$H-GVHGAA (SEQ ID NOS 41 and 40), v5: AAGHVG-$V_H$H-GVHGAA-GGGGS-GGGGS (SEQ ID NOS 6 and 42), v6: GGGGS-GGGGS-AAGHVG-$V_H$H-GVHGAA-GGGGS-GGGGS (SEQ ID NOS 41 and 42). FIGS. 22 and 23 show that except v4 in SKBR3, none of the constructions showed higher transduction than the delG optimized $V_H$H construct. Moreover, consistent pattern was observed in both cell lines. For example, v2 and v5 had lower transduction levels.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments described herein may be employed. It is intended that the following claims define the scope of the disclosure and that methods and structures within the scope of these claims and their equivalents be covered thereby.

SEQUENCES

| SEQ ID NO: | Description | Sequence |
|---|---|---|
| 1 | Wild-type SB envelope protein | MASAAPLVTAMCLLGNVSFPCDRPPTCYTREPSRALDILE ENVNHEAYDTLLNAILRCGSSGRSKRSVIDDFTLTSPYLG TCSYCHHTVPCFSPVKIEQVWDEADDNTIRIQTSAQFGYD QSGAASANKYRYMSLKQDHTVKEGTMDDIKISTSGPCRRL SYKGYFLLAKCPPGDSVTVSIVSSNSATSCTLARKIKPKF VGREKYDLPPVHGKKIPCTVYDRLKETTAGYITMHRPRPH AYTSYLEESSGKVYAKPPSGKNITYECKCGDYKTGTVSTR TEITGCTAIKQCVAYKSDQTKWVFNSPDLIRHDDHTAQGK LHLPFKLIPSTCMVPVAHAPNVIHGFKHISLQLDTDHLTL LTTRRLGANPEPTTEWIVGKTVRNFTVDRDGLEYIWGNHE PVRVYAQESAPGDPHGWPHEIVQHYYRHPVYTILAVASA TVAMMIGVTVAVLCACKARRECLTPYALAPNAVIPTSLAL LCCVRSANAETFTETMSYLWSNSQPFFWVQLCIPLAAFIV LMRCCSCCLPFLVVAGAYLAKVDAYEHATTVPNVPQIPYK ALVERAGYAPLNLEITVMSSEVLPSTNQEYITCKFTTVVP SPKIKCCGSLECQPAAHADYTCKVFGGVYPFMWGGAQCFC DSENSQMSEAYVELSADCASDHAQAIKVHTAAMKVGLRIV YGNTTSFLDVYVNGVTPGTSKDLKVIAGPISASFTPFDHK VVIHRGLVYNYDFPEYGAMKPGAFGDIQATSLTSKDLIAS TDIRLLKPSAKNVHVPYTQASSGFEMWKNNSGRPLQETAP FGCKIAVNPLRAVDCSYGNIPISIDIPNAAFIRTSDAPLV STVKCEVSECTYSADFGGMATLQYVSDREGQCPVHSHSST ATLQESTVHVLEKGAVTVHFSTASPQANFIVSLCGKKTTC NAECKPPADHIVSTPHKNDQEFQAAISKTSWSWLFALFGG ASSLLIIGLMIFACSMMLTSTRR |
| 2 | Base-linker #1 | GGGGSGGGGS |
| 3 | Base-linker #2 (Whitlow/218 linker) | GSTGSGSKPGSGEGSTKG |
| 4 | Base-linker #3 (IgG4 hinge region between Fac and Fc) | ESKYGPPCPSCPAPEFLGGP |
| 5 | Base-linker #4 (hIgG1 hinge region) | EPKSCDKTHTCPPCPAPELLGGP |
| 6 | Base-linker #5 | AAGHVG |
| 7 | Mid-linker scFv#1 | GGGGSGGGGSGGGGS |
| 8 | Mid-linker scFv#2 | SSGGGGSGGGGGGSSRSS |
| 9 | Construct #1 of GVO2.2 plasmid with CD47-scFv | GGGGSGGGGSEVQLQQSGADLVRPGALVKLSCKASGFNIK DYYLYWVKQRPEQGLEWIGWIDPQNVNTLFDPKFQGKASL TADTSSNTVYLQLSSLTSEDTAVYYCARGGKRAMDYWGQG TSVTVSSGGGGSGGGGSGGGGSDVLMTQSPLSLPVTLGDQ ASISCRSSQTIVHSNGYTYLGWYLQKPGQSPKLLIYKVSN RFSGVPDRFSGSGSGTDFTLKISRVEAEDLGVYYCFQGSH VPFTFGSGTKLEIKSGGGGSGGGG |
| 10 | Construct #2 of GVO2.2 plasmid with CD47-scFv | GSTGSGSKPGSGEGSTKGEVQLQQSGADLVRPGALVKLSC KASGFNIKDYYLYWVKQRPEQGLEWIGWIDPQNVNTLFDP KFQGKASLTADTSSNTVYLQLSSLTSEDTAVYYCARGGKR AMDYWGQGTSVTVSSGGGGSGGGGSGGGGSDVLMTQSPLS LPVTLGDQASISCRSSQTIVHSNGYTYLGWYLQKPGQSPK LLIYKVSNRFSGVPDRFSGSGSGTDFTLKISRVEAEDLGV YYCFQGSHVPFTFGSGTKLEIKGKTSGEGSGPKSGSGTSG |
| 11 | Construct #3 of GVO2.2 plasmid with CD47-scFv | ESKYGPPCPSCPAPEFLGGPEVQLQQSGADLVRPGALVKL SCKASGFNIKDYYLYWVKQRPEQGLEWIGWIDPQNVNTLF DPKFQGKASLTADTSSNTVYLQLSSLTSEDTAVYYCARGG KRAMDYWGQGTSVTVSSGGGGSGGGGSGGGGSDVLMTQSP LSLPVTLGDQASISCRSSQTIVHSNGYTYLGWYLQKPGQS PKLLIYKVSNRFSGVPDRFSGSGSGTDFTLKISRVEAEDL GVYYCFQGSHVPFTFGSGTKLEIKPGGLFEPAPCSPCPPG YKSE |
| 12 | Construct #4 of GVO2.2 plasmid with CD47-scFv | EPKSCDKTHTCPPCPAPELLGGPEVQLQQSGADLVRPGAL VKLSCKASGFNIKDYYLYWVKQRPEQGLEWIGWIDPQNVN TLFDPKFQGKASLTADTSSNTVYLQLSSLTSEDTAVYYCA |

| SEQ ID NO: | Description | Sequence |
|---|---|---|
| | | RGGKRAMDYWGQGTSVTVSSGGGGSGGGGSGGGGSDVLMT QSPLSLPVTLGDQASISCRSSQTIVHSNGYTYLGWYLQKP GQSPKLLIYKVSNRFSGVPDRFSGSGSGTDFTLKISRVEA EDLGVYYCFQGSHVPFTFGSGTKLEIKPGGLLEPAPCPPC THTKDCSKPE |
| 13 | Construct #5 of GVO2.2 plasmid with CD47-scFv | GGGGSGGGGSEVQLQQSGADLVRPGALVKLSCKASGFNIK DYYLYWVKQRPEQGLEWIGWIDPQNVTLFDPKFQGKASL TADTSSNTVYLQLSSLTSEDTAVYYCARGGKRAMDYWGQG TSVTVSSSSGGGGSGGGGGGSSRSSDVLMTQSPLSLPVTL GDQASISCRSSQTIVHSNGYTYLGWYLQKPGQSPKLLIYK VSNRFSGVPDRFSGSGSGTDFTLKISRVEAEDLGVYYCFQ GSHVPFTFGSGTKLEIKSGGGGSGGGG |
| 14 | Construct #6 of GVO2.2 plasmid with CD47-scFv | AAGHVGEVQLQQSGADLVRPGALVKLSCKASGFNIKDYYL YWVKQRPEQGLEWIGWIDPQNVTLFDPKFQGKASLTADT SSNTVYLQLSSLTSEDTAVYYCARGGKRAMDYWGQGTSVT VSSSSGGGGSGGGGGGSSRSSDVLMTQSPLSLPVTLGDQA SISCRSSQTIVHSNGYTYLGWYLQKPGQSPKLLIYKVSNR FSGVPDRFSGSGSGTDFTLKISRVEAEDLGVYYCFQGSHV PFTFGSGTKLEIKGVHGAA |
| 15 | Construct #7 of GVO2.2 plasmid with CD47-scFv | ESKYGPPCPSCPAPEFLGGPEVQLQQSGADLVRPGALVKL SCKASGFNIKDYYLYWVKQRPEQGLEWIGWIDPQNVTLF DPKFQGKASLTADTSSNTVYLQLSSLTSEDTAVYYCARGG KRAMDYWGQGTSVTVSSSSGGGGSGGGGGGSSRSSDVLMT QSPLSLPVTLGDQASISCRSSQTIVHSNGYTYLGWYLQKP GQSPKLLIYKVSNRFSGVPDRFSGSGSGTDFTLKISRVEA EDLGVYYCFQGSHVPFTFGSGTKLEIKPGGLFEPAPCSPC PPGYKSE |
| 16 | Mid-linker DB #1 | SSSSGSSSSGSSSSG |
| 17 | HSV1-TK | MASYPGHQHASAFDQAARSRGHSNRRTALRPRRQQEATEV RPEQKMPTLLRVYIDGPHGMGKTTTTQLLVALGSRDDIVY VPEPMTYWRVLGASETIANIYTTQHRLDQGEISAGDAAVV MTSAQITMGMPYAVTDAVLAPHIGGEAGSSHAPPPALTLI FDRHPIAALLCYPAARYLMGSMTPQAVLAFVALIPPTLPG TNIVLGALPEDRHIDRLAKRQRPGERLDLAMLAAIRRVYG LLANTVRYLQCGGSWREDWGQLSGTAVPPQGAEPQSNAGP RPHIGDTLFTLFRAPELLAPNGDLYNVFAWALDVLAKRLR |
| 18 | NES | LQKKLEELELDG |
| 19 | Amino acid sequence of SB E1 on GVO2.2 plasmid | YEHATTVPNVPQIPYKALVERAGYAPLNLEITVMSSEVLP STNQEYITCKFTTVVPSPKIKCCGSLECQPAAHADYTCKV FGGVYPFMWGGAQCFCDSENSQMSEAYVELSADCASDHAQ AIKVHTAAMKVGLRIVYGNTTSFLDVYVNGVTPGTSKDLK VIAGPISASFTPFDHKVVIHRGLVYNYDFPEYGAMKPGAF GDIQATSLTSKDLIASTDIRLLKPSYGNVHVPYTQASSGF EMWKNNSGRPLQETAPFGCKIAVNPLRAVDCSYGNIPISI DIPNAAFIRTSDAPLVSTVKCEVSECTYSADFGGMATLQY VSDREGQCPVHSHSSTATLQESTVHVLEKGAVTVHFSTAS PQANFIVSLCGKKTTCNAECKPPADHIVSTPHKNDQEFQA AISKTSWSWLFALFGGASSLLIIGLMIFACSMMLTSTRR* |
| 20 | GVO2.2 | MASAAPLVTAMCLLGNVSFPCDRPPTCYTREPSRALDILE ENVNHEAYDTLLNAILRCGSSGSVIDDFTLTSPYLGTCSY CHHTVPCFSPVKIEQVWDEADDNTIRIQTSAQFGYDQSGA ASANKYRYMAAAAVTDNKFNKEQQNAFYEILHLPNLNEEQ RNAFIQSLKDDPSQSANLLAEAKKLNDAQAPKVDNKFNKE QQNAFYEILHLPNLNEEQRNAFIQSLKDDPSQSANLLAEA KKLNDAQAPKVDANSSSVPGVPVTTVKEGTMDDIKISTSG PCRRLSYKGYFLLAKCPPGDSVTVSIVSSNSATSCTLARK IKPKFVGREKYDLPPVHGKKIPCTVYDRLAATTAGYITMH RPRPHAYTSYLEESSGKVYAKPPSGKNITYECKCGDYKTG TVSTRTEITGCTAIKQCVAYKSDQTKWVFNSPDLIRHDDH TAQGKLHLPFKLIPSTCMVPVAHAPNVIHGFKHISLQLDT DHLTLLTTRRLGANPEPTTEWIVGKTVRNFTVDRDGLEYI WGNHEPVRVYAQESAPGDPHGWPHEIVQHYYHRHPVYTIL AVASATVAMMIGVTVAVLCACKARRECLTPYALAPNAVIP TSLALLCCVRSANAETFTETMSYLWSNSQPPFFWVQLCIPL AAFIVLMRCCSCCLPFLVVAGAYLAKVDAYEHATTVPNVP |

| SEQ ID NO: | Description | Sequence |
|---|---|---|
| | | QIPYKALVERAGYAPLNLEITVMSSEVLPSTNQEYITCKF<br>TTVVPSPKIKCCGSLECQPAAHADYTCKVFGGVYPFMWGG<br>AQCFCDSENSQMSEAYVELSADCASDHAQAIKVHTAAMKV<br>GLRIVYGNTTSFLDVYVNGVTPGTSKDLKVIAGPISASFT<br>PFDHKVVIHRGLVYNYDFPEYGAMKPGAFGDIQATSLTSK<br>DLIASTDIRLLKPSYGNVHVPYTQASSGFEMWKNNSGRPL<br>QETAPFGCKIAVNPLRAVDCSYGNIPISIDIPNAAFIRTS<br>DAPLVSTVKCEVSECTYSADFGGMATLQYVSDREGQCPVH<br>SHSSTATLQESTVHVLEKGAVTVHFSTASPQANFIVSLCG<br>KKTTCNAECKPPADHIVSTPHKNDQEFQAAISKTSWSWLF<br>ALFGGASSLLIIGLMIFACSMMLTSTRR* |
| 21 | GV0-wtSB | MASAAPLVTAMCLLGNVSFPCDRPPTCYTREPSRALDILE<br>ENVNHEAYDTLLNAILRCGSSGRSKRSVIDDFTLTSPYLG<br>TCSYCHHTVPCFSPVKIEQVWDEADDNTIRIQTSAQFGYD<br>QSGAASANKYRYMSLKQDHTVKEGTMDDIKISTSGPCRRL<br>SYKGYFLLAKCPPGDSVTVSIVSSNSATSCTLARKIKPKF<br>VGREKYDLPPVHGKKIPCTVYDRLKETTAGYITMHRPRPH<br>AYTSYLEESSGKVYAKPPSGKNITYECKCGDYKTGTVSTR<br>TEITGCTAIKQCVAYKSDQTKWVFNSPDLIRHDDHTAQGK<br>LHLPFKLIPSTCMVPVAHAPNVIHGFKHISLQLDTDHLTL<br>LTTRRLGANPEPTTEWIVGKTVRNFTVDRDGLEYIWGNHE<br>PVRVYAQESAPGDPHGWPHEIVQHYYHRHPVYTILAVASA<br>TVAMMIGVTVAVLCACKARRECLTPYALAPNAVIPTSLAL<br>LCCVRSANAETFTETMSYLWSNSQPFFWVQLCIPLAAFIV<br>LMRCCSCCLPFLVVAGAYLAKVDAYEHATTVPNVPQIPYK<br>ALVERAGYAPLNLEITVMSSEVLPSTNQEYITCKFTTVVP<br>SPKIKCCGSLECQPAAHADYTCKVFGGVYPFMWGGAQCFC<br>DSENSQMSEAYVELSADCASDHAQAIKVHTAAMKVGLRIV<br>YGNTTSFLDVYVNGVTPGTSKDLKVIAGPISASFTPFDHK<br>VVIHRGLVYNYDFPEYGAMKPGAFGDIQATSLTSKDLIAS<br>TDIRLLKPSAKNVHVPYTQASSGFEMWKNNSGRPLQETAP<br>FGCKIAVNPLRAVDCSYGNIPISIDIPNAAFIRTSDAPLV<br>STVKCEVSECTYSADFGGMATLQYVSDREGQCPVHSHSST<br>ATLQESTVHVLEKGAVTVHFSTASPQANFIVSLCGKKTTC<br>NAECKPPADHIVSTPHKNDQEFQAAISKTSWSWLFALFGG<br>ASSLLIIGLMIFACSMMLTSTRR* |
| 22 | GV0-E160G-wtSB | MASAAPLVTAMCLLGNVSFPCDRPPTCYTREPSRALDILE<br>ENVNHEAYDTLLNAILRCGSSGRSKRSVIDDFTLTSPYLG<br>TCSYCHHTVPCFSPVKIEQVWDEADDNTIRIQTSAQFGYD<br>QSGAASANKYRYMSLKQDHTVKEGTMDDIKISTSGPCRRL<br>SYKGYFLLAKCPPGDSVTVSIVSSNSATSCTLARKIKPKF<br>VGREKYDLPPVHGKKIPCTVYDRLKGTTAGYITMHRPRPH<br>AYTSYLEESSGKVYAKPPSGKNITYECKCGDYKTGTVSTR<br>TEITGCTAIKQCVAYKSDQTKWVFNSPDLIRHDDHTAQGK<br>LHLPFKLIPSTCMVPVAHAPNVIHGFKHISLQLDTDHLTL<br>LTTRRLGANPEPTTEWIVGKTVRNFTVDRDGLEYIWGNHE<br>PVRVYAQESAPGDPHGWPHEIVQHYYHRHPVYTILAVASA<br>TVAMMIGVTVAVLCACKARRECLTPYALAPNAVIPTSLAL<br>LCCVRSANAETFTETMSYLWSNSQPFFWVQLCIPLAAFIV<br>LMRCCSCCLPFLVVAGAYLAKVDAYEHATTVPNVPQIPYK<br>ALVERAGYAPLNLEITVMSSEVLPSTNQEYITCKFTTVVP<br>SPKIKCCGSLECQPAAHADYTCKVFGGVYPFMWGGAQCFC<br>DSENSQMSEAYVELSADCASDHAQAIKVHTAAMKVGLRIV<br>YGNTTSFLDVYVNGVTPGTSKDLKVIAGPISASFTPFDHK<br>VVIHRGLVYNYDFPEYGAMKPGAFGDIQATSLTSKDLIAS<br>TDIRLLKPSAKNVHVPYTQASSGFEMWKNNSGRPLQETAP<br>FGCKIAVNPLRAVDCSYGNIPISIDIPNAAFIRTSDAPLV<br>STVKCEVSECTYSADFGGMATLQYVSDREGQCPVHSHSST<br>ATLQESTVHVLEKGAVTVHFSTASPQANFIVSLCGKKTTC<br>NAECKPPADHIVSTPHKNDQEFQAAISKTSWSWLFALFGG<br>ASSLLIIGLMIFACSMMLTSTRR* |
| 23 | GVO2.2F-CoVec(N) | MASAAPLVTAMCLLGNVSFPCDRPPTCYTREPSRALDILE<br>ENVNHEAYDTLLNAILRCGSSGRSKRSVIDDFTLTSPYLG<br>TCSYCHHTVPCFSPVKIEQVWDEADDNTIRIQTSAQFGYD<br>QSGAASANKYRYMAAAAVTSQCVNLTTRTQLPPAYTNSFT<br>RGVYYPDKVFRSSVLHSTQDLFLPFFSNVTWFHAIHVSGT<br>NGTKRFDNPVLPFNDGVYFASTEKSNIIRGWIFGTTLDSK<br>TQSLLIVNNATNVVIKVCEFQFCNDPFLGVYYHKNKSWM<br>ESEFRVYSSANNCTFEYVSQPFLMDLEGKQGNFKNLREFV<br>FKNIDGYFKIYSKHTPINLVRDLPQGFSALEPLVDLPIGI |

| SEQ ID NO: | Description | Sequence |
|---|---|---|
| | | NITRFQTLLALHRSYLTPGDSSSGWTAGAAAYYVGYLQPR<br>TFLLKYNENGTITDAVDCALDPLSETKCTLPVTTVKEGTM<br>DDIKISTSGPCRRLSYKGYFLLAKCPPGDSVTVSIVSSNS<br>ATSCTLARKIKPKFVGREKYDLPPVHGKKIPCTVYDRLAA<br>TTAGYITMHRPRPHAYTSYLEESSGKVYAKPPSGKNITYE<br>CKCGDYKTGTVSTRTEITGCTAIKQCVAYKSDQTKWVFNS<br>PDLIRHDDHTAQGKLHLPFKLIPSTCMVPVAHAPNVIHGF<br>KHISLQLDTDHLTLLTTRRLGANPEPTTEWIVGKTVRNFT<br>VDRDGLEYIWGNHEPVRVYAQESAPGDPHGWPHEIVQHYY<br>HRHPVYTILAVASATVAMMIGVTVAVLCACKARRECLTPY<br>ALAPNAVIPTSLALLCCVRSANAETFTETMSYLWSNSQPF<br>FWVQLCIPLAAFIVLMRCCSCCLPFLVVAGAYLAKVDAYE<br>HATTVPNVPQIPYKALVERAGYAPLNLEITVMSSEVLPST<br>NQEYITCKFTTVVPSPKIKCCGSLECQPAAHADYTCKVFG<br>GVYPFMWGGAQCFCDSENSQMSEAYVELSADCASDHAQAI<br>KVHTAAMKVGLRIVYGNTTSFLDVYVNGVTPGTSKDLKVI<br>AGPISASFTPFDHKVVIHRGLVYNYDFPEYGAMKPGAFGD<br>IQATSLTSKDLIASTDIRLLKPSYGNVHVPYTQASSGFEM<br>WKNNSGRPLQETAPFGCKIAVNPLRAVDCSYGNIPISIDI<br>PNAAFIRTSDAPLVSTVKCEVSECTYSADFGGMATLQYVS<br>DREGQCPVHSHSSTATLQESTVHVLEKGAVTVHFSTASPQ<br>ANFIVSLCGKKTTCNAECKPPADHIVSTPHKNDQEFQAAI<br>SKTSWSWLFALFGGASSLLIIGLMIFACSMMLTSTRR* |
| 24 | EGF core domain | NSDSECPLSHDGYCLHDGVCMYIEALDKYACNCVVGYIGE<br>RCQYRDLKWWELR |
| 25 | EGF-Linker 5 | GGGGSGGGGSNSDSECPLSHDGYCLHDGVCMYIEALDKYA<br>CNCVVGYIGERCQYRDLKWWELRSGGGGSGGGG |
| 26 | EGF-Linker 6 | AAGHVGNSDSECPLSHDGYCLHDGVCMYIEALDKYACNCV<br>VGYIGERCQYRDLKWWELRGVHGAA |

SEQUENCE LISTING

```
Sequence total quantity: 43
SEQ ID NO: 1              moltype = AA   length = 983
FEATURE                   Location/Qualifiers
source                    1..983
                          mol_type = protein
                          organism = Sindbis virus
SEQUENCE: 1
MASAAPLVTA MCLLGNVSFP CDRPPTCYTR EPSRALDILE ENVNHEAYDT LLNAILRCGS   60
SGRSKRSVID DFTLTSPYLG TCSYCHHTVP CFSPVKIEQV WDEADDNTIR IQTSAQFGYD  120
QSGAASANKY RYMSLKQDHT VKEGTMDDIK ISTSGPCRRL SYKGYFLLAK CPPGDSVTVS  180
IVSSNSATSC TLARKIKPKF VGREKYDLPP VHGKKIPCTV YDRLKETTAG YITMHRPRPH  240
AYTSYLEESS GKVYAKPPSG KNITYECKCG DYKTGTVSTR TEITGCTAIK QCVAYKSDQT  300
KWVFNSPDLI RHDDHTAQGK LHLPFKLIPS TCMVPVAHAP NVIHGFKHIS LQLDTDHLTL  360
LTTRRLGANP EPTTEWIVGK TVRNFTVDRD GLEYIWGNHE PVRVYAQESA PGDPHGWPHE  420
IVQHYYHRHP VYTILAVASA TVAMMIGVTV AVLCACKARR ECLTPYALAP NAVIPTSLAL  480
LCCVRSANAE TFTETMSYLW SNSQPFFWVQ LCIPLAAFIV LMRCCSCCLP FLVVAGAYLA  540
KVDAYEHATT VPNVPQIPYK ALVERAGYAP LNLEITVMSS EVLPSTNQEY ITCKFTTVVP  600
SPKIKCCGSL ECQPAAHADY TCKVFGGVYP FMWGGAQCFC DSENSQMSEA YVELSADCAS  660
DHAQAIKVHT AAMKVGLRIV YGNTTSFLDV YVNGVTPGTS KDLKVIAGPI SASFTPFDHK  720
VVIHRGLVYN YDFPEYGAMK PGAFGDIQAT SLTSKDLIAS TDIRLLKPSA KNVHVPYTQA  780
SSGFEMWKNN SGRPLQETAP FGCKIAVNPL RAVDCSYGNI PISIDIPNAA FIRTSDAPLV  840
STVKCEVSEC TYSADFGGMA TLQYVSDREG QCPVHSHSST ATLQESTVHV LEKGAVTVHF  900
STASPQANFI VSLCGKKTTC NAECKPPADH IVSTPHKNDQ EFQAAISKTS WSWLFALFGG  960
ASSLLIIGLM IFACSMMLTS TRR                                         983

SEQ ID NO: 2              moltype = AA   length = 10
FEATURE                   Location/Qualifiers
source                    1..10
                          mol_type = protein
                          organism = synthetic construct
SEQUENCE: 2
GGGGSGGGGS                                                         10

SEQ ID NO: 3              moltype = AA   length = 18
```

| | | |
|---|---|---|
| FEATURE | Location/Qualifiers | |
| source | 1..18 | |
| | mol_type = protein | |
| | organism = synthetic construct | |
| SEQUENCE: 3 | | |
| GSTGSGSKPG SGEGSTKG | | 18 |
| | | |
| SEQ ID NO: 4 | moltype = AA length = 20 | |
| FEATURE | Location/Qualifiers | |
| source | 1..20 | |
| | mol_type = protein | |
| | organism = synthetic construct | |
| SEQUENCE: 4 | | |
| ESKYGPPCPS CPAPEFLGGP | | 20 |
| | | |
| SEQ ID NO: 5 | moltype = AA length = 23 | |
| FEATURE | Location/Qualifiers | |
| source | 1..23 | |
| | mol_type = protein | |
| | organism = synthetic construct | |
| SEQUENCE: 5 | | |
| EPKSCDKTHT CPPCPAPELL GGP | | 23 |
| | | |
| SEQ ID NO: 6 | moltype = AA length = 6 | |
| FEATURE | Location/Qualifiers | |
| source | 1..6 | |
| | mol_type = protein | |
| | organism = synthetic construct | |
| SEQUENCE: 6 | | |
| AAGHVG | | 6 |
| | | |
| SEQ ID NO: 7 | moltype = AA length = 15 | |
| FEATURE | Location/Qualifiers | |
| source | 1..15 | |
| | mol_type = protein | |
| | organism = synthetic construct | |
| SEQUENCE: 7 | | |
| GGGGSGGGGS GGGGS | | 15 |
| | | |
| SEQ ID NO: 8 | moltype = AA length = 18 | |
| FEATURE | Location/Qualifiers | |
| source | 1..18 | |
| | mol_type = protein | |
| | organism = synthetic construct | |
| SEQUENCE: 8 | | |
| SSGGGGSGGG GGGSSRSS | | 18 |
| | | |
| SEQ ID NO: 9 | moltype = AA length = 264 | |
| FEATURE | Location/Qualifiers | |
| source | 1..264 | |
| | mol_type = protein | |
| | organism = synthetic construct | |
| SEQUENCE: 9 | | |
| GGGGSGGGGS EVQLQQSGAD LVRPGALVKL SCKASGFNIK DYYLYWVKQR PEQGLEWIGW | | 60 |
| IDPQNVNTLF DPKFQGKASL TADTSSNTVY LQLSSLTSED TAVYYCARGG KRAMDYWGQG | | 120 |
| TSVTVSSGGG GSGGGGSGGG GSDVLMTQSP LSLPVTLGDQ ASISCRSSQT IVHSNGYTYL | | 180 |
| GWYLQKPGQS PKLLIYKVSN RFSGVPDRFS GSGSGTDFTL KISRVEAEDL GVYYCFQGSH | | 240 |
| VPFTFGSGTK LEIKSGGGGS GGGG | | 264 |
| | | |
| SEQ ID NO: 10 | moltype = AA length = 280 | |
| FEATURE | Location/Qualifiers | |
| source | 1..280 | |
| | mol_type = protein | |
| | organism = synthetic construct | |
| SEQUENCE: 10 | | |
| GSTGSGSKPG SGEGSTKGEV QLQQSGADLV RPGALVKLSC KASGFNIKDY YLYWVKQRPE | | 60 |
| QGLEWIGWID PQNVNTLFDP KFQGKASLTA DTSSNTVYLQ LSSLTSEDTA VYYCARGGKR | | 120 |
| AMDYWGQGTS VTVSSGGGGS GGGGSGGGGS DVLMTQSPLS LPVTLGDQAS ISCRSSQTIV | | 180 |
| HSNGYTYLGW YLQKPGQSPK LLIYKVSNRF SGVPDRFSGS GSGTDFTLKI SRVEAEDLGV | | 240 |
| YYCFQGSHVP FTFGSGTKLE IKGKTSGEGS GPKSGSGTSG | | 280 |
| | | |
| SEQ ID NO: 11 | moltype = AA length = 284 | |
| FEATURE | Location/Qualifiers | |
| source | 1..284 | |
| | mol_type = protein | |
| | organism = synthetic construct | |
| SEQUENCE: 11 | | |
| ESKYGPPCPS CPAPEFLGGP EVQLQQSGAD LVRPGALVKL SCKASGFNIK DYYLYWVKQR | | 60 |
| PEQGLEWIGW IDPQNVNTLF DPKFQGKASL TADTSSNTVY LQLSSLTSED TAVYYCARGG | | 120 |

```
KRAMDYWGQG TSVTVSSGGG GSGGGSGGG GSDVLMTQSP LSLPVTLGDQ ASISCRSSQT      180
IVHSNGYTYL GWYLQKPGQS PKLLIYKVSN RFSGVPDRFS GSGSGTDFTL KISRVEAEDL      240
GVYYCFQGSH VPFTFGSGTK LEIKPGGLFE PAPCSPCPPG YKSE                       284

SEQ ID NO: 12          moltype = AA   length = 290
FEATURE                Location/Qualifiers
source                 1..290
                       mol_type = protein
                       organism = synthetic construct
SEQUENCE: 12
EPKSCDKTHT CPPCPAPELL GGPEVQLQQS GADLVRPGAL VKLSCKASGF NIKDYYLYWV       60
KQRPEQGLEW IGWIDPQNVN TLFDPKFQGK ASLTADTSSN TVYLQLSSLT SEDTAVYYCA      120
RGGKRAMDYW GQGTSVTVSS GGGGSGGGGS GGGGSDVLMT QSPLSLPVTL GDQASISCRS      180
SQTIVHSNGY TYLGWYLQKP GQSPKLLIYK VSNRFSGVPD RFSGSGSGTD FTLKISRVEA      240
EDLGVYYCFQ GSHVPFTFGS GTKLEIKPGG LLEPAPCPPC THTKDCSKPE                 290

SEQ ID NO: 13          moltype = AA   length = 267
FEATURE                Location/Qualifiers
source                 1..267
                       mol_type = protein
                       organism = synthetic construct
SEQUENCE: 13
GGGGSGGGGS EVQLQQSGAD LVRPGALVKL SCKASGFNIK DYYLYWVKQR PEQGLEWIGW       60
IDPQNVNTLF DPKFQGKASL TADTSSNTVY LQLSSLTSED TAVYYCARGG KRAMDYWGQG      120
TSVTVSSSSG GGGSGGGGGG SSRSSDVLMT QSPLSLPVTL GDQASISCRS SQTIVHSNGY      180
TYLGWYLQKP GQSPKLLIYK VSNRFSGVPD RFSGSGSGTD FTLKISRVEA EDLGVYYCFQ      240
GSHVPFTFGS GTKLEIKSGG GGSGGGG                                          267

SEQ ID NO: 14          moltype = AA   length = 259
FEATURE                Location/Qualifiers
source                 1..259
                       mol_type = protein
                       organism = synthetic construct
SEQUENCE: 14
AAGHVGEVQL QQSGADLVRP GALVKLSCKA SGFNIKDYYL YWVKQRPEQG LEWIGWIDPQ       60
NVNTLFDPKF QGKASLTADT SSNTVYLQLS SLTSEDTAVY YCARGGKRAM DYWGQGTSVT      120
VSSSSGGGGS GGGGGGSSRS SDVLMTQSPL SLPVTLGDQA SISCRSSQTI VHSNGYTYLG      180
WYLQKPGQSP KLLIYKVSNR FSGVPDRFSG SGSGTDFTLK ISRVEAEDLG VYYCFQGSHV      240
PFTFGSGTKL EIKGVHGAA                                                   259

SEQ ID NO: 15          moltype = AA   length = 287
FEATURE                Location/Qualifiers
source                 1..287
                       mol_type = protein
                       organism = synthetic construct
SEQUENCE: 15
ESKYGPPCPS CPAPEFLGGP EVQLQQSGAD LVRPGALVKL SCKASGFNIK DYYLYWVKQR       60
PEQGLEWIGW IDPQNVNTLF DPKFQGKASL TADTSSNTVY LQLSSLTSED TAVYYCARGG      120
KRAMDYWGQG TSVTVSSSSG GGGSGGGGGG SSRSSDVLMT QSPLSLPVTL GDQASISCRS      180
SQTIVHSNGY TYLGWYLQKP GQSPKLLIYK VSNRFSGVPD RFSGSGSGTD FTLKISRVEA      240
EDLGVYYCFQ GSHVPFTFGS GTKLEIKPGG LFEPAPCSPC PPGYKSE                    287

SEQ ID NO: 16          moltype = AA   length = 15
FEATURE                Location/Qualifiers
source                 1..15
                       mol_type = protein
                       organism = synthetic construct
SEQUENCE: 16
SSSSGSSSSG SSSSG                                                        15

SEQ ID NO: 17          moltype = AA   length = 320
FEATURE                Location/Qualifiers
source                 1..320
                       mol_type = protein
                       organism = synthetic construct
SEQUENCE: 17
MASYPGHQHA SAFDQAARSR GHSNRRTALR PRRQQEATEV RPEQKMPTLL RVYIDGPHGM       60
GKTTTTQLLV ALGSRDDIVY VPEPMTYWRV LGASETIANI YTTQHRLDQG EISAGDAAVV      120
MTSAQITMGM PYAVTDAVLA PHIGGEAGSS HAPPPALTLI FDRHPIAALL CYPAARYLMG      180
SMTPQAVLAF VALIPPTLPG TNIVLGALPE DRHIDRLAKR QRPGERLDLA MLAAIRRVYG      240
LLANTVRYLQ CGGSWREDWG QLSGTAVPPQ GAEPQSNAGP RPHIGDTLFT LFRAPELLAP      300
NGDLYNVFAW ALDVLAKRLR                                                  320

SEQ ID NO: 18          moltype = AA   length = 12
FEATURE                Location/Qualifiers
source                 1..12
                       mol_type = protein
                       organism = synthetic construct
SEQUENCE: 18
```

```
LQKKLEELEL DG                                                                              12

SEQ ID NO: 19             moltype = AA  length = 439
FEATURE                   Location/Qualifiers
source                    1..439
                          mol_type = protein
                          organism = synthetic construct
SEQUENCE: 19
YEHATTVPNV PQIPYKALVE RAGYAPLNLE ITVMSSEVLP STNQEYITCK FTTVVPSPKI         60
KCCGSLECQP AAHADYTCKV FGGVYPFMWG GAQCFCDSEN SQMSEAYVEL SADCASDHAQ         120
AIKVHTAAMK VGLRIVYGNT TSFLDVYVNG VTPGTSKDLK VIAGPISASF TPFDHKVVIH         180
RGLVYNYDFP EYGAMKPGAF GDIQATSLTS KDLIASTDIR LLKPSYGNVH VPYTQASSGF         240
EMWKNNSGRP LQETAPFGCK IAVNPLRAVD CSYGNIPISI DIPNAAFIRT SDAPLVSTVK         300
CEVSECTYSA DFGGMATLQY VSDREGQCPV HSHSSTATLQ ESTVHVLEKG AVTVHFSTAS         360
PQANFIVSLC GKKTTCNAEC KPPADHIVST PHKNDQEFQA AISKTSWSWL FALFGGASSL         420
LIIGLMIFAC SMMLTSTRR                                                     439

SEQ ID NO: 20             moltype = AA  length = 1108
FEATURE                   Location/Qualifiers
source                    1..1108
                          mol_type = protein
                          organism = synthetic construct
SEQUENCE: 20
MASAAPLVTA MCLLGNVSFP CDRPPTCYTR EPSRALDILE ENVNHEAYDT LLNAILRCGS         60
SGSVIDDFTL TSPYLGTCSY CHHTVPCFSP VKIEQVWDEA DDNTIRIQTS AQFGYDQSGA         120
ASANKYRYMA AAAVTDNKFN KEQQNAFYEI LHLPNLNEEQ RNAFIQSLKD DPSQSANLLA         180
EAKKLNDAQA PKVDNKFNKE QQNAFYEILH LPNLNEEQRN AFIQSLKDDP SQSANLLAEA         240
KKLNDAQAPK VDANSSSVPG VPVTTVKEGT MDDIKISTSG PCRRLSYKGY FLLAKCPPGD         300
SVTVSIVSSN SATSCTLARK IKPKFVGREK YDLPPVHGKK IPCTVYDRLA ATTAGYITMH         360
RPRPHAYTSY LEESSGKVYA KPPSGKNITY ECKCGDYKTG TVSTRTEITG CTAIKQCVAY         420
KSDQTKWVFN SPDLIRHDDH TAQGKLHLPF KLIPSTCMVP VAHAPNVIHG FKHISLQLDT         480
DHLTLLTTRR LGANPEPTTE WIVGKTVRNF TVDRDGLEYI WGNHEPVRVY AQESAPGDPH         540
GWPHEIVQHY YHRHPVYTIL AVASATVAMM IGVTVAVLCA CKARRECLTP YALAPNAVIP         600
TSLALLCCVR SANAETFTET MSYLWSNSQP FFWVQLCIPL AAFIVLMRCC SCCLPFLVVA         660
GAYLAKVDAY EHATTVPNVP QIPYKALVER AGYAPLNLEI TVMSSEVLPS TNQEYITCKF         720
TTVVPSPKIK CCGSLECQPA AHADYTCKVF GGVYPFMWGG AQCFCDSENS QMSEAYVELS         780
ADCASDHAQA IKVHTAAMKV GLRIVYGNTT SFLDVYVNGV TPGTSKDLKV IAGPISASFT         840
PFDHKVVIHR GLVYNYDFPE YGAMKPGAFG DIQATSLTSK DLIASTDIRL LKPSYGNVHV         900
PYTQASSGFE MWKNNSGRPL QETAPFGCKI AVNPLRAVDC SYGNIPISID IPNAAFIRTS         960
DAPLVSTVKC EVSECTYSAD FGGMATLQYV SDREGQCPVH SHSSTATLQE STVHVLEKGA         1020
VTVHFSTASP QANFIVSLCG KKTTCNAECK PPADHIVSTP HKNDQEFQAA ISKTSWSWLF         1080
ALFGGASSLL IIGLMIFACS MMLTSTRR                                           1108

SEQ ID NO: 21             moltype = AA  length = 983
FEATURE                   Location/Qualifiers
source                    1..983
                          mol_type = protein
                          organism = synthetic construct
SEQUENCE: 21
MASAAPLVTA MCLLGNVSFP CDRPPTCYTR EPSRALDILE ENVNHEAYDT LLNAILRCGS         60
SGRSKRSVID DFTLTSPYLG TCSYCHHTVP CFSPVKIEQV WDEADDNTIR IQTSAQFGYD         120
QSGAASANKY RYMSLKQDHT VKEGTMDDIK ISTSGPCRRL SYKGYFLLAK CPPGDSVTVS         180
IVSSNSATSC TLARKIKPKF VGREKYDLPP VHGKKIPCTV YDRLKETTAG YITMHRPRPH         240
AYTSYLEESS GKVYAKPPSG KNITYECKCG DYKTGTVSTR TEITGCTAIK QCVAYKSDQT         300
KWVFNSPDLI RHDDHTAQGK LHLPFKLIPS TCMVPVAHAP NVIHGFKHIS LQLDTDHLTL         360
LTTRRLGANP EPTTEWIVGK TVRNFTVDRD GLEYIWGNHE PVRVYAQESA PGDPHGWPHE         420
IVQHYYHRHP VYTILAVASA TVAMMIGVTV AVLCACKARR ECLTPYALAP NAVIPTSLAL         480
LCCVRSANAE TFTETMSYLW SNSQPFFWVQ LCIPLAAFIV LMRCCSCCLP FLVVAGAYLA         540
KVDAYEHATT VPNVPQIPYK ALVERAGYAP LNLEITVMSS EVLPSTNQEY ITCKFTTVVP         600
SPKIKCCGSL ECQPAAHADY TCKVFGGVYP FMWGGAQCFC DSENSQMSEA YVELSADCAS         660
DHAQAIKVHT AAMKVGLRIV YGNTTSFLDV YVNGVTPGTS KDLKVIAGPI SASFTPFDHK         720
VVIHRGLVYN YDFPEYGAMK PGAFGDIQAT SLTSKDLIAS TDIRLLKPSA KNVHVPYTQA         780
SSGFEMWKNN SGRPLQETAP FGCKIAVNPL RAVDCSYGNI PISIDIPNAA FIRTSDAPLV         840
STVKCEVSEC TYSADFGGMA TLQYVSDREG QCPVHSHSST ATLQESTVHV LEKGAVTVHF         900
STASPQANFI VSLCGKKTTC NAECKPPADH IVSTPHKNDQ EFQAAISKTS WSWLFALFGG         960
ASSLLIIGLM IFACSMMLTS TRR                                                983

SEQ ID NO: 22             moltype = AA  length = 983
FEATURE                   Location/Qualifiers
source                    1..983
                          mol_type = protein
                          organism = synthetic construct
SEQUENCE: 22
MASAAPLVTA MCLLGNVSFP CDRPPTCYTR EPSRALDILE ENVNHEAYDT LLNAILRCGS         60
SGRSKRSVID DFTLTSPYLG TCSYCHHTVP CFSPVKIEQV WDEADDNTIR IQTSAQFGYD         120
QSGAASANKY RYMSLKQDHT VKEGTMDDIK ISTSGPCRRL SYKGYFLLAK CPPGDSVTVS         180
IVSSNSATSC TLARKIKPKF VGREKYDLPP VHGKKIPCTV YDRLKGTTAG YITMHRPRPH         240
AYTSYLEESS GKVYAKPPSG KNITYECKCG DYKTGTVSTR TEITGCTAIK QCVAYKSDQT         300
KWVFNSPDLI RHDDHTAQGK LHLPFKLIPS TCMVPVAHAP NVIHGFKHIS LQLDTDHLTL         360
```

```
LTTRRLGANP EPTTEWIVGK TVRNFTVDRD GLEYIWGNHE PVRVYAQESA PGDPHGWPHE    420
IVQHYYHRHP VYTILAVASA TVAMMIGVTV AVLCACKARR ECLTPYALAP NAVIPTSLAL    480
LCCVRSANAE TFTETMSYLW SNSQPFFWVQ LCIPLAAFIV LMRCCSCCLP FLVVAGAYLA    540
KVDAYEHATT VPNVPQIPYK ALVERAGYAP LNLEITVMSS EVLPSTNQEY ITCKFTTVVP    600
SPKIKCCGSL ECQPAAHADY TCKVFGGVYP FMWGGAQCFC DSENSQMSEA YVELSADCAS    660
DHAQAIKVHT AAMKVGLRIV YGNTTSFLDV YVNGVTPGTS KDLKVIAGPI SASFTPFDHK    720
VVIHRGLVYN YDFPEYGAMK PGAFGDIQAT SLTSKDLIAS TDIRLLKPSA KNVHVPYTQA    780
SSGFEMWKNN SGRPLQETAP FGCKIAVNPL RAVDCSYGNI PISIDIPNAA FIRTSDAPLV    840
STVKCEVSEC TYSADFGGMA TLQYVSDREG QCPVHSHSST ATLQESTVHV LEKGAVTVHF    900
STASPQANFI VSLCGKKTTC NAECKPPADH IVSTPHKNDQ EFQAAISKTS WSWLFALFGG    960
ASSLLIIGLM IFACSMMLTS TRR                                           983

SEQ ID NO: 23            moltype = AA   length = 1277
FEATURE                  Location/Qualifiers
source                   1..1277
                         mol_type = protein
                         organism = synthetic construct
SEQUENCE: 23
MASAAPLVTA MCLLGNVSFP CDRPPTCYTR EPSRALDILE ENVNHEAYDT LLNAILRCGS    60
SGRSKRSVID DFTLTSPYLG TCSYCHHTVP CFSPVKIEQV WDEADDNTIR IQTSAQFGYD    120
QSGAASANKY RYMAAAAVTS QCVNLTTRTQ LPPAYTNSFT RGVYYPDKVF RSSVLHSTQD    180
LFLPFFSNVT WFHAIHVSGT NGTKRFDNPV LPFNDGVYFA STEKSNIIRG WIFGTTLDSK    240
TQSLLIVNNA TNVVIKVCEF QFCNDPFLGV YYHKNNKSWM ESEFRVYSSA NNCTFEYVSQ    300
PPLMDLEGKQ GNFKNLREFV FKNIDGYFKI YSKHTPINLV RDLPQGFSAL EPLVDLPIGI    360
NITRFQTLLA LHRSYLTPGD SSSGWTAGAA AYYVGYLQPR TFLLKYNENG TITDAVDCAL    420
DPLSETKCTL PVTTVKEGTM DDIKISTSGP CRRLSYKGYF LLAKCPPGDS VTVSIVSSNS    480
ATSCTLARKI KPKFVGREKY DLPPVHGKKI PCTVYDRLAA TTAGYITMHR PRPHAYTSYL    540
EESSGKVYAK PPSGKNITYE CKCGDYKTGT VSTRTEITGC TAIKQCVAYK SDQTKWVFNS    600
PDLIRHDDHT AQGKLHLPFK LIPSTCMVPV AHAPNVIHGF KHISLQLDTD HLTLLTTRRL    660
GANPEPTTEW IVGKTVRNFT VDRDGLEYIW GNHEPVRVYA QESAPGDPHG WPHEIVQHYY    720
HRHPVYTILA VASATVAMMI GVTVAVLCAC KARRECLTPY ALAPNAVIPT SLALLCCVRS    780
ANAETFTETM SYLWSNSQPF FWVQLCIPLA AFIVLMRCCS CCLPFLVVAG AYLAKVDAYE    840
HATTVPNVPQ IPYKALVERA GYAPLNLEIT VMSSEVLPST NQEYITCKFT TVVPSPKIKC    900
CGSLECQPAA HADYTCKVFG GVYPFMWGGA QCFCDSENSQ MSEAYVELSA DCASDHAQAI    960
KVHTAAMKVG LRIVYGNTTS FLDVYVNGVT PGTSKDLKVI AGPISASFTP FDHKVVIHRG    1020
LVYNYDFPEY GAMKPGAFGD IQATSLTSKD LIASTDIRLL KPSYGNVHVP YTQASSGFEM    1080
WKNNSGRPLQ ETAPFGCKIA VNPLRAVDCS YGNIPISIDI PNAAFIRTSD APLVSTVKCE    1140
VSECTYSADF GGMATLQYVS DREGQCPVHS HSSTATLQES TVHVLEKGAV TVHFSTASPQ    1200
ANFIVSLCGK KTTCNAECKP PADHIVSTPH KNDQEFQAAI SKTSWSWLFA LFGGASSLLI    1260
IGLMIFACSM MLTSTRR                                                   1277

SEQ ID NO: 24            moltype = AA   length = 53
FEATURE                  Location/Qualifiers
source                   1..53
                         mol_type = protein
                         organism = synthetic construct
SEQUENCE: 24
NSDSECPLSH DGYCLHDGVC MYIEALDKYA CNCVVGYIGE RCQYRDLKWW ELR           53

SEQ ID NO: 25            moltype = AA   length = 73
FEATURE                  Location/Qualifiers
source                   1..73
                         mol_type = protein
                         organism = synthetic construct
SEQUENCE: 25
GGGGSGGGGS NSDSECPLSH DGYCLHDGVC MYIEALDKYA CNCVVGYIGE RCQYRDLKWW    60
ELRSGGGGSG GGG                                                      73

SEQ ID NO: 26            moltype = AA   length = 65
FEATURE                  Location/Qualifiers
source                   1..65
                         mol_type = protein
                         organism = synthetic construct
SEQUENCE: 26
AAGHVGNSDS ECPLSHDGYC LHDGVCMYIE ALDKYACNCV VGYIGERCQY RDLKWWELRG    60
VHGAA                                                               65

SEQ ID NO: 27            moltype = AA   length = 11
FEATURE                  Location/Qualifiers
source                   1..11
                         mol_type = protein
                         organism = synthetic construct
SEQUENCE: 27
GGGGSAAGHV G                                                        11

SEQ ID NO: 28            moltype = AA   length = 11
FEATURE                  Location/Qualifiers
source                   1..11
                         mol_type = protein
```

```
                              -continued organism = synthetic construct
SEQUENCE: 28
AAGHVGGGGG S                                                        11

SEQ ID NO: 29          moltype = AA   length = 16
FEATURE                Location/Qualifiers
source                 1..16
                       mol_type = protein
                       organism = synthetic construct
SEQUENCE: 29
GGGGSAAGHV GGGGGS                                                   16

SEQ ID NO: 30          moltype = AA   length = 11
FEATURE                Location/Qualifiers
source                 1..11
                       mol_type = protein
                       organism = synthetic construct
SEQUENCE: 30
GGGGSGVHGA A                                                        11

SEQ ID NO: 31          moltype = AA   length = 11
FEATURE                Location/Qualifiers
source                 1..11
                       mol_type = protein
                       organism = synthetic construct
SEQUENCE: 31
GVHGAAGGGG S                                                        11

SEQ ID NO: 32          moltype = AA   length = 16
FEATURE                Location/Qualifiers
source                 1..16
                       mol_type = protein
                       organism = synthetic construct
SEQUENCE: 32
GGGGSGVHGA AGGGGS                                                   16

SEQ ID NO: 33          moltype = AA   length = 56
FEATURE                Location/Qualifiers
source                 1..56
                       mol_type = protein
                       organism = synthetic construct
VARIANT                6..50
                       note = GGGGS repeats may be deleted
SEQUENCE: 33
GGGGSGGGGS GGGGSGGGGS GGGGSGGGGS GGGGSGGGGS GGGGSGGGGS AAGHVG        56

SEQ ID NO: 34          moltype = AA   length = 56
FEATURE                Location/Qualifiers
source                 1..56
                       mol_type = protein
                       organism = synthetic construct
VARIANT                12..56
                       note = GGGGS repeats may be deleted
SEQUENCE: 34
AAGHVGGGGG SGGGGSGGGG SGGGGSGGGG SGGGGSGGGG SGGGGSGGGG SGGGGS        56

SEQ ID NO: 35          moltype = AA   length = 106
FEATURE                Location/Qualifiers
source                 1..106
                       mol_type = protein
                       organism = synthetic construct
VARIANT                6..50
                       note = GGGGS repeats may be deleted
VARIANT                62..106
                       note = GGGGS repeats may be deleted
SEQUENCE: 35
GGGGSGGGGS GGGGSGGGGS GGGGSGGGGS GGGGSGGGGS GGGGSGGGGS AAGHVGGGGG    60
SGGGGSGGGG SGGGGSGGGG SGGGGSGGGG SGGGGSGGGG SGGGGS                   106

SEQ ID NO: 36          moltype = AA   length = 56
FEATURE                Location/Qualifiers
source                 1..56
                       mol_type = protein
                       organism = synthetic construct
VARIANT                6..50
                       note = GGGGS repeats may be deleted
SEQUENCE: 36
GGGGSGGGGS GGGGSGGGGS GGGGSGGGGS GGGGSGGGGS GGGGSGGGGS GVHGAA        56
```

```
SEQ ID NO: 37          moltype = AA  length = 56
FEATURE                Location/Qualifiers
source                 1..56
                       mol_type = protein
                       organism = synthetic construct
VARIANT                12..56
                       note = GGGGS repeats may be deleted
SEQUENCE: 37
GVHGAAGGGG SGGGGSGGGG SGGGGSGGGG SGGGGSGGGG SGGGGSGGGG SGGGGS         56

SEQ ID NO: 38          moltype = AA  length = 106
FEATURE                Location/Qualifiers
source                 1..106
                       mol_type = protein
                       organism = synthetic construct
VARIANT                6..50
                       note = GGGGS repeats may be deleted
VARIANT                62..102
                       note = GGGGS repeats may be deleted
SEQUENCE: 38
GGGGSGGGGS GGGGSGGGGS GGGGSGGGGS GGGGSGGGGS GGGGSGGGGS GVHGAAGGGG     60
SGGGGSGGGG SGGGGSGGGG SGGGGSGGGG SGGGGSGGGG SGGGGS                   106

SEQ ID NO: 39          moltype = AA  length = 14
FEATURE                Location/Qualifiers
source                 1..14
                       mol_type = protein
                       organism = synthetic construct
SEQUENCE: 39
GGGGSGGGGS GGGG                                                       14

SEQ ID NO: 40          moltype = AA  length = 6
FEATURE                Location/Qualifiers
source                 1..6
                       mol_type = protein
                       organism = synthetic construct
SEQUENCE: 40
GVHGAA                                                                 6

SEQ ID NO: 41          moltype = AA  length = 16
FEATURE                Location/Qualifiers
source                 1..16
                       mol_type = protein
                       organism = synthetic construct
SEQUENCE: 41
GGGGSGGGGS AAGHVG                                                     16

SEQ ID NO: 42          moltype = AA  length = 16
FEATURE                Location/Qualifiers
source                 1..16
                       mol_type = protein
                       organism = synthetic construct
SEQUENCE: 42
GVHGAAGGGG SGGGGS                                                     16

SEQ ID NO: 43          moltype = AA  length = 4
FEATURE                Location/Qualifiers
source                 1..4
                       mol_type = protein
                       organism = synthetic construct
SEQUENCE: 43
RSKR                                                                   4
```

The invention claimed is:

1. An engineered viral vector comprising a modified envelope protein, wherein the modified envelope protein comprises:
   a) at least one targeting moiety, and
   b) at least one modification site in SEQ ID NO: 1, wherein the at least one targeting moiety is inserted at the at least one modification site;
   wherein the modified envelope protein comprises a recombinant viral envelope protein derived from Sindbis virus comprising an E3 domain and an E2 domain, and wherein the modified envelope protein comprises a protease cleavage site located at the border between the E3 and E2 domains, wherein the modified envelope protein increases transduction efficiency and specificity of the engineered viral vector to a target cell relative to a viral vector without the modified envelope protein, and wherein the engineered viral vector comprises an engineered murine leukemia viral (MLV) vector.

2. The engineered viral vector of claim 1, wherein the at least one targeting moiety comprises a single-chain variable fragment (scFv).

3. The engineered viral vector of claim 2, wherein the scFv is encoded by a nucleotide sequence encoding at least one base-linker, a heavy chain of the variable fragment ($V_H$), a mid-linker, and a light chain of the variable fragment ($V_L$).

4. The engineered viral vector of claim 1, wherein the at least one targeting moiety comprises a diabody.

5. The engineered viral vector of claim 4, wherein the diabody comprises a dimer of a single-chain variable fragment (scFv).

6. The engineered viral vector of claim 1, wherein the at least one targeting moiety comprises a $V_HH$, wherein the $V_HH$ comprises the following formula: linker 1-$V_H$H-linker 2.

7. The engineered viral vector of claim 1, wherein the target cell is a cancer cell.

8. The engineered viral vector of claim 1, wherein the at least one targeting moiety binds to a target ligand, wherein the target ligand comprises a cell surface marker.

9. The engineered viral vector of claim 8, wherein the target ligand of the target cell comprises an immune checkpoint protein or an immune checkpoint receptor.

10. The engineered viral vector of claim 1, wherein the target cell is an immune cell.

11. The engineered viral vector of claim 1, further comprising the at least one amino acid modification is in an E1 domain relative to SEQ ID NO: 1.

12. The engineered viral vector of claim 1, further comprising the at least one modification is in an E2 domain relative to SEQ ID NO: 1.

13. The engineered viral vector of claim 1, wherein the at least one targeting moiety comprises a ligand for GPR78, EGFR, PD-1, nectin-4, or CD47 receptors.

14. The engineered viral vector of claim 1, wherein the engineered viral vector further comprises a payload gene.

15. A cell comprising the engineered viral vector of claim 1.

16. A pharmaceutical composition comprising the engineered viral vector of claim 1 and a pharmaceutically acceptable excipient.

17. The engineered viral vector of claim 1, wherein the protease cleavage site comprises a furin cleavage site.

18. The engineered viral vector of claim 14, wherein the payload gene is a therapeutic agent.

19. The engineered viral vector of claim 18, wherein the therapeutic agent is a suicide protein.

20. The engineered viral vector of claim 19, wherein the therapeutic agent comprises a thymidine kinase, a cytosine deaminase, an IL-2, a nitroreductase (NR), a carboxylesterase, a beta-glucoronidase, a cytochrome p450, a beta-galactosidase, a diphtheria toxin A-chain (DT-1), a carboxypeptidase G2 (CPG2), a purine nucleoside phosphorylase (PNP), or a deoxycytidine kinase (dCK).

* * * * *